(12) United States Patent
Du et al.

(10) Patent No.: US 11,533,634 B2
(45) Date of Patent: Dec. 20, 2022

(54) BASE STATION AND METHOD FOR OPTIMIZING COVERAGE OF SELF-DEFINED NETWORK

(71) Applicant: Industrial Technology Research Institute, Hsinchu (TW)

(72) Inventors: Guan-Hsien Du, Hsinchu (TW); Tsun-Chieh Chiang, Changhua County (TW)

(73) Assignee: Industrial Technology Research Institute, Hsinchu (TW)

( * ) Notice: Subject to any disclaimer, the term of this patent is extended or adjusted under 35 U.S.C. 154(b) by 182 days.

(21) Appl. No.: 17/124,509

(22) Filed: Dec. 17, 2020

(65) Prior Publication Data

US 2022/0201498 A1    Jun. 23, 2022

(51) Int. Cl.
*H04W 4/00* (2018.01)
*H04W 16/18* (2009.01)
(Continued)

(52) U.S. Cl.
CPC .......... *H04W 16/18* (2013.01); *H04W 24/02* (2013.01); *H04W 48/16* (2013.01);
(Continued)

(58) Field of Classification Search
CPC ..... H04W 84/18; H04W 16/18; H04W 24/02; H04W 48/16; H04W 52/244; H04W 72/0413; H04W 72/0426; H04W 72/082
(Continued)

(56) References Cited

U.S. PATENT DOCUMENTS

| 8,768,334 B2 | 7/2014 | Nylander et al. |
| 8,824,968 B2 | 9/2014 | Kim et al. |

(Continued)

FOREIGN PATENT DOCUMENTS

| CN | 105637917 | 6/2016 |
| CN | 107079407 | 8/2017 |

(Continued)

OTHER PUBLICATIONS

"Office Action of Taiwan Counterpart Application", dated Aug. 31, 2021, p. 1-p. 6.

(Continued)

*Primary Examiner* — Temica M Beamer
(74) *Attorney, Agent, or Firm* — JCIPRNET

(57) ABSTRACT

The disclosure provides a base station and a method for optimizing the coverage of a self-defined network. The method includes: receiving a measurement report from user equipment; in response to determining that the measurement report indicates that a neighboring first base station is present, sending a member tracking message to the first base station; determining whether the first base station belongs to any other base station group based on a member tracking response from the first base station; in response to determining that the first base station does not belong to any other base station group, adding the first base station to a base station group managed by the base station; and in response to determining that the member tracking response indicates that the first base station belongs to another base station group, merging the base station group and the another base station group.

28 Claims, 60 Drawing Sheets

(51) Int. Cl.
| | |
|---|---|
| H04W 72/04 | (2009.01) |
| H04W 72/08 | (2009.01) |
| H04W 52/24 | (2009.01) |
| H04W 48/16 | (2009.01) |
| H04W 24/02 | (2009.01) |
| H04W 84/18 | (2009.01) |

(52) U.S. Cl.
CPC ..... *H04W 52/244* (2013.01); *H04W 72/0413* (2013.01); *H04W 72/0426* (2013.01); *H04W 72/082* (2013.01); *H04W 84/18* (2013.01)

(58) Field of Classification Search
USPC ......................................................... 370/338
See application file for complete search history.

(56) References Cited

U.S. PATENT DOCUMENTS

| | | | |
|---|---|---|---|
| 10,148,510 | B2 | 12/2018 | Dunn et al. |
| 2013/0303081 | A1 | 11/2013 | Chang et al. |
| 2015/0141027 | A1 | 5/2015 | Tsui et al. |
| 2015/0215879 | A1 | 7/2015 | Zhu et al. |
| 2016/0029253 | A1 | 1/2016 | Sarkar et al. |
| 2017/0127427 | A1 | 5/2017 | Claridge et al. |
| 2018/0041934 | A1* | 2/2018 | Agarwal ........... H04W 36/0058 |
| 2019/0132847 | A1 | 5/2019 | Abedini et al. |
| 2019/0387562 | A1 | 12/2019 | Mueck et al. |
| 2020/0196378 | A1* | 6/2020 | Cao .................... H04W 64/003 |

FOREIGN PATENT DOCUMENTS

| | | |
|---|---|---|
| JP | 2008219645 | 9/2008 |
| JP | 6545668 | 7/2019 |
| TW | 200952368 | 12/2009 |
| WO | 2012032886 | 3/2012 |
| WO | 2015051037 | 4/2015 |
| WO | 2015141187 | 9/2015 |
| WO | 2019105596 | 6/2019 |

OTHER PUBLICATIONS

Mohammad Sharsheer et al., "Coverage and Capacity Self-Optimisation in LTE-Advanced Using Active Antenna Systems", 2016 IEEE Wireless Communications and Networking Conference WS 6 : IEEE WCNC'2016 Workshop on 5G & Vertical ndustry—WS 11 : IEEE WCNC'2016 Workshop on The Tactile Internet: Enabling Technologies and Applications, Apr. 3-6, 2016, pp. 1-5.
Naveen Mysore Balasubramanya et al., "Simulated Annealing based Joint Coverage and Capacity Optimization in LTE", 2016 IEEE Canadian Conference on Electrical and Computer Engineering (CCECE), May 15-18, 2016, pp. 1-5.
Hasan Farooq et al., "AII empowered Smart User Association in LTE Relays HetNets", 2019 IFFF International Conference on Communications Workshops (ICC Workshops), May 20-24, 2019, pp. 1-6.
Gerald Budigiri et al., "Optimal Rules Mining in SON for Distributed Intelligence in Future Cognitive Cellular Networks", 2019 International Symposium on Advanced Electrical and Communication Technologies (ISAECT), Nov. 27-29, 2019, pp. 1-6.
V. Buenestado et al., "Self-Planning of Base Station Transmit Power for Coverage and Capacity Optimization in LTE", Hindawi Mobile Information Systems, Aug. 22, 2017, pp. 1-13.
Ali A. Esswie, "Intra-Cluster Autonomous Coverage Optimization For Dense LTE-A Networks", 2016 IEEE 27th Annual IEEE International Symposium on Personal, Indoor and Mobile Radio Communications—(PIMRC): Mobile and Wireless Networks, Sept. 4-8, 2016, pp. 1-6.
Ahmad Asghar et al., "Concurrent Optimization of Coverage, Capacity, and Load Balance in HetNets Through Soft and Hard Cell Association Parameters", IEEE Transactions On Vehicular Technology, vol. 67, No. 9, Sep. 2018, pp. 8781-8795.
"Notice of allowance of Japan Counterpart Application", dated Apr. 5, 2022, p. 1-p. 2.

* cited by examiner

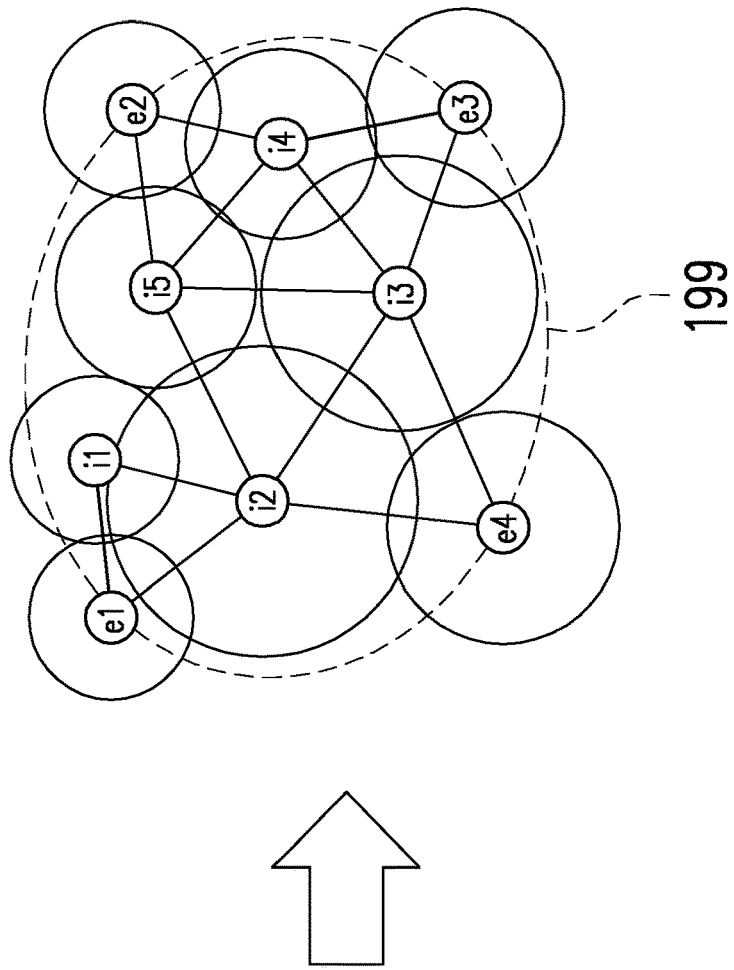
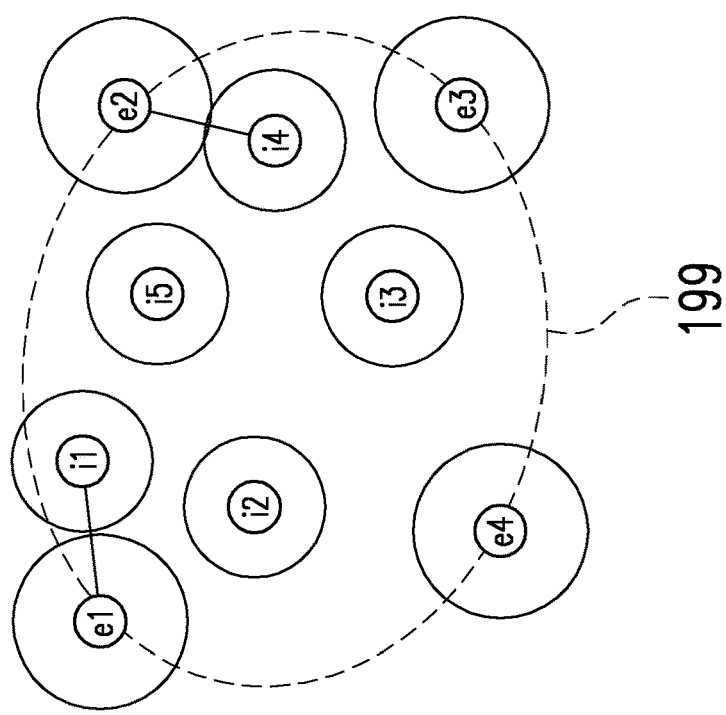
FIG. 1A

BASE STATION AND METHOD FOR OPTIMIZING COVERAGE OF SELF-DEFINED NETWORK

BACKGROUND

Technical Field

The disclosure relates to a base station and a method for optimizing the coverage of a self-defined network.

Description of Related Art

In the $5^{th}$ generation (5G) communication system, the most common issue for a self-defined network of mobile base stations (BS) is the optimization of signal coverage, which is complicated and directly related to user experience. For example, if the coverage of each base station in the self-defined network is too small (that is, each base station has smaller transmission power), there may be a coverage hole in the overall coverage, which may cause the user equipment (UE) located in the coverage hole to be unable to connect to the network. However, if the coverage of each base station in the self-defined network is too large (that is, each base station has larger transmission power), serious interference may occur between the base stations.

The solution commonly adopted for optimizing signal coverage now is to use a centralized server that is equipped with complex artificial intelligence (AI) algorithms, high-standard hardware, and global view (that is, location information of the base stations and UE is known). Such a centralized server can directly calculate the perfect answer and set it to a large number of base stations.

With the rapid development of 5G private network applications in recent years, there are more and more small-scale indoor network applications that use a small number of base stations. The aforementioned high-standard centralized server is mainly designed for large-scale networks. Although it can process and serve up to tens of thousands of base stations at the same time, it is very expensive and therefore not ideal for serving a small number of base stations.

Since there are not many base stations in small-scale private network applications, most small-scale private network applications tend to use distributed algorithms for networking, and the manager server may also have economical specifications (only provided with the simplest management interface, for example) to reduce the cost.

For the distributed signal coverage optimization algorithms currently proposed by well-known manufacturers and academic organizations, the UE location, BS location, and UE measurement report are essential elements. However, such an approach simply transfers the work of the centralized server onto the base stations, which not only uses more limited hardware to complete complex AI calculations but also adds the work of collecting device location information and performing the setting station by station.

Therefore, how to design a low-cost distributed signal coverage optimization mechanism that can be realized simply based on the UE measurement report without the UE location and BS location is an important issue.

SUMMARY

The disclosure provides a base station and a method for optimizing the coverage of a self-defined network.

An embodiment of the disclosure provides a self-defined network coverage optimizing method, adapted for a first specific base station that serves first user equipment. The first specific base station manages a first base station group. The self-defined network coverage optimizing method includes: receiving a first measurement report from the first user equipment; in response to determining that the first measurement report indicates that a neighboring first base station is present, sending a first member tracking message to the first base station, the first base station sending a first member tracking response back to the first specific base station in response to the first member tracking message; determining whether the first base station belongs to any other base station group based on the first member tracking response; in response to determining that the first base station does not belong to any other base station group, adding the first base station to the first base station group; and in response to determining that the first member tracking response indicates that the first base station belongs to a second base station group, merging the first base station group and the second base station group.

An embodiment of the disclosure provides a self-defined network coverage optimizing method, adapted for a first base station. The self-defined network coverage optimizing method includes: receiving a first member tracking message from a first specific base station, the first specific base station managing a first base station group; and sending a first member tracking response back to the first specific base station in response to the first member tracking message. The first member tracking response includes a base station category to which the first base station belongs, a neighbor list of the first base station, and a first group list of the first base station. The base station category includes an edge base station category or an inner base station category, and a location of the first base station is unknown to the first specific base station.

An embodiment of the disclosure provides a base station, which serves first user equipment and manages a first base station group. The base station includes a storage circuit, a transceiver, and a processor. The storage circuit stores a program code. The processor is coupled to the storage circuit and the transceiver, and loads the program code to execute: receiving a first measurement report from the first user equipment through the transceiver; in response to determining that the first measurement report indicates that a neighboring first base station is present, sending a first member tracking message to the first base station through the transceiver, the first base station sending a first member tracking response back to the first specific base station in response to the first member tracking message; determining whether the first base station belongs to any other base station group based on the first member tracking response; in response to determining that the first base station does not belong to any other base station group, adding the first base station to the first base station group; and in response to determining that the first member tracking response indicates that the first base station belongs to a second base station group, merging the first base station group and the second base station group.

An embodiment of the disclosure provides a base station, which includes a storage circuit, a transceiver, and a processor. The storage circuit stores a program code. The processor is coupled to the storage circuit and the transceiver, and loads the program code to execute: receiving a first member tracking message from a first specific base station through the transceiver, the first specific base station managing a first base station group; and sending a first member tracking response back to the first specific base station through the transceiver in response to the first member tracking message. The first member tracking response includes a base station category to which the first base station belongs, a neighbor list of the first base station, and a first group list of the first base station. The base station category includes an edge base station category or an inner base station category, and a location of the first base station is unknown to the first specific base station.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 1A is a schematic diagram showing optimization of self-defined network coverage according to an embodiment of the disclosure.

DETAILED DESCRIPTION OF DISCLOSED EMBODIMENTS

Figure 1B:
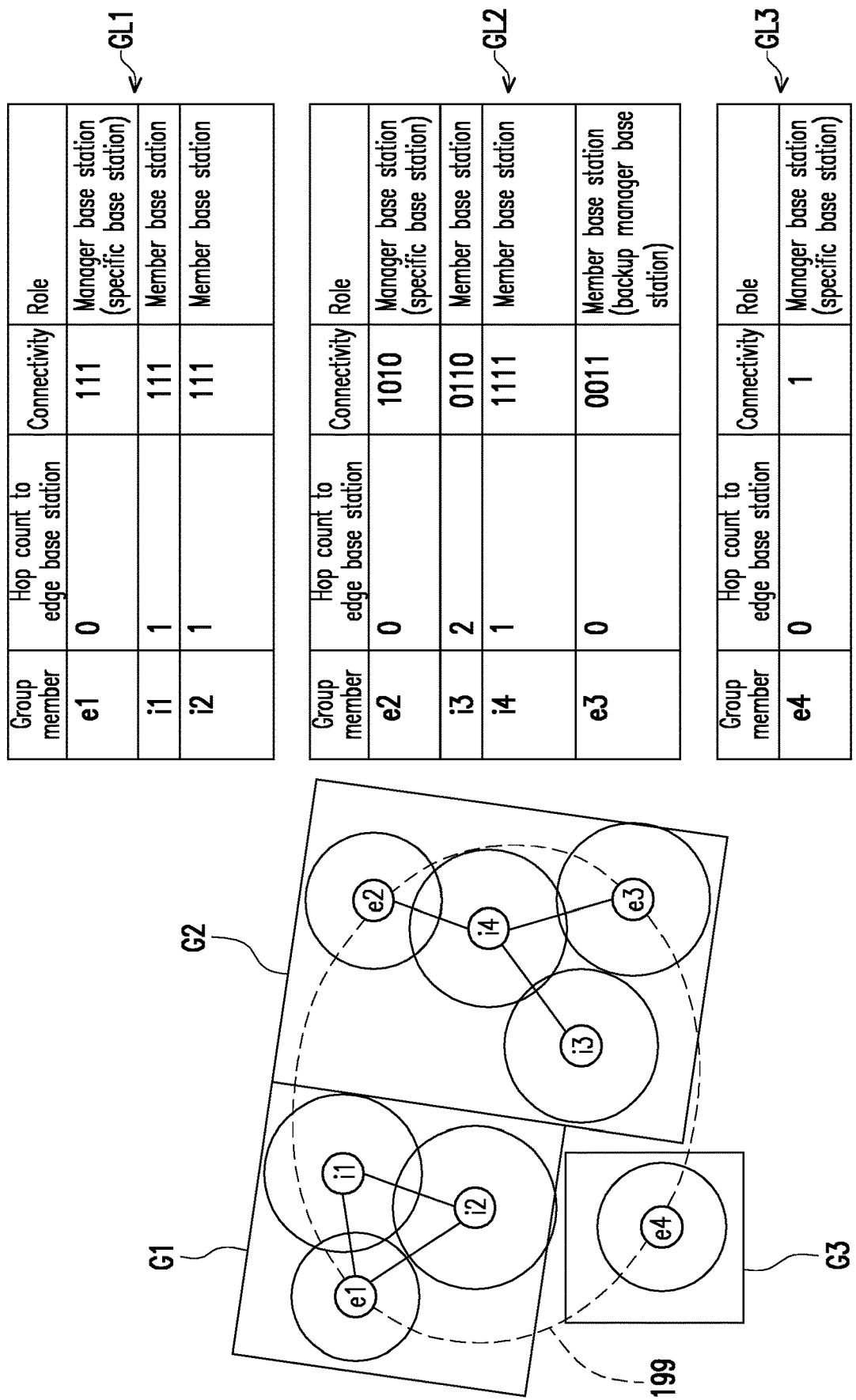
FIG. 1B is a schematic diagram showing multiple base station groups and the corresponding group lists according to FIG. 1A.

In brief, the method proposed in the disclosure is applicable to gradually adjusting the transmission power of the base stations (BS) inward from the outer edge of the service area in a distributed manner through the edge base stations belonging to the edge base station category or the inner base stations belonging to the inner base station category. In this way, the base stations in the service area are allowed to estimate the coverage ratio of the service area through the number of edge base stations connectable to each other in the neighbor relation without causing mutual interference, which may serve as a quantitative indicator of the signal coverage of the service area for adjusting the setting of the coverage of the self-defined network. Details will be provided hereinafter.

Referring to FIG. 1A, FIG. 1A is a schematic diagram showing optimization of self-defined network coverage according to an embodiment of the disclosure. In the scenario of FIG. 1A, a service range 199 is defined by the locations of the base stations e1 to e4 (each of which may be referred to as an edge base station) belonging to the edge base station category.

In another embodiment, the related network administrator may also arrange the base stations e1 to e4 on the edge of the service range 199 after determining the service range 199, but the disclosure is not limited thereto. The base stations i1 to i5 (each of which may be referred to as an inner base station) belonging to the inner base station category are arranged in the service range 199.

In the embodiment of the disclosure, the locations of the base stations e1 to e4 and i1 to i5 are unknown to other base stations. In addition, the location of the user equipment (UE) located inside/outside the service range 199 is also unknown to the base stations e1 to e4 and i1 to i5.

In the initial stage when the base stations e1 to e4 and i1 to i5 are just started, each of the base stations e1 to e4 and i1 to i5 may use the transmission power (indicated by txpower) of a preset value (for example, 0 dbm), and the transmission range corresponding to each of the base stations e1 to e4 and i1 to i5 (that is, the circle surrounding each of the base stations e1 to e4 and i1 to i5) is as shown in the left half of FIG. 1A.

As time goes on, the method of the disclosure allows each of the base stations e1 to e4 and i1 to i5 to adjust to better transmission power correspondingly, so that the overall coverage formed by the base stations e1 to e4 and i1 to i5 better covers the service range 199 (for example, no coverage hole occurs, and there is no excessive interference between the base stations), as shown in the right half of FIG. 1A.

In the embodiment of the disclosure, each base station may maintain a group list, a neighbor list, and an interference list corresponding thereto. For example, for a reference base station belonging to a reference base station group, the group list maintained by the reference base station may record each member base station (which may be the edge base station belonging to the edge base station category or the inner base station belonging to the inner base station category) in the reference base station group and related information (for example, global cell identity (CGI)) of a specific base station (which is the edge base station belonging to the edge base station category) that manages the base station group, the hop count to the edge base station (hereinafter referred to as the edge base station hop count), the connectivity with other base stations in the reference base station group, and the role (for example, manager base station or member base station) in the base station group, but not limited thereto.

Further, the interference list of the reference base station may record the interference information of the reference base station to other base stations (hereinafter referred to as the disturbed base station) in the reference base station group, such as the CGI of each disturbed base station and the interference level of the reference base station to each disturbed base station (for example, potential interference/ strong interference), but not limited thereto. In an embodiment, the format of the interference list of a certain base station is as shown in Table 1 below.

TABLE 1

| Index | CGI of the disturbed base station | Time | Interference level |
|---|---|---|---|
| 0 | 1000 | 2020 Jul. 29 10:00:00 | Strong interference |
| 1 | 2000 | 2020 Jul. 29 14:00:00 | Potential interference |
| 2 | 3000 | 2020 Jul. 30 09:30:00 | Strong interference |
| 3 | 5000 | 2020 Jul. 30 10:30:00 | Strong interference |
| 4 | 6000 | 2020 Jul. 30 11:00:00 | Potential interference |

Furthermore, the neighbor list of the reference base station may record the information of other base stations that have a neighbor relation with the reference base station. Related descriptions thereof may be found in the 3GPP TS 38.331 specification and therefore will not be repeated here.

Referring to FIG. 1B, FIG. 1B is a schematic diagram showing multiple base station groups and the corresponding group lists according to FIG. 1A. The scenario of FIG. 1B is, for example, one of the processes from the left half of FIG. 1A to the right half of FIG. 1A, but not limited thereto.

In FIG. 1B, it is assumed that the base station group G1 includes the base stations e1, i1, and i2, and the content of the group list GL1 corresponding to the base station group G1 is as shown in FIG. 1B. In the embodiment of the disclosure, each group member belonging to the same base station group holds the same group list. In other words, the group lists held by the base stations e1, i1, and i2 are all the same as the group list GL1.

As shown in FIG. 1B, the group list GL1 may record each group member of the base station group G1 and related information. Take the base station e1 belonging to the edge base station category as an example, the group list GL1 may record the edge base station hop count of the base station e1 (since the base station e1 is the edge base station, the hop count is 0), the connectivity of the base station e1 with other group members, and the role of the base station e1. In addition, since the base station e1 is directly connected to the base stations i1 and i2, the connectivity of the base station e1 may be expressed as "111". Further, it is assumed that the base station e1 is the specific base station that manages the base station group G1, and the role of the base station e1 may be marked as the manager base station.

Take the base station i1 belonging to the inner base station category as an example, the group list GL1 may record the edge base station hop count of the base station i1 to the edge base station (for example, the base station e1), the connectivity of the base station i1 with other group members, and the role of the base station i1. In addition, since the base station i1 is directly connected to the base stations e1 and i2, the connectivity of the base station i1 may be expressed as "111". In addition, since the base station i1 is managed by the base station e1, the base station i1 may be marked as the member base station.

Furthermore, it is assumed that the base station group G2 includes the base stations e2, i3, i4, and e3, and the content of the group list GL2 corresponding to the base station group G2 is as shown in FIG. 1B. The group lists held by the base stations e2, i3, i4, and e3 are all the same as the group list GL2.

As shown in FIG. 1B, the group list GL2 may record each group member of the base station group G2 and related information. Take the base station e2 belonging to the edge base station category as an example, the group list GL2 may record the edge base station hop count of the base station e2 (since the base station e2 is the edge base station, the hop count is 0), the connectivity of the base station e2 with other group members, and the role of the base station e2. In addition, since the base station e2 is only directly connected to the base station i4, the connectivity of the base station e2 may be expressed as "1010". Moreover, it is assumed that the base station e2 is the specific base station that manages the base station group G2, and the role of the base station e2 may be marked as the manager base station.

Take the base station i3 belonging to the inner base station category as an example, the group list GL2 may record the edge base station hop count of the base station i3 to the edge base station (for example, the base station e2 or e3), the connectivity of the base station i3 with other group members, and the role of the base station i3. In addition, since the base station i3 is only directly connected to the base station i4, the connectivity of the base station i3 may be expressed as "0110". In addition, since the base station i3 is managed by the base station e2, the base station i3 may be marked as the member base station.

Take the base station e3 belonging to the edge base station category as an example, the group list GL2 may record the edge base station hop count of the base station e3 (since the base station e3 is the edge base station, the hop count is 0), the connectivity of the base station e3 with other group members, and the role of the base station e3. In addition, since the base station e3 is only directly connected to the base station i4, the connectivity of the base station e3 may be expressed as "1011". In addition, it is assumed that the base station e3 is the backup manager base station of the base station group G2, and the role of the base station e3 may be marked as the member base station (backup manager base station), and the meaning of the backup manager base station will be described later.

As shown in FIG. 1B, the group list GL3 may record each group member of the base station group G3 and related information. Take the base station e4 belonging to the edge base station category as an example, the group list GL3 may record the edge base station hop count of the base station e4 (since the base station e4 is the edge base station, the hop count is 0), the connectivity of the base station e4 with other group members, and the role of the base station e4. In FIG. 1B, it is assumed that the base station group G3 only includes the base station e4, so the role of the base station e4 may be marked as the manager base station. The meaning of the other content of the group list in FIG. 1B may be derived from the above teaching and therefore will not be repeated here.

In the embodiment of the disclosure, in order to properly perform the method of the disclosure, the disclosure provides five specific messages/requests and response messages respectively corresponding thereto, as shown in Table 2 below.

TABLE 2

| Message code | Message name | Transmission direction | Meaning |
|---|---|---|---|
| Message 1 | Member tracking message | Source base station (edge base station) -> target base station (inner base station/edge base station) | Obtain the base station category, neighbor list, and group list of the target base station |

TABLE 2-continued

| Message code | Message name | Transmission direction | Meaning |
|---|---|---|---|
| Message 2 (response to message 1) | Member tracking response | Source base station (edge base station/inner base station) -> target base station (edge base station) | Send back the base station category, neighbor list, and group list of the source base station |
| Message 3 | Update message | Source base station (edge base station) -> target base station (inner base station/edge base station) | Update the group list of the target base station and specify the manager base station of the base station group |
| Message 4 (response to message 3) | Update response message | Source base station (edge base station/inner base station) -> target base station (edge base station) | Respond with whether the group list is successfully updated and whether the manager base station of the base station group is successfully specified |
| Message 5 | Group merger request | Edge base station -> edge base station | The manager base station of a certain base station group requests the manager base station of another base station group to merge the groups |
| Message 6 (response to message 5) | Group merger response | Edge base station -> edge base station | Send back whether the merger is agreed and specify the manager base station of the base station group after the merger |
| Message 7 | Power control message | Edge base station -> inner base station | The manager base station of the base station group requests the inner base stations in the same base station group to increase transmission power |
| Message 8 (response to message 7) | Power control response | Inner base station -> edge base station | The inner base station responds to the edge base station with whether transmission power can be increased |
| Message 9 | Interference control message | Any base station A -> any base station B | The base station A requests the base station B belonging to the same base station group to maintain or reduce transmission power |
| Message 10 (response to message 9) | Interference control response | base station B -> base station A | The base station B responds to the base station A with the result of interference control, for example whether the transmission power is successfully reduced |

In an embodiment, the format of the member tracking message is as shown in Table 3 below.

TABLE 3

| Parameter name | Parameter category | Use |
|---|---|---|
| Source | String | Indicate CGI of the sender |
| Target | String | Indicate CGI of the receiver |
| Time | timestamp | Indicate the time of sending message |
| Security key | Double | Security information |

In an embodiment, the format of the member tracking response is as shown in Table 4 below.

TABLE 4

| Parameter name | Parameter category | Use |
|---|---|---|
| Source | String | Indicate CGI of the sender |
| Target | String | Indicate CGI of the receiver |
| Base station category | String | Indicate whether the receiver belongs to the edge base station category or the inner base station category |
| Time | timestamp | Indicate the time of sending message |
| Security key | Double | Security information |

TABLE 4-continued

| Parameter name | Parameter category | Use |
|---|---|---|
| Neighbor list | Structure | For the edge base station to determine whether there is a new base station |
| Group list | Structure | For the edge base station to determine the base station group to which the receiver belongs |
| State | INT | Whether the base station state is marked as a moved state |

In an embodiment, the format of the update message is as shown in Table 5 below.

TABLE 5

| Parameter name | Parameter category | Use |
|---|---|---|
| Source | String | Indicate CGI of the sender |
| Target | String | Indicate CGI of the receiver |
| Time | timestamp | Indicate the time of sending message |
| Security key | Double | Security information |
| Group list | Structure | The group list provided by the edge base station that manages the base station group is for the receiver to update the group list correspondingly |

In an embodiment, the format of the update response message is as shown in Table 6 below.

TABLE 6

| Parameter name | Parameter category | Use |
|---|---|---|
| Source | String | Indicate CGI of the sender |
| Target | String | Indicate CGI of the receiver |
| Time | timestamp | Indicate the time of sending message |
| Security key | Double | Security information |
| Result | Boolean | Whether the group list is successfully updated |

In an embodiment, the format of the group merger request is as shown in Table 7 below.

TABLE 7

| Parameter name | Parameter category | Use |
|---|---|---|
| Source | String | Indicate CGI of the sender |
| Target | String | Indicate CGI of the receiver |
| Time | timestamp | Indicate the time of sending message |
| Security key | Double | Security information |
| Group list | Structure | Group list of the base station group managed by the sender |

In an embodiment, the format of the group merger response is as shown in Table 8 below.

TABLE 8

| Parameter name | Parameter category | Use |
|---|---|---|
| Source | String | Indicate CGI of the sender |
| Target | String | Indicate CGI of the receiver |
| Time | timestamp | Indicate the time of sending message |
| Security key | Double | Security information |
| Group list | Structure | Group list of the base station group managed by the sender |
| Confirm | Boolean | Whether to accept the merger |

In an embodiment, the format of the power control message is as shown in Table 9 below.

TABLE 9

| Parameter name | Parameter category | Use |
|---|---|---|
| Source | String | Indicate CGI of the sender |
| Target | String | Indicate CGI of the receiver |
| Time | timestamp | Indicate the time of sending message |
| Security key | Double | Security information |

In an embodiment, the format of the power control response is as shown in Table 10 below.

TABLE 10

| Parameter name | Parameter category | Use |
|---|---|---|
| Source | String | Indicate CGI of the sender |
| Target | String | Indicate CGI of the receiver |
| Time | timestamp | Indicate the time of sending message |
| Confirm | Boolean | Whether to accept power control |

In an embodiment, the format of the interference control message is as shown in Table 11 below.

TABLE 11

| Parameter name | Parameter category | Use |
|---|---|---|
| Source | String | Indicate CGI of the sender |
| Target | String | Indicate CGI of the receiver |
| Time | timestamp | Indicate the time of sending message |
| Interference level | INT | Strong interference or potential interference |

In an embodiment, the format of the interference control response is as shown in Table 12 below.

TABLE 12

| Parameter name | Parameter category | Use |
|---|---|---|
| Source | String | Indicate CGI of the sender |
| Target | String | Indicate CGI of the receiver |
| Time | timestamp | Indicate the time of sending message |
| Security key | Double | Security information |
| Result | Boolean | Whether the update is successful |

In the embodiment of the disclosure, it is assumed that a network management protocol connection exists between the base stations in the self-defined network taken into consideration, which may be used to transmit various messages/responses in Table 2 between the base stations, but the disclosure is not limited thereto. In different embodiments, the aforementioned network management protocol connection may be established based on protocols such as CPE WAN Management Protocol (CWMP), Simple Network Management Protocol (SNMP), and Netconf, but not limited thereto.

Figure 2:
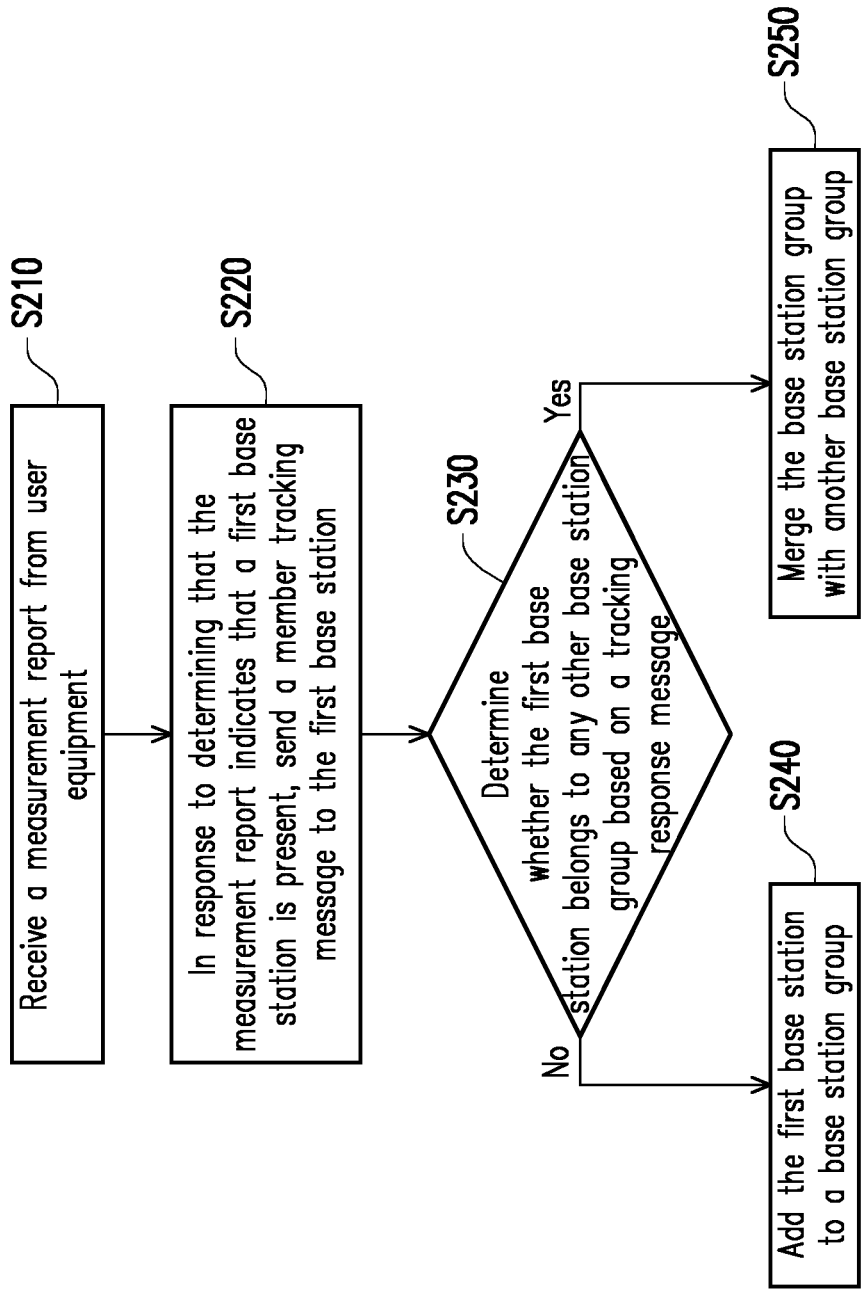
FIG. 2 is a flowchart showing a method for optimizing the coverage of a self-defined network according to an embodiment of the disclosure.

Referring to FIG. 2, FIG. 2 is a flowchart showing a method for optimizing the coverage of a self-defined network according to an embodiment of the disclosure. The method of this embodiment may be performed by the specific base station that manages any base station group. For ease of understanding, the following will be described with reference to FIG. 3A to FIG. 3V, wherein FIG. 3A to FIG. 3V are diagrams showing application scenarios according to various embodiments of the disclosure.

Figure 3A:
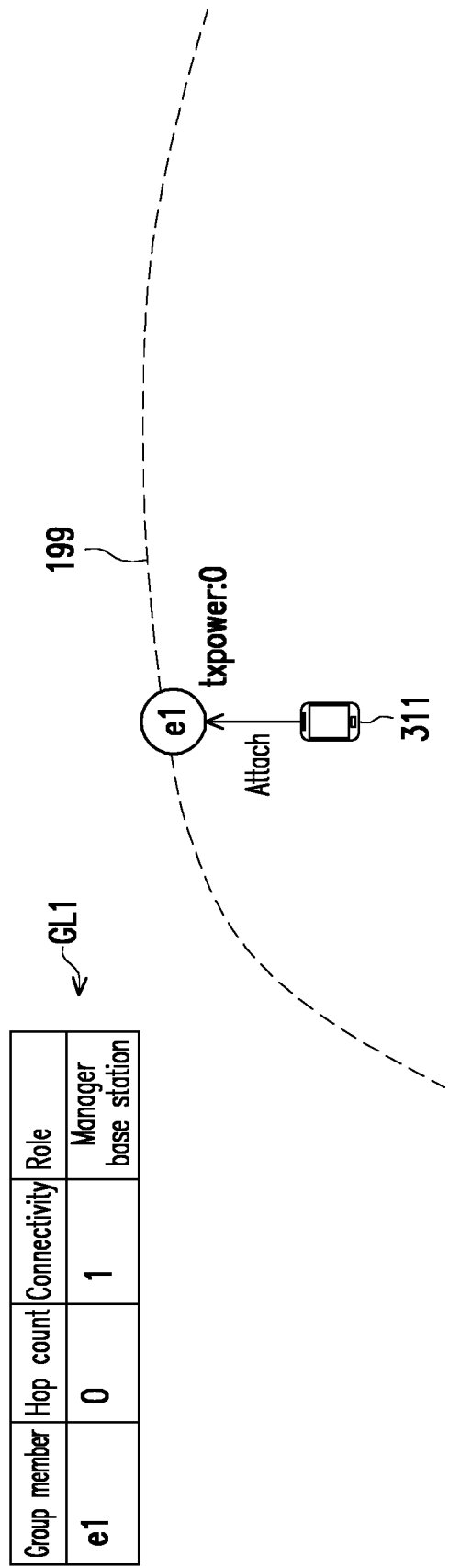
FIG. 3A to FIG. 3V are diagrams showing application scenarios according to various embodiments of the disclosure.

In FIG. 3A, it is assumed that the base station e1 has just completed the related initialization and startup procedures, and the base station e1 is preset as the manager base station of the base station group G1. That is, the base station e1 is the specific base station that manages the base station group G1. In this case, the group list GL1 of the base station group G1 is as shown in FIG. 3A. As mentioned previously, the base station e1 transmits a signal with the transmission power of a preset value (for example, 0 dbm).

In an embodiment, it is assumed that the UE 311 is attached to the base station e1 because the UE 311 is located in the transmission range of the base station e1. Then, the base station e1 may request the UE 311 to detect neighboring base stations through a radio resource control (RRC) configuration message, and request the UE 311 to provide the corresponding measurement report. Related details may be found in the 5G specification and therefore will not be repeated here.

Figure 3B:
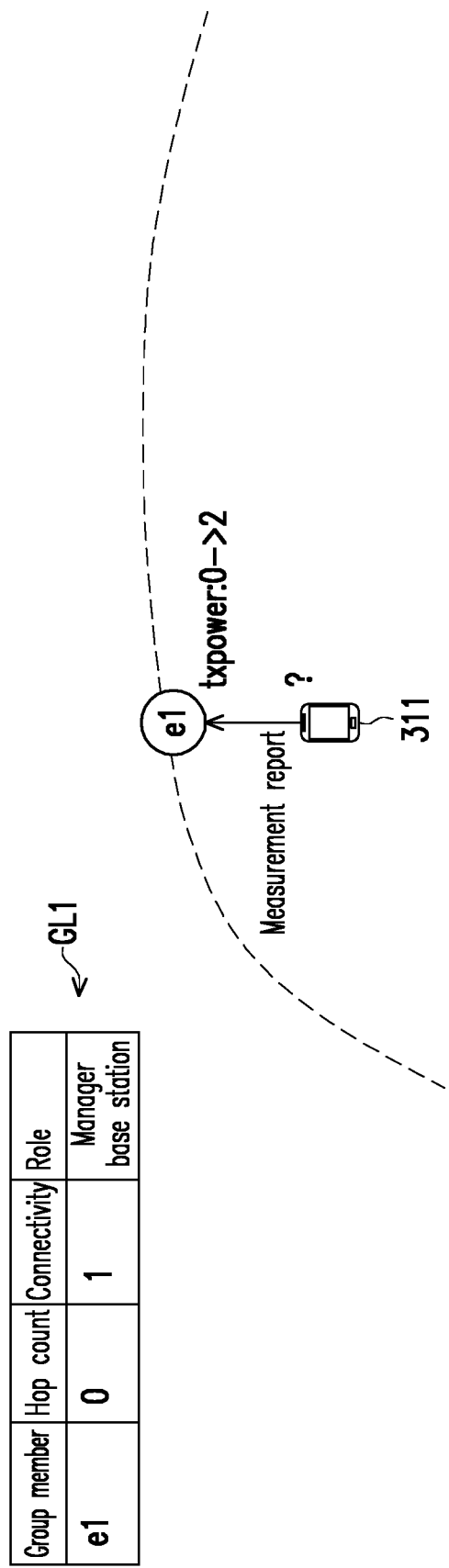

In FIG. 3B, the base station e1 may perform step S210 to receive the measurement report from the UE 311, and determine whether a neighboring base station is present based on the measurement report. In an embodiment, it is assumed that the base station e1 determines that the measurement report provided by the UE 311 indicates that no neighboring base station is present, and then the base station e1 may increase the transmission power (for example, 2 dbm) of the base station e1 correspondingly to expand the transmission range of the base station e1 to cover more UE.

Figure 3C:
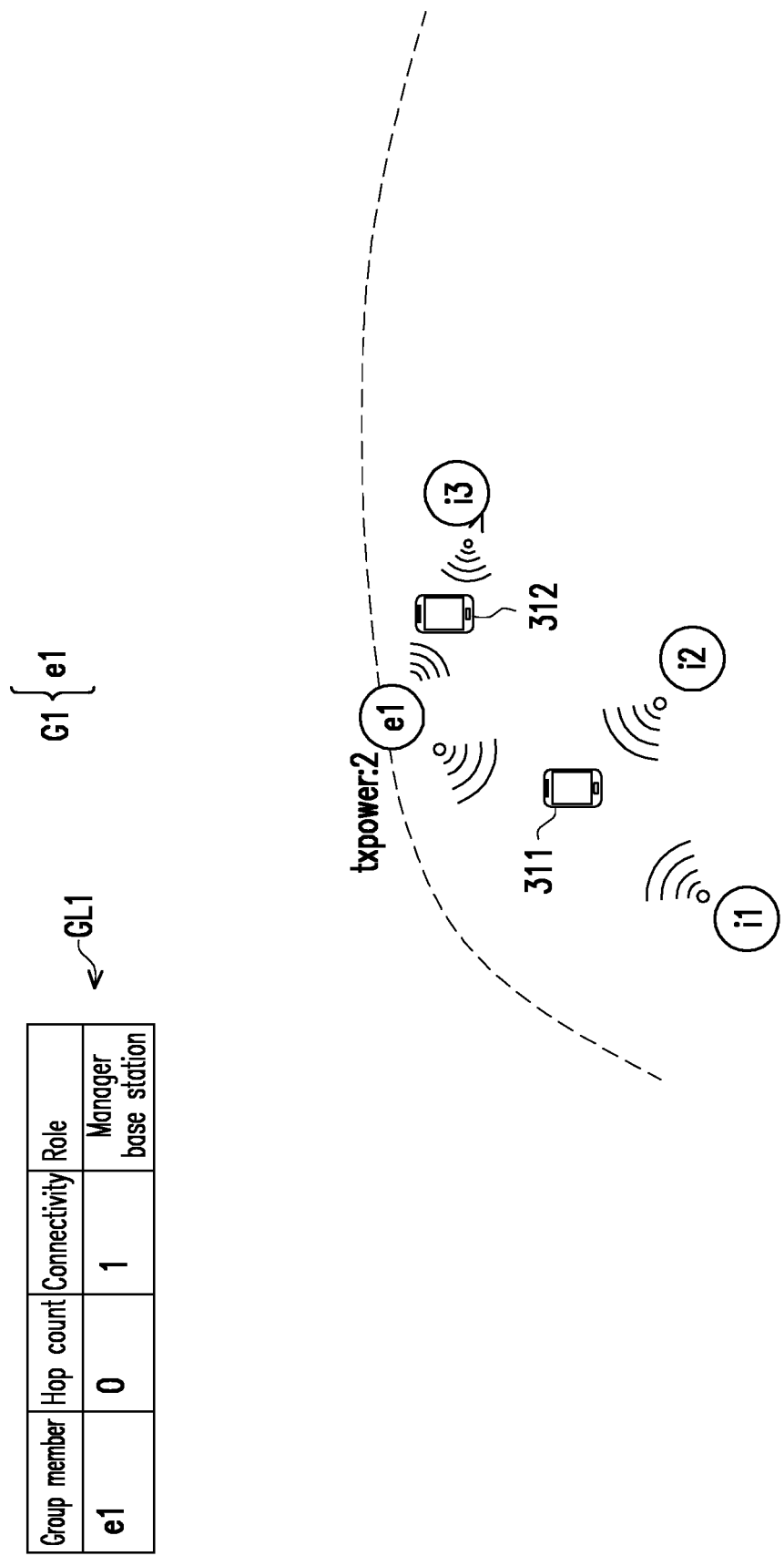

In FIG. 3C, it is assumed that another UE 312 is attached to the base station e1 after the base station e1 expands the transmission range. Then, the base station e1 also requests the UE 312 to provide the measurement report and performs step S210 to receive the measurement report from the UE 312, and determines whether a neighboring base station (hereinafter referred to as the first base station) is present near the base station e1 based on the measurement report. If the result is affirmative, the base station e1 may perform step S220 correspondingly. Otherwise, the transmission power may be increased again.

In step S220, in response to determining that the measurement report of the UE 312 indicates that the first base station is present, the base station e1 may send the member tracking message (that is, message 1) to the first base station.

In an embodiment, because the measurement report of the UE 312 may include the physical cell identity (PCI) of the first base station, the base station e1 may request the UE 312 to obtain the identifier (for example, CGI) of the first base station through the RRC configuration message.

After the UE 312 reports with the identifier of the first base station, the base station e1 may request the IP address of the first base station from the core network through the NG interface based on the identifier of the first base station, and establish the neighbor relation with the first base station based on the IP address of the first base station. Thereafter, the base station e1 may record the first base station in the neighbor list maintained by the base station e1, and the first base station may also record the base station e1 in the neighbor list maintained by the first base station, but the disclosure is not limited thereto.

In an embodiment, the first base station may send back the member tracking response (that is, message 2) in response to the member tracking message sent by the base station e1, and the base station e1 may determine whether the first base station belongs to any other base station group based on the member tracking response in step S230. If the result is negative, the base station e1 may perform step S240 to add the first base station to the base station group G1. On the other hand, if the member tracking response indicates that the first base station belongs to another base station group, the base station e1 may perform step S250 to merge the base station group G1 with another base station group.

Figure 3D:
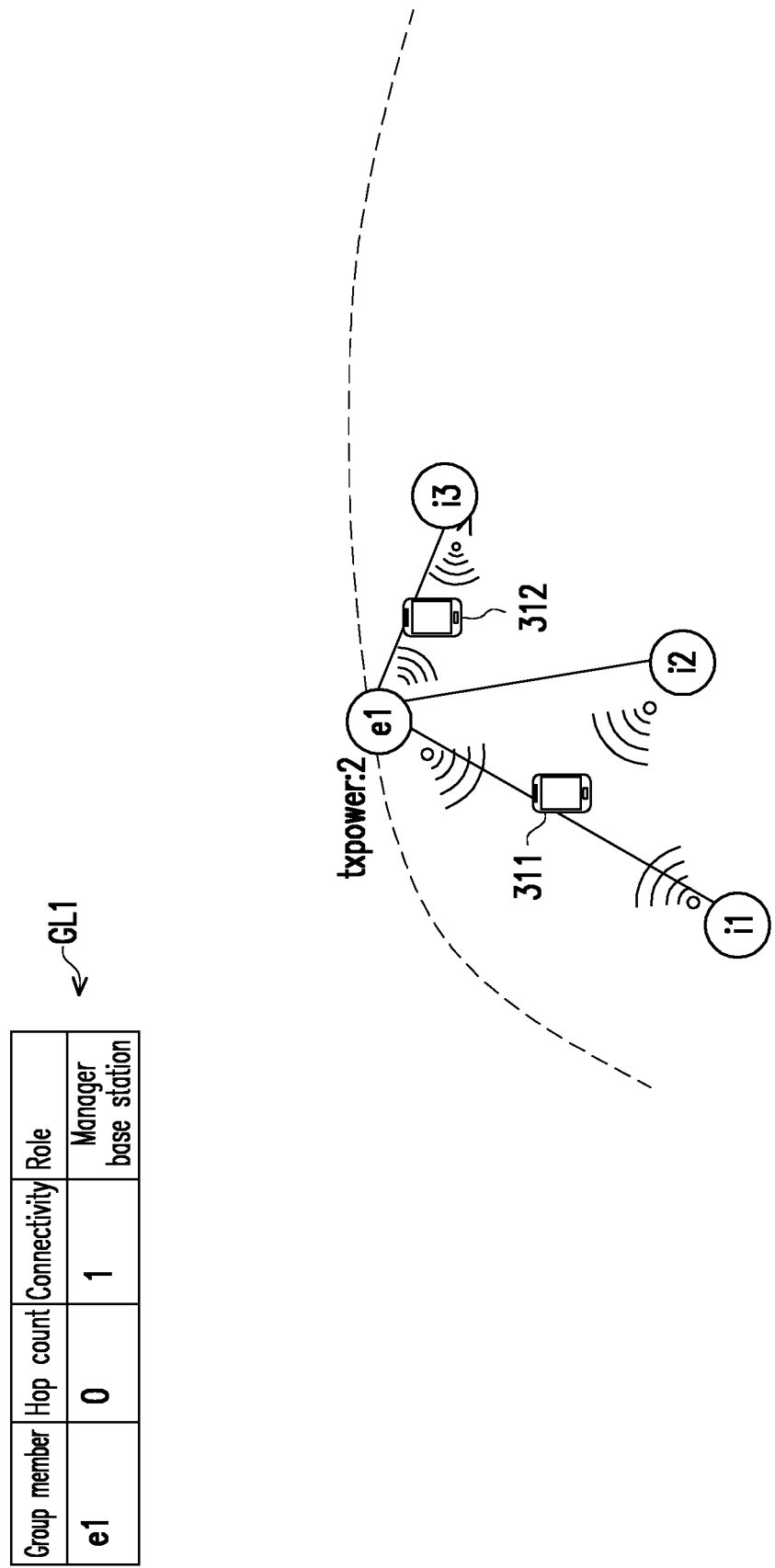

In FIG. 3D, it is assumed that the base stations i1 to i3 are the first base stations indicated in the measurement report of the UE 312. Then, the base station e1 may separately establish network management protocol connections with the base stations i1 to i3 according to the above teaching, but the disclosure is not limited thereto.

Figure 3E:
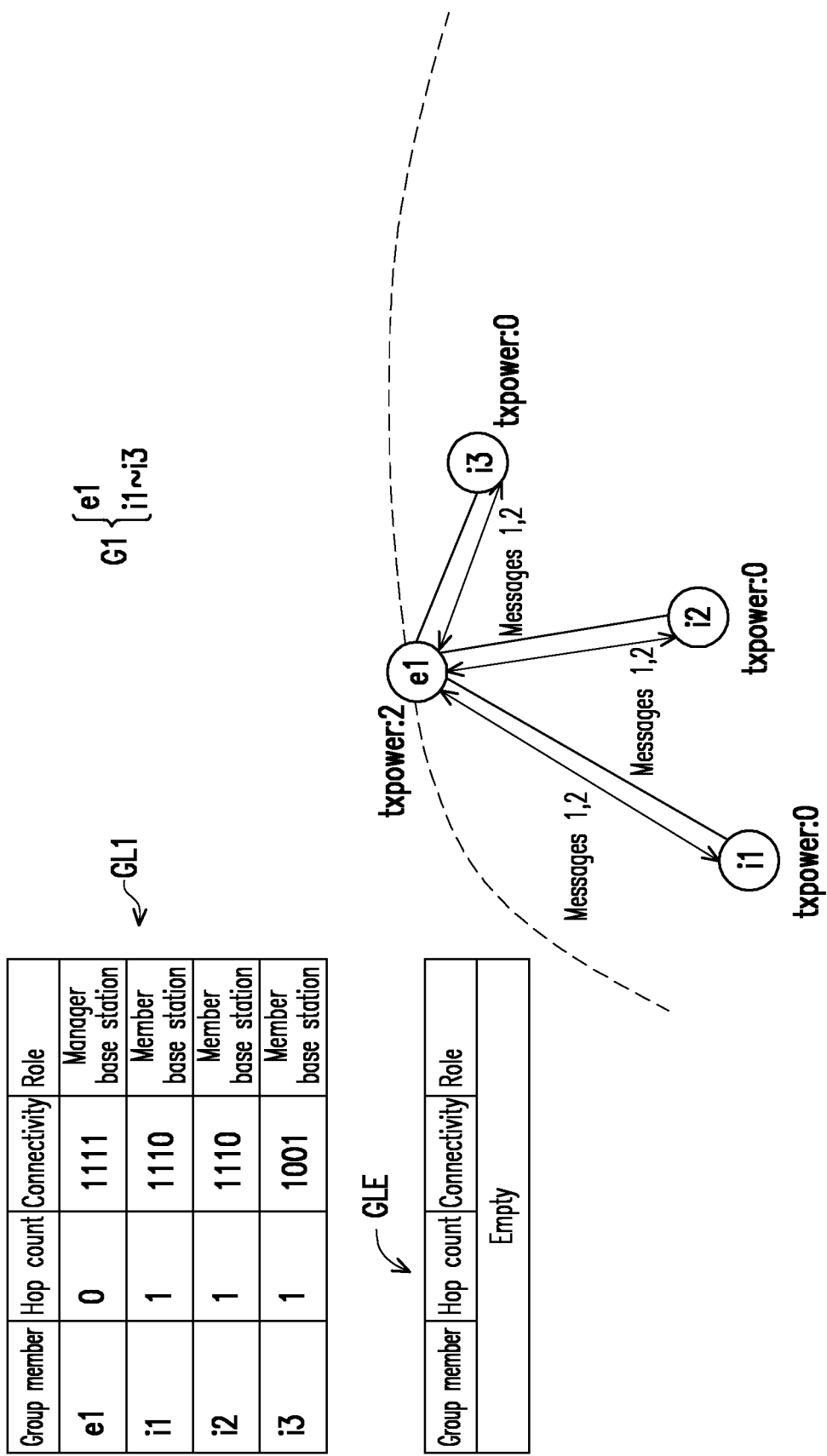

Thereafter, in FIG. 3E, the base station e1 may send the member tracking message (that is, message 1) to each of the base stations i1 to i3, and receive the member tracking response (that is, message 2 including the group list) sent back by each of the base stations i1 to i3. In this embodiment, it is assumed that the base stations i1 to i3 do not belong to any base station group, and the group list of each of the base stations i1 to i3 is empty, as shown in the group list GLE. Correspondingly, the base station e1 may learn that the base stations i1 to i3 do not belong to any base station group based on the empty group list in the member tracking response sent back by each of the base stations i1 to i3. In this case, the base station e1 may add the base stations i1 to i3 to the base station group G1 (step S240).

In an embodiment, in the process of adding the base stations i1 to i3 to the base station group G1, the base station e1 may regard the base stations i1 to i3 as the member base stations of the base station group G1, and add related information of the base stations i1 to i3 to the group list GL1 to update the group list GL1, as shown in FIG. 3E.

Figure 3F:
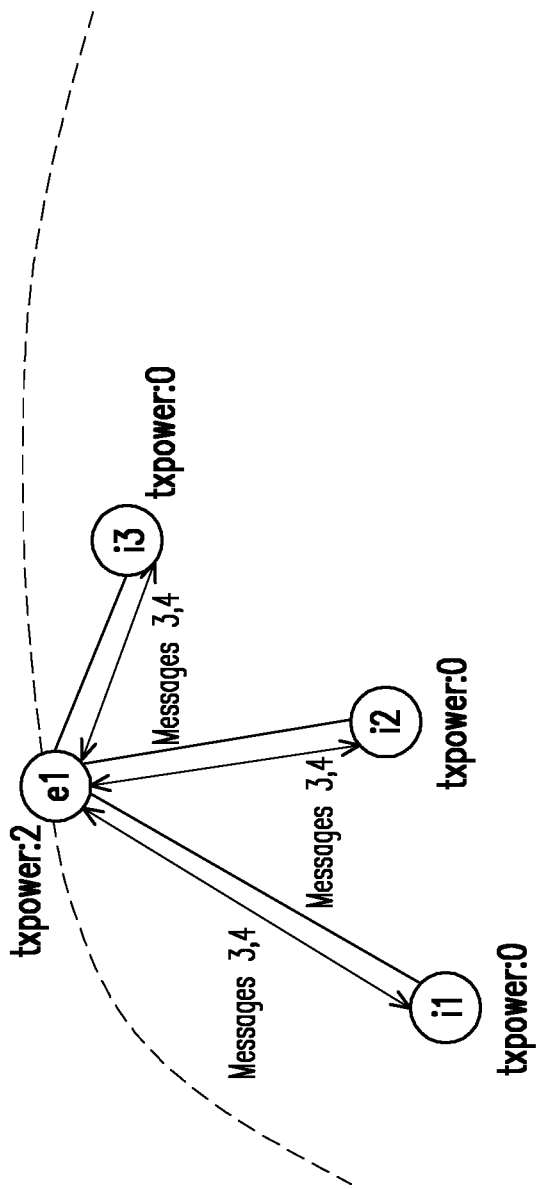

In FIG. 3F, the base station e1 may send the update message (that is, message 3) to each of the base stations i1 to i3, wherein the update message may include the updated group list GL1 and may be used to request each of the base stations i1 to i3 to update the group list of each of the base stations i1 to i3 according to the updated group list GL1. In this embodiment, after the update is completed, the group list held by each of the base stations i1 to i3 has the content of the group list GL1 as shown in FIG. 3F, and each of the base stations i1 to i3 may send back the update response message (that is, message 4) to the base station e1 to inform the result of the update, but the disclosure is not limited thereto.

In an embodiment, after adding the base stations i1 to i3 to the base station group G1, the base station e1 may determine whether the number of edge base stations in the base station group G1 is not smaller than a number threshold, or whether each member base station of the base station group G1 refuses to adjust the transmission power.

If the number of edge base stations in the base station group G1 is smaller than the number threshold, and not all the member base stations of the base station group G1 refuse to adjust the transmission power, the base station e1 may request each member base station (that is, base stations i1 to i3) of the base station group G1 to increase the transmission power through the power control message (that is, message 7) to try to include more edge base stations/inner base stations in the base station group G1. In different embodiments, the aforementioned number threshold may be set to any value according to the requirements of the related network administrator. For ease of description, the number threshold is set to 5, for example, but the disclosure is not limited thereto.

As mentioned previously, each of the base stations i1 to i3 is preset to transmit a signal with the transmission power of a preset value (for example, 0 dbm). Since currently only one edge base station (that is, base station e1) is present in the base station group G1 in the scenario of FIG. 3F, after determining that the number of edge base stations in the base station group G1 is smaller than 5 (that is, number threshold), the base station e1 may request the base stations i1 to i3 to increase the transmission power through the power control message (that is, message 7), as shown in FIG. 3G.

Figure 3G:
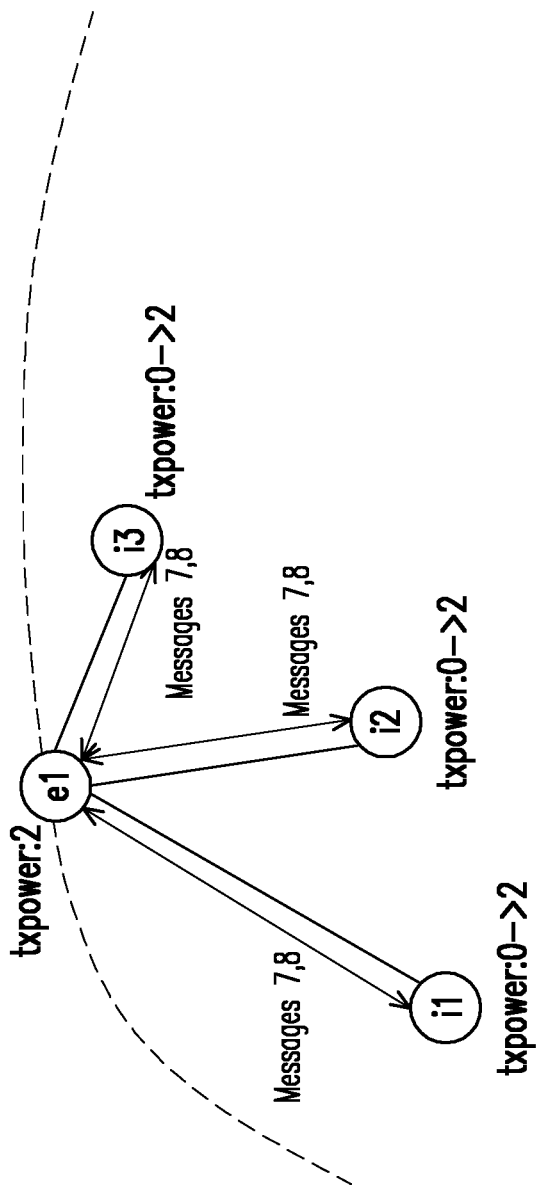

In FIG. 3G, in response to the power control message from the base station e1, the base stations i1 to i3 may separately determine whether the interference lists thereof are empty. In this embodiment, it is assumed that the interference lists of the base stations i1 to i3 are all empty. Then, the base stations i1 to i3 may, for example, increase the transmission power to 2 dbm, and correspondingly send the power control response (that is, message 8) back to the base station e1.

In other embodiments, it is assumed that the interference list of a certain member base station in the base station group G1 is not empty. Then, after receiving the power control message, the member base station may inform the base station e1 that the member base station refuses to adjust the transmission power through the power control response.

Figure 3H:
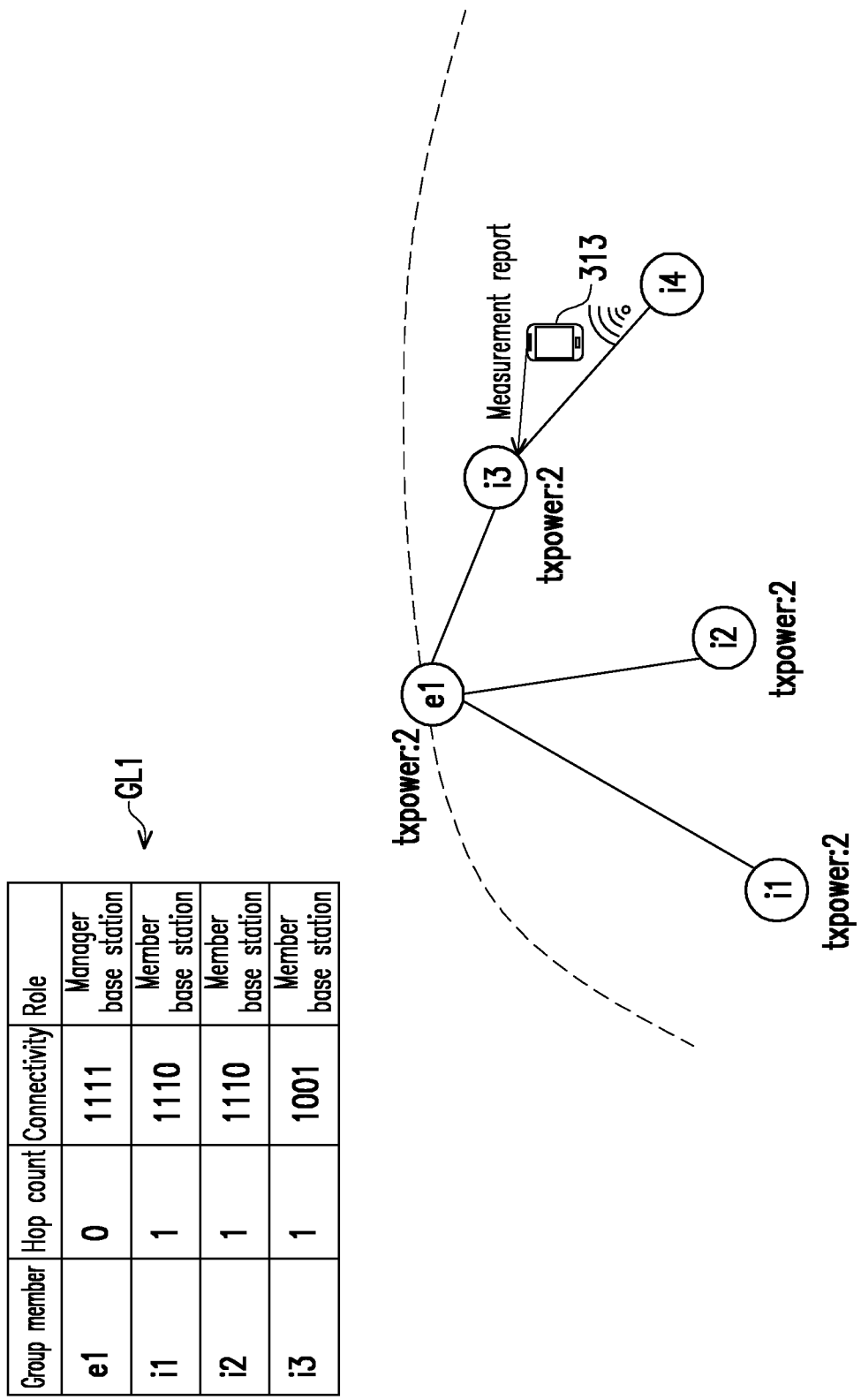

In FIG. 3H, it is assumed that after the base station i3 increases the transmission power, the UE 313 is attached to the base station i3 correspondingly, and the UE 313 may provide the measurement report to the base station i3 correspondingly. In this embodiment, it is assumed that the measurement report of the UE 313 indicates that the base station i4 is present near the base station i3. Then, the base station i3 may establish the neighbor relation with the base station i4 according to the above teaching, and the base station i3 may record the base station i4 in the neighbor list maintained by the base station i3.

In the embodiment of the disclosure, the base station e1 that manages the base station group G1 may send the member tracking message to each of the member base stations (that is, base stations i1 to i3) regularly or irregularly, and obtain information such as the base station category, neighbor list, and group list of each member base station based on the member tracking response sent back by each member base station.

Figure 3I:
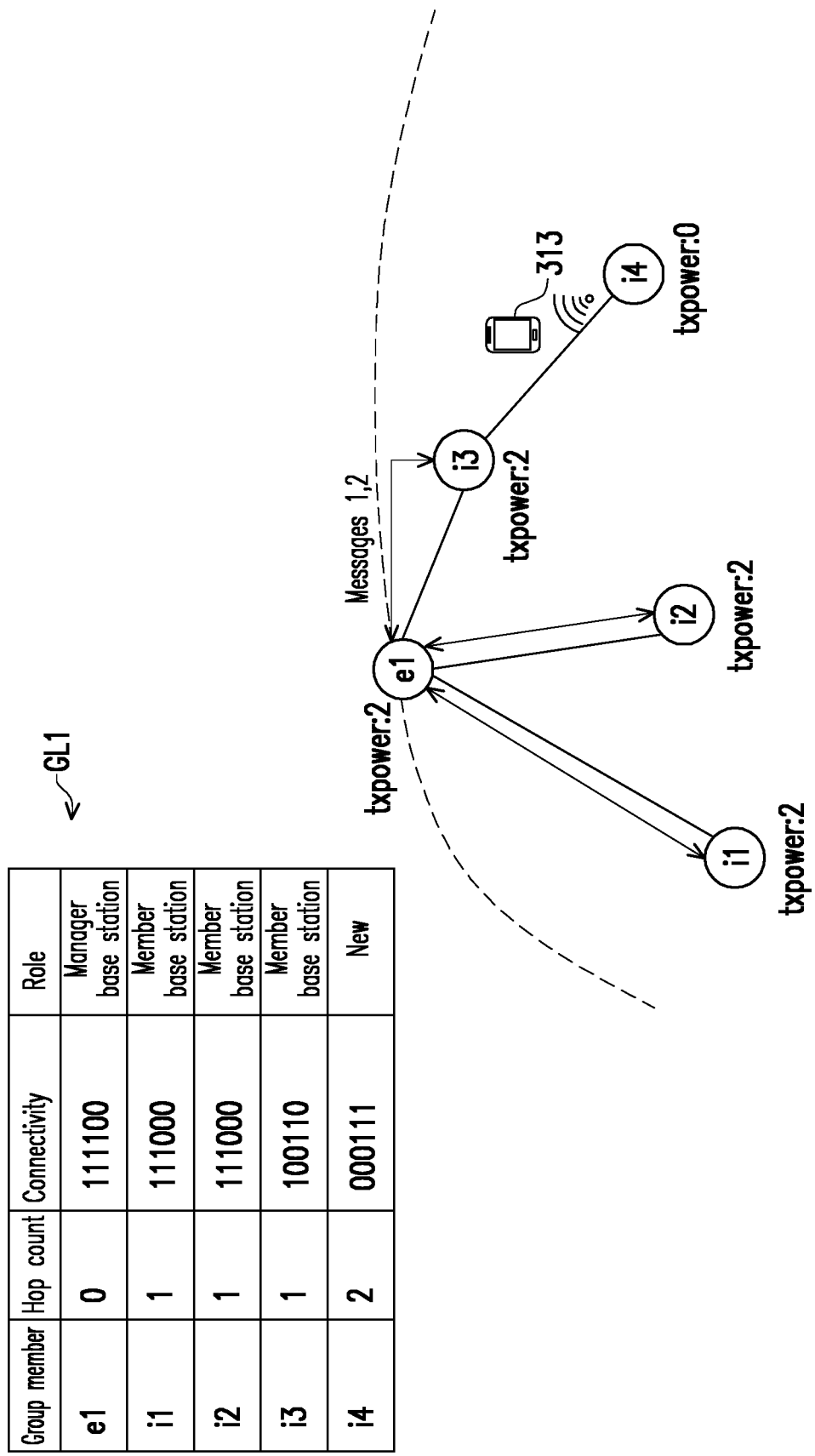

In FIG. 3I, it is assumed that the base station e1 learns that the base station i4 is present from the neighbor list in the member tracking response sent back by the base station i3. Then, the base station e1 may first add the base station i4 to the group list GL1, and send the member tracking message to the base station i4 correspondingly. Correspondingly, the base station i4 sends back the member tracking response to the base station e1.

In this embodiment, it is assumed that the base station i4 does not belong to any base station group, and the group list thereof is empty, as shown in the group list GLE. In this case, the base station e1 may add the base station i4 to the base station group G1 according to the above teaching, and update the group list GL1 to the content as shown in FIG. 3J.

Figure 3J:
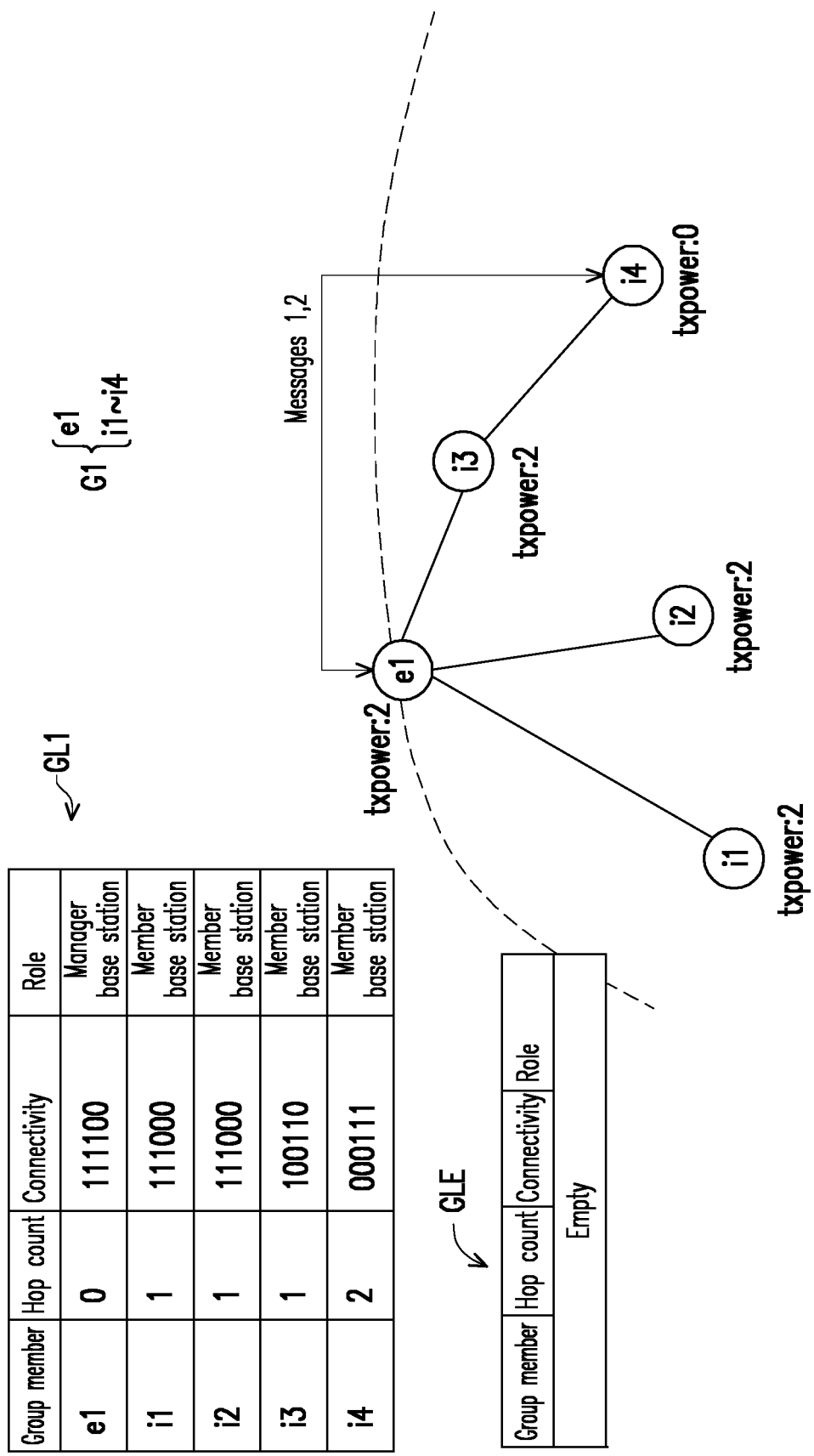
Figure 3K:
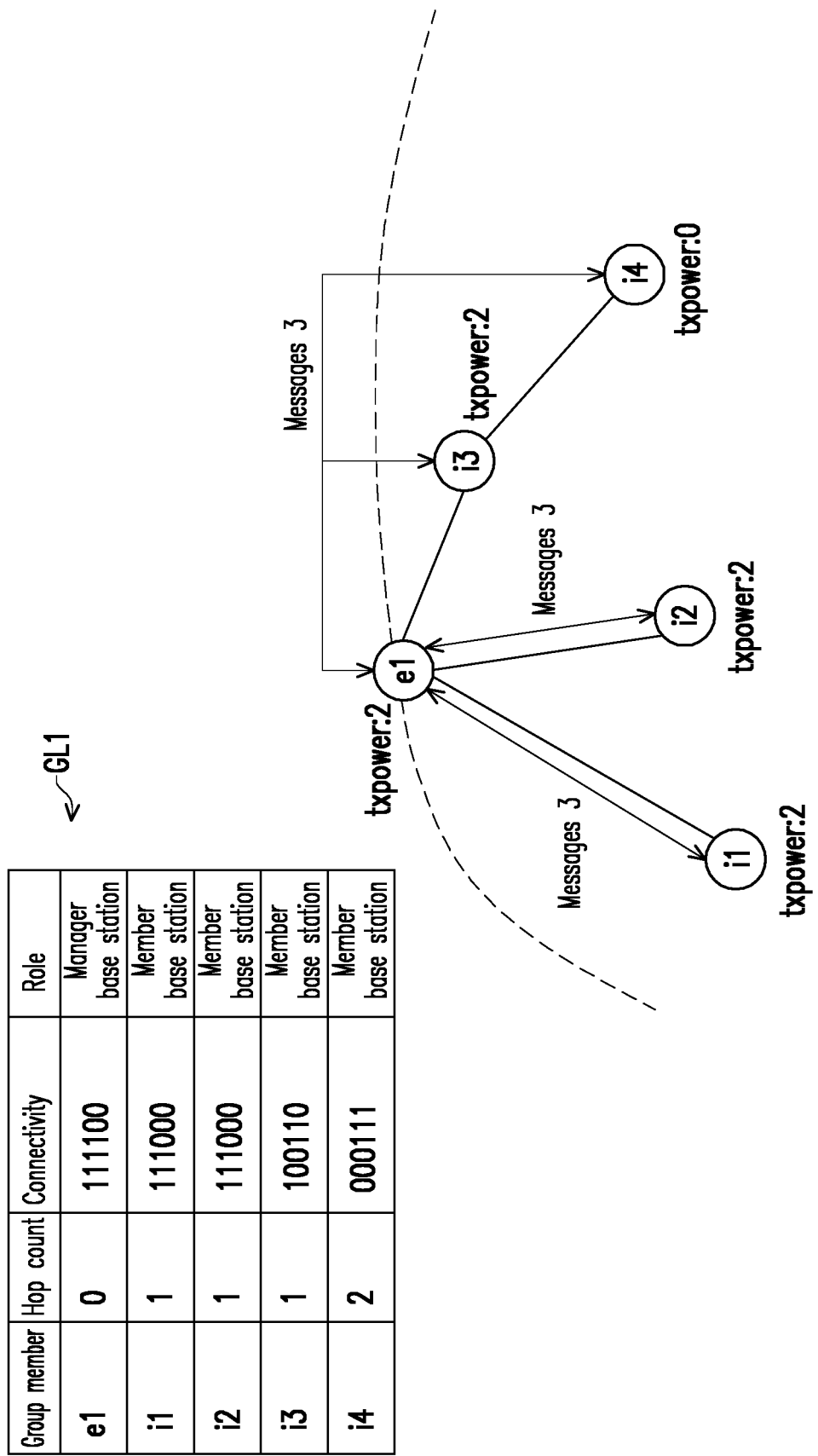

Thereafter, in FIG. 3K, the base station e1 may send the update message to each of the base stations i1 to i4 for each of the base stations i1 to i3 to update the group list thereof to the content of the group list GL1 as shown in FIG. 3J.

Figure 3L:
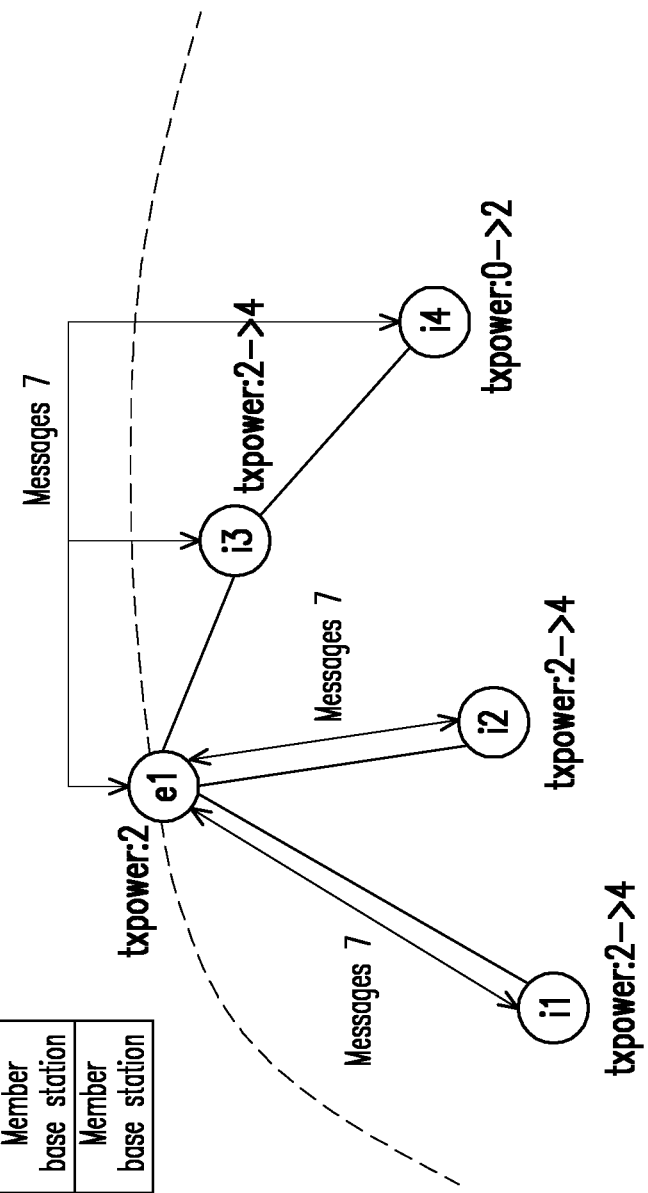

In FIG. 3L, since the number of edge base stations in the base station group G1 is still smaller than the number threshold (that is, 5), the base station e1 may request each of the member base stations (that is, base stations i1 to i4) of the base station group G1 to increase the transmission power through the power control message (that is, message 7) to try to include more edge base stations/inner base stations in the base station group G1.

As mentioned previously, the base station i4 is preset to transmit a signal with the transmission power of a preset value (for example, 0 dbm). In FIG. 3L, in response to the power control message from the base station e1, the base stations i1 to i4 may, for example, increase the transmission power to 4, 4, 4, and 2 dbm respectively, and correspondingly send back the power control response (that is, message 8) to the base station e1.

Figure 3M:
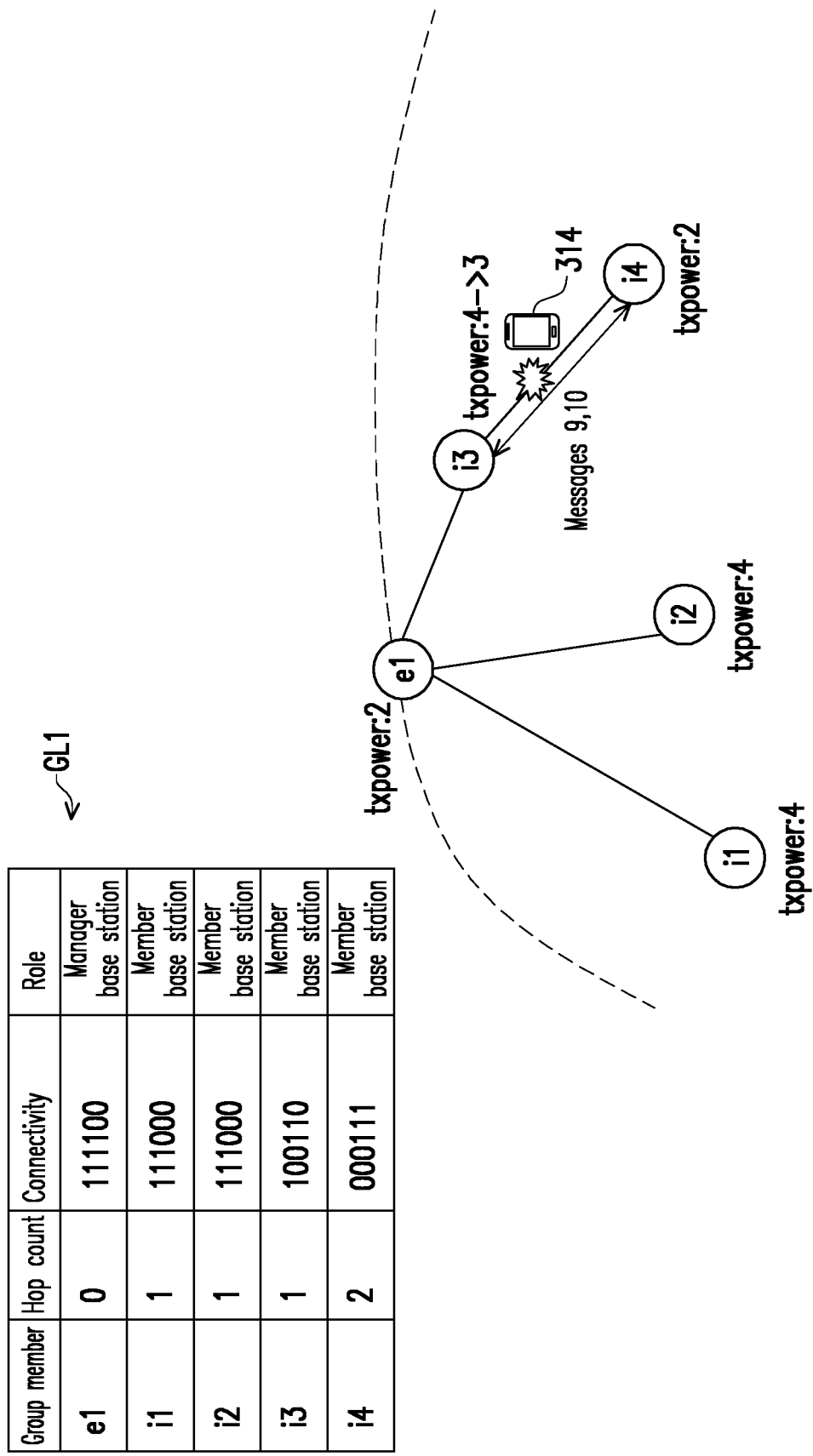

In FIG. 3M, the UE 314 attached to the base station i4 may provide the measurement report to the base station i4. In this embodiment, the measurement report of the UE 314 may include the received power of the UE 312 with respect to the base stations i3 and i4 (for example, Reference Symbol Received Power (RSRP)). In this case, the base station i4 may determine whether the received power of the UE 312 with respect to the base station i3 satisfies an interference condition.

In an embodiment, if the base station i4 determines that the RSRP of the UE 312 with respect to the base station i3 is between the first interference threshold and the second interference threshold (which is greater than the first interference threshold), or higher than the second interference threshold, the base station i4 may determine that the received power of the UE 312 with respect to the base station i3 satisfies the interference condition.

If the base station i4 determines that the received power of the UE 312 with respect to the base station i3 satisfies the interference condition, the base station i4 may determine whether the edge base station hop count of the base station i4 (for example, 2) is greater than the edge base station hop count of the base station i3 (for example, 1). In an embodiment, if the base station i4 determines that the edge base station hop count of the base station i4 is greater than the edge base station hop count of the base station i3 (that is, the scenario in FIG. 3M), it means that the base station i4 is farther from the edge base station and therefore is more suitable for covering more UE with larger transmission power. In this case, the base station i4 may send the interference control message (that is, message 9) to the base station i3 to request the base station i3 that is closer to the edge base station to maintain or reduce the transmission power.

In an embodiment, the aforementioned interference control message may include the interference level of the base station i3 with respect to the base station i4. For example, if the RSRP of the UE 312 with respect to the base station i3 is between the first interference threshold and the second interference threshold, the base station i4 may determine that the interference level of the base station i3 with respect to the base station i4 is potential interference. In addition, if the RSRP of the UE 312 with respect to the base station i3 is greater than the second interference threshold, the base station i4 may determine that the interference level of the base station i3 with respect to the base station i4 is strong interference, but the disclosure is not limited thereto.

In an embodiment, it is assumed that the base station i3 receives the interference control message from the base station i4. Then, the base station i3 may record the base station i4 and the interference level indicated by the interference control message in the interference list of the base station i3, and determine whether the time between this interference control message and the previous interference control message (for example, other interference control messages previously received) exceeds the first preset time length (for example, 30 minutes).

In response to determining that the time between this interference control message and the previous interference control message exceeds the first preset time length, the base station i3 may maintain or reduce the transmission power of the base station i3 according to the interference level indicated by the interference control message. For example, if the interference level of the interference control message is potential interference, the base station i3 may maintain the transmission power of the base station i3. In addition, if the interference level of the interference control message is strong interference, the base station i3 may reduce the transmission power of the base station i3, but the disclosure is not limited thereto. In an embodiment, the range (for example, 1 dbm) by which the base station i3 reduces the transmission power may be smaller than the range (for example, 2 dbm) by which the transmission power is previously increased. In addition, before the base station i3 reduces the transmission power, the base station i3 may first determine whether the limit number of times of reducing the transmission power has been reached. If the result is negative, the base station i3 may reduce the transmission power correspondingly. Otherwise, the transmission power may not be reduced, but the disclosure is not limited thereto.

On the other hand, in response to determining that the time between this interference control message and the previous interference control message does not exceed the first preset time length, the base station i3 may ignore this interference control message, so as to prevent the base station i3 from reducing the transmission power too frequently, but the disclosure is not limited thereto.

In other embodiments, if the base station i4 determines that the edge base station hop count of the base station i4 is not greater than the edge base station hop count of the base station i3, it means that the base station i3 is farther from the edge base station and therefore is more suitable for covering more UE with larger transmission power. In this case, the base station i4 may reduce or maintain the transmission power of the base station i4 to maintain or reduce the interference to the base station i3.

Figure 3N:
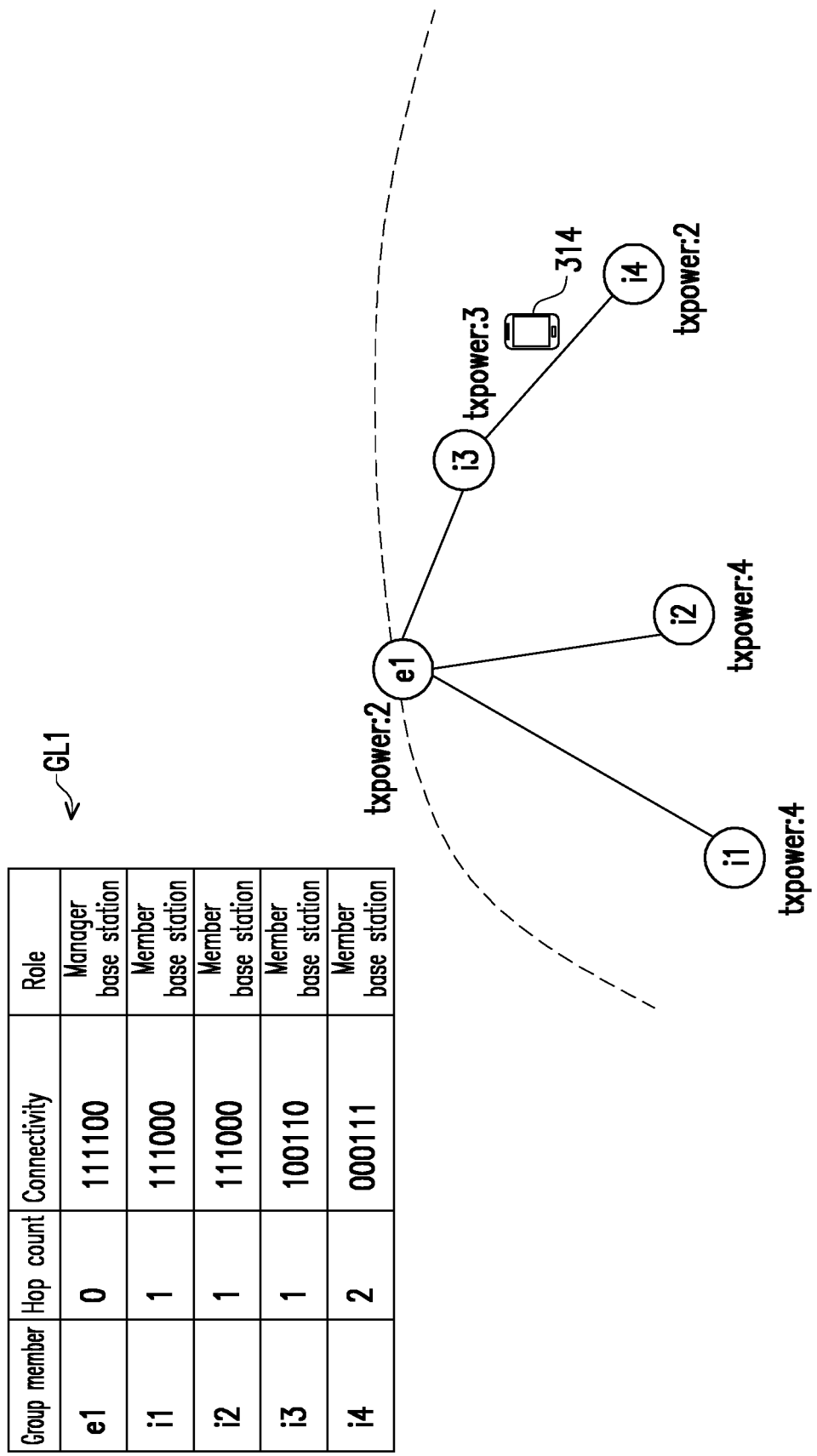
Figure 30:
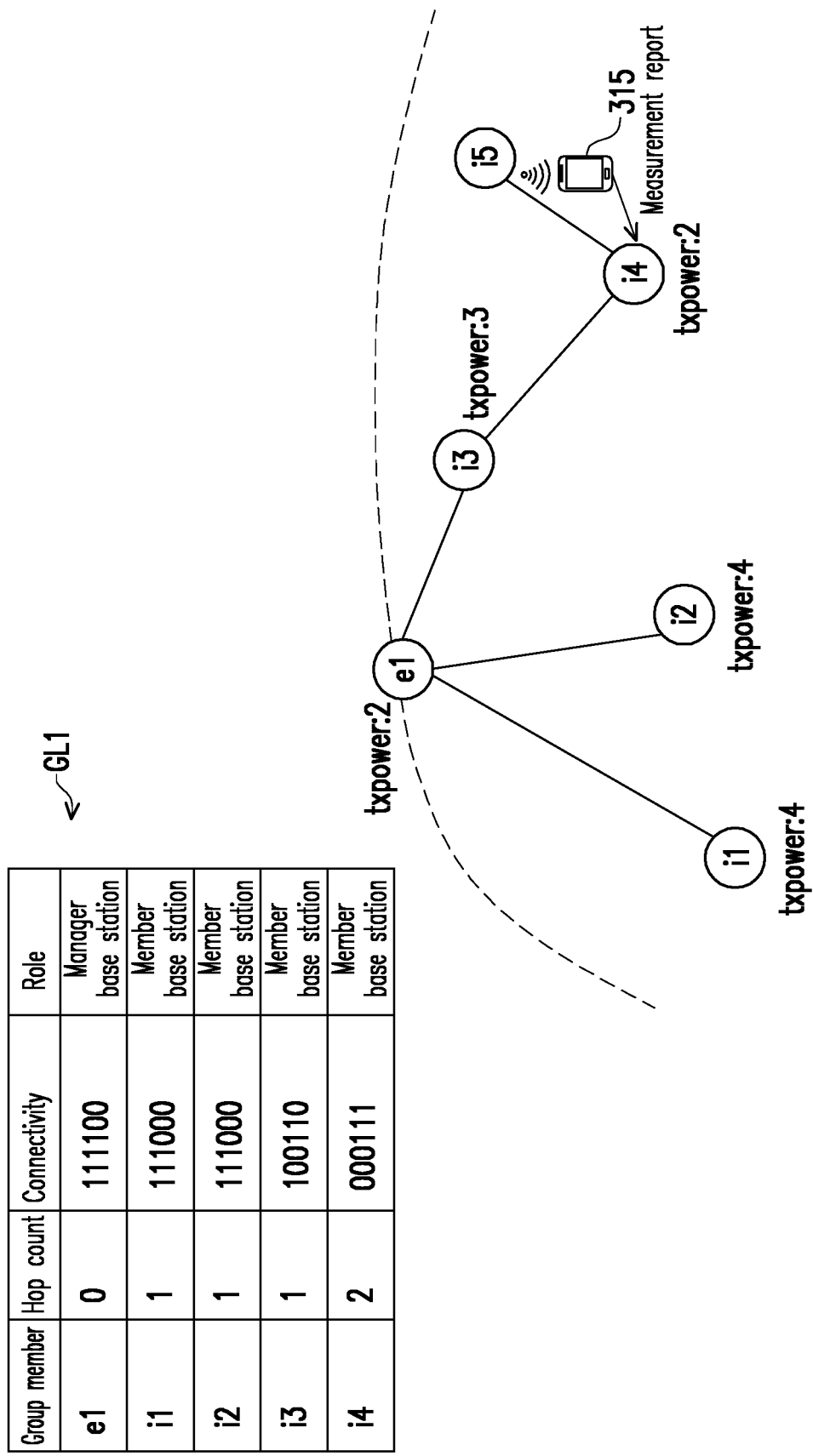

In the scenario of FIG. 3M, it is assumed that the base station i4 determines the base station i3 as strong interference. Then, the base station i4 may send the interference control message (that is, message 9) to the base station i3. Correspondingly, the base station i3 may update the interference list and reduce the transmission power (for example, from 4 dbm to 3 dbm) based on the strong interference indicated in the interference control message. Thereafter, the base station i3 may send the interference control response (that is, message 10) back to the base station i4 to inform the base station i4 of the related result, but the disclosure is not limited thereto. In this case, the interference of the base station i3 with respect to the UE 314 is reduced correspondingly, as shown in FIG. 3N.

In FIG. 3O, after the base station i4 increases the transmission power, it is assumed that the UE 315 is attached to the base station i4, and the base station i4 learns from the measurement report provided by the UE 315 that the neighboring base station i5 is present.

Figure 3P:
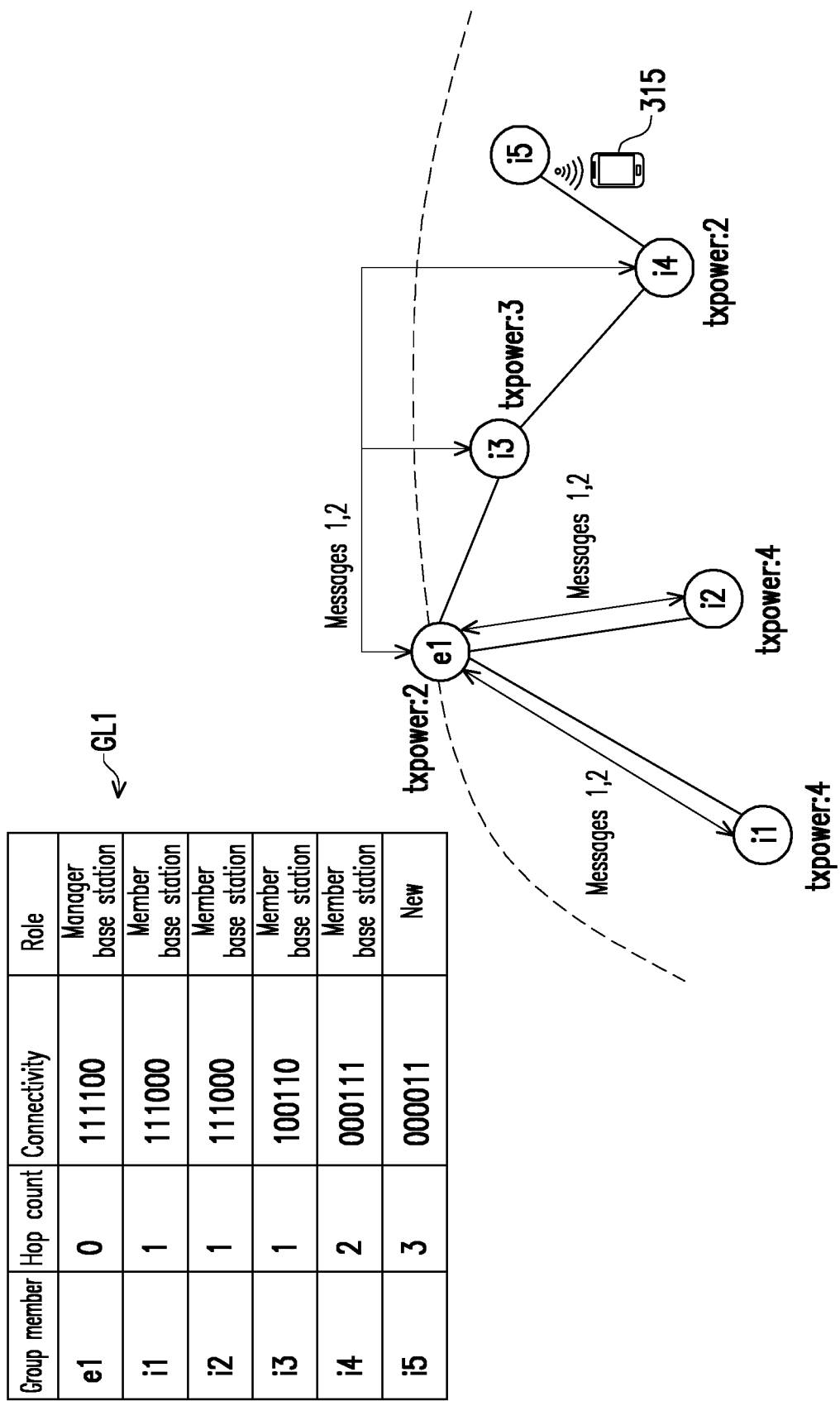
Figure 3Q:
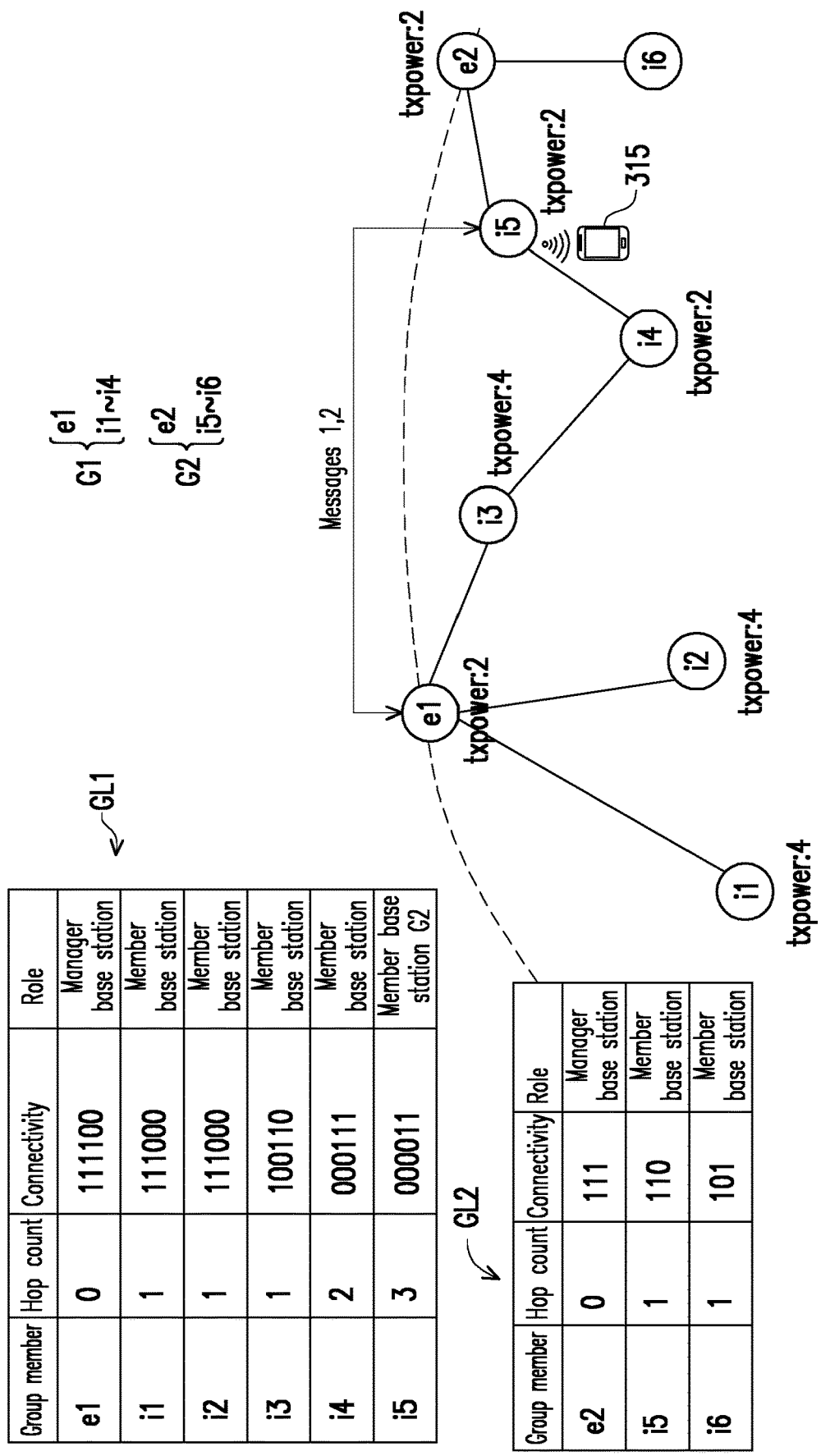

In FIG. 3P, the base station e1 may learn that the base station i5 is present through the member tracking response (that is, message 2) from the base station i4, and correspondingly send the member tracking message (that is, message 1) to the base station i5, as shown in FIG. 3Q. Details of the above FIG. 3O and FIG. 3P may be found in the descriptions of FIG. 3I and FIG. 3J and therefore will not be repeated here.

In FIG. 3Q, it is assumed that the base station i5 belongs to the base station group G2, wherein the base station group G2 may include the base station e2 (which is the edge base station) belonging to the manager base station and the base stations i5 to i6 belonging to the member base stations (wherein the base stations i5 and i6 are both inner base stations), and the group lists held by the base stations e2, i5, and i6 are as shown in the group list GL2 of FIG. 3Q. In this case, after receiving the member tracking message from the base station e1, the base station i5 may correspondingly send the member tracking response (that is, message 2) back to the base station e1. Correspondingly, the base station e1 may learn that the base station i5 belongs to the base station group G2 based on the non-empty group list GL2 in the member tracking response sent back by the base station i5, and merge the base station groups G1 and G2 correspondingly (step S250).

Figure 3R:
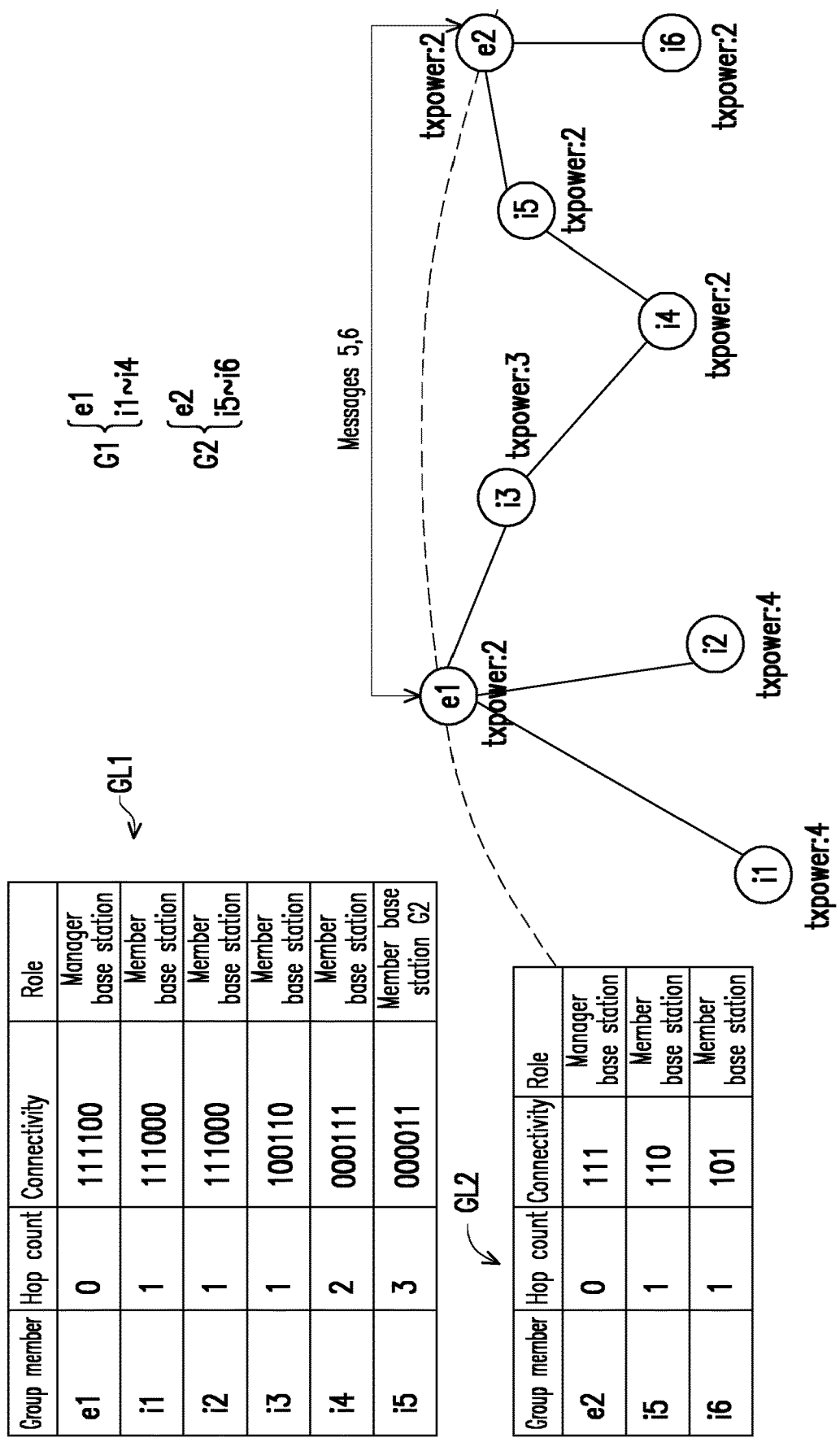
Figure 3S:
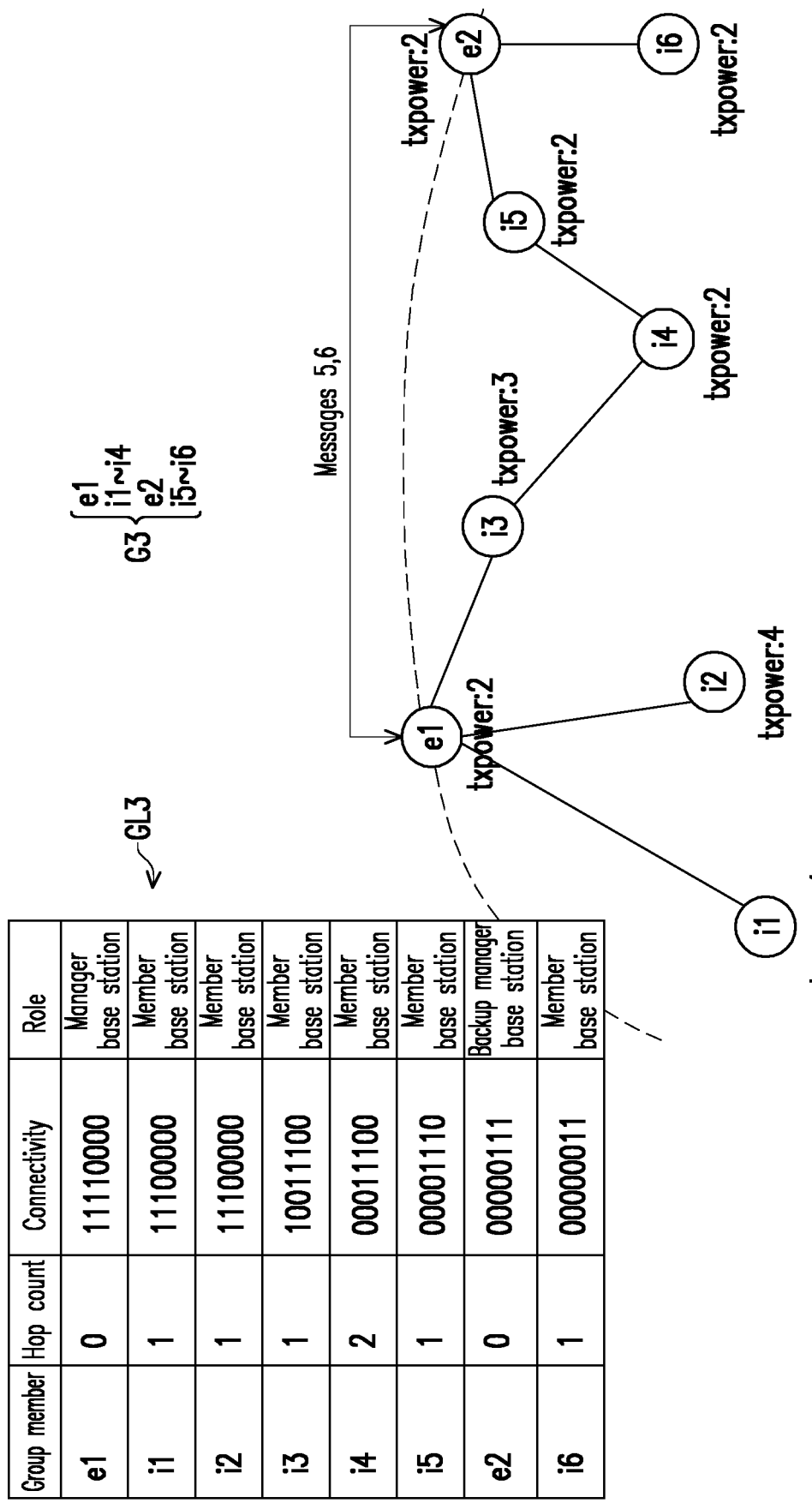

In FIG. 3R, in the process of merging the base station groups G1 and G2, the base station e1 may determine whether the number of base stations in the group list GL1 is greater than the number of base stations in the group list GL2. In the scenario of FIG. 3R, since the number of base stations in the group list GL1 (that is, 5) is greater than the number of base stations in the group list GL2 (that is, 3), the base station e1 may send the group merger request (that is, message 5) to the base station e2. Correspondingly, the base station e2 may send back the group merger response (that is, message 6), and the base station e1 may merge the base station group G1 and the base station group G2 into the base station group G3 (which includes the base stations e1, e2, and i1 to i6) managed by the base station e1 based on the group lists GL2 and GL1, and correspondingly update the group list GL1 to the group list GL3 corresponding to the base station group G3, as shown in FIG. 3S. In addition, in FIG. 3S, the base station e1 may set the base station e2 as the backup manager base station of the base station group G3.

In other embodiments, it is assumed that the number of base stations in the group list GL1 is not greater than the number of base stations in the group list GL2. Then, the base station e1 may also send the group merger request to the base station e2 to merge the base station groups G1 and G2 into the base station group G3, except that the base station group G3 may be managed by the base station e2, but the disclosure is not limited thereto. Thereafter, the base station e1 may send back the group merger response to the base station e2 in response to the group merger request. Next, the base station e2 may merge the base station group G1 and the base station group G2 into the base station group G3 managed by the base station e2 based on the group lists GL2 and GL1, wherein the base station group G3 may include the base stations e1, e2, and i1 to i6. In this case, the base station e2 may set the base station e1 as the backup manager base station of the base station group G3. In short, the manager base station of the base station group formed after merger may be the manager base station that originally manages more member base stations, and the edge base station that originally manages fewer member base stations may become the backup manager base station, but the disclosure is not limited thereto.

Figure 3T:
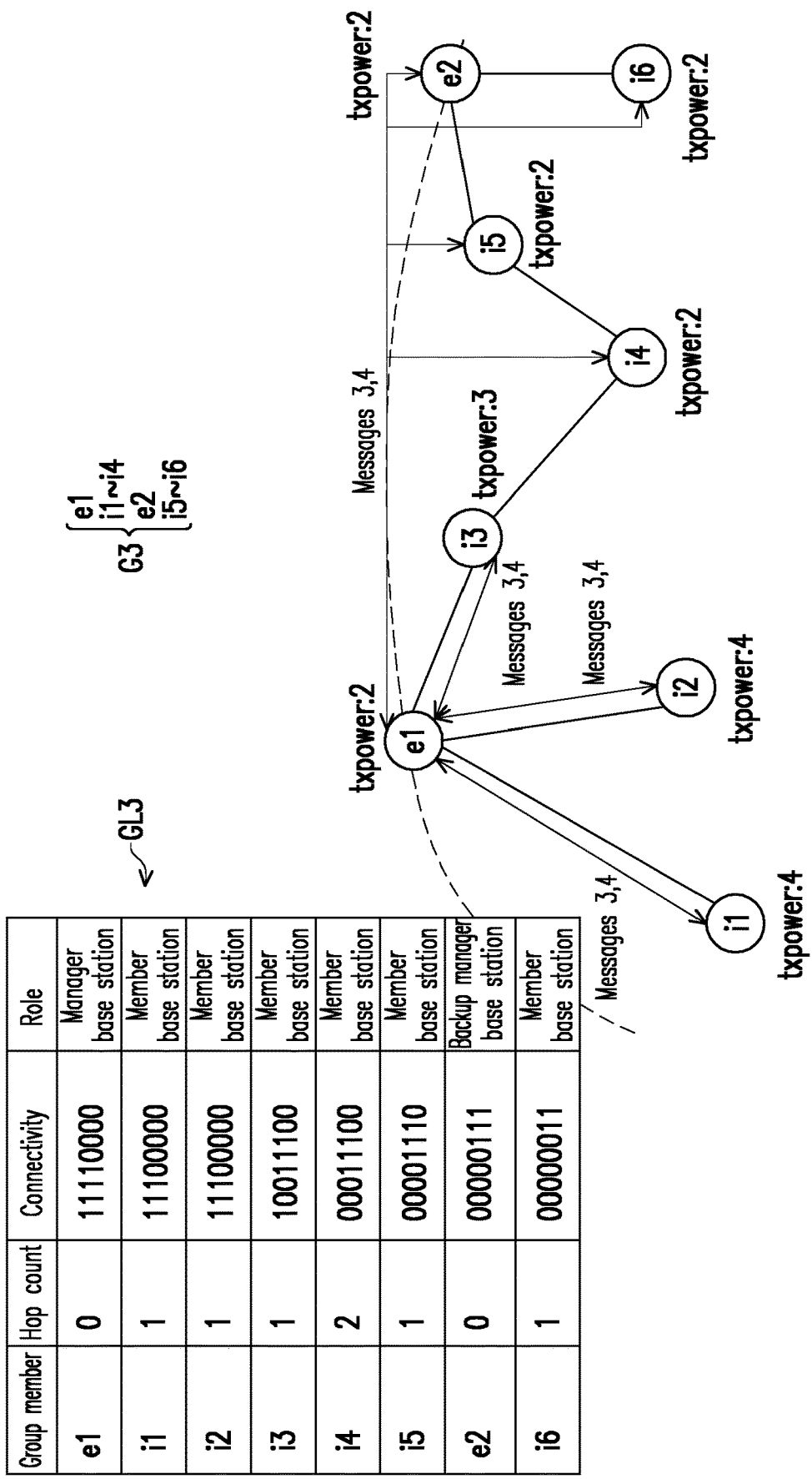

Thereafter, in FIG. 3T, the base station e1 that manages the base station group G3 may send the update message including the group list GL3 (that is, message 3) to the base stations e2 and i1 to i6. After updating the group lists thereof, the base stations e2 and i1 to i6 may send the update response message (that is, message 4) back to the base station e1 correspondingly.

Figure 3U:
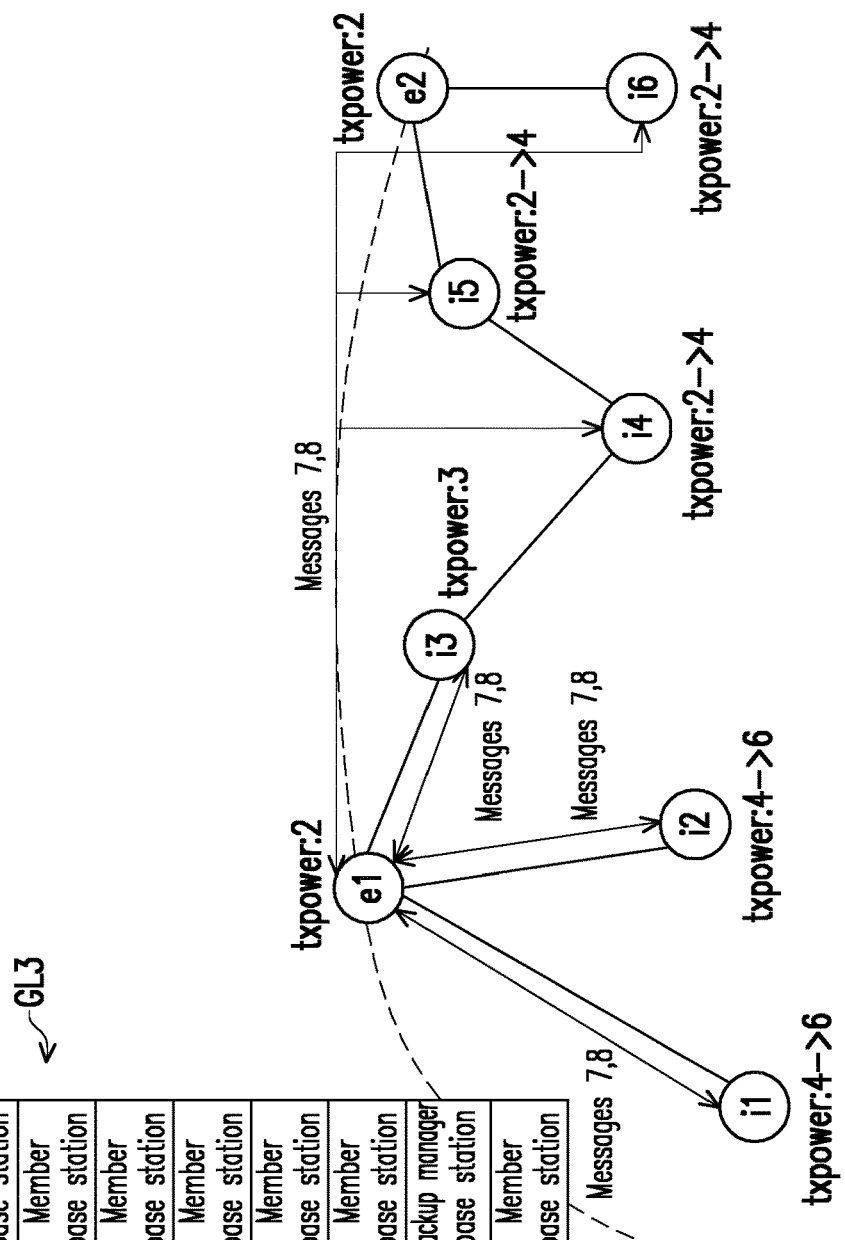
Figure 3V:
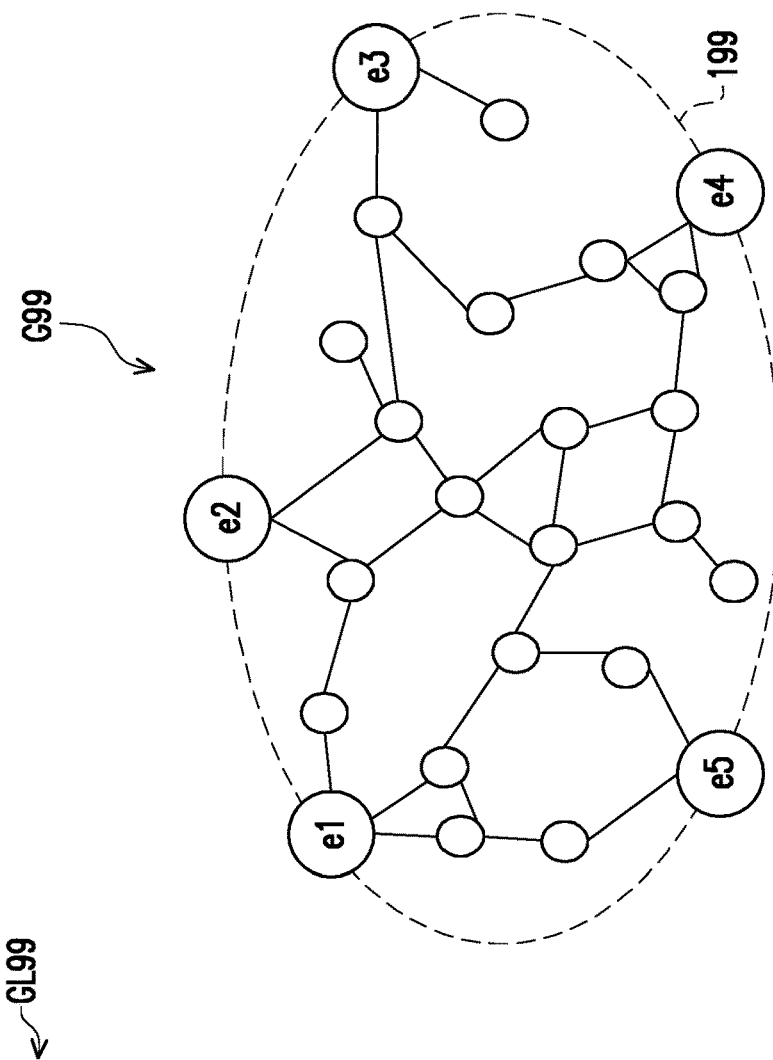

Then, in FIG. 3U, since the number of edge base stations in the base station group G3 is still smaller than the number threshold (for example, 5), the base station e1 may request the base stations e2 and i1 to i6 to increase the transmission power through the power control message (that is, message 7) to try to include more edge base stations/inner base stations in the base station group G3.

In other embodiments, the above mechanism continues until a certain edge base station in the service range 199 determines that the number of edge base stations in the base station group managed by it is not smaller than the number threshold (for example, 5), or all the member base stations in the base station group refuse to adjust the transmission power.

In FIG. 3V, as time goes on, it is assumed that the group list corresponding to the base station group G99 managed by the base station e1 is the group list GL99 as shown. It can be seen from the group list GL99 that the number of edge base stations in the base station group G99 has reached the number threshold. Therefore, the base station e1 may stop requesting the member base stations managed by the base station e1 to adjust the transmission power. In this case, the overall coverage formed by the base station group G99 better covers the service range 199 with fewer coverage holes and interference, thereby providing a better transmission experience for the user equipment.

It can be seen from the above that the method of the disclosure allows each manager base station to gradually adjust the transmission power of each member base station based on the measurement report provided by the UE in a distributed manner without the location of the base station and the location of the UE, so that the formed overall coverage better covers the service range with fewer coverage holes and interference. In this way, the user equipment is provided with a better transmission experience at lower costs.

In some embodiments, in the process that the manager base station manages the base station group, since the location of each base station in the base station group may change according to the requirements of the network administrator, the base station topology established according to the above teaching and the neighbor relation between the base stations may also change correspondingly. In different embodiments, changes of the base station topology roughly include: (1) removing an inner base station; (2) adding an inner base station; (3) moving an inner base station; (4) removing an edge base station; (5) adding an edge base station; and (6) moving an edge base station. The operations performed when the above changes occur will be described hereinafter.

Referring to FIG. 4A to FIG. 4F, FIG. 4A to FIG. 4F are diagrams showing application scenarios where an inner base station is removed according to the first embodiment of the disclosure. In detail, in FIG. 4A, it is assumed that the base station group G1 managed by the base station e1 includes the base stations e1, e2, and i1 to i6, and the group list corresponding to the base station group G1 is the group list GL1 as shown. In this case, it is assumed that a network administrator 499 gives a shutdown instruction to the base station i3 belonging to the inner base station category, and the base station i3 is to be shut down correspondingly.

Figure 4A:
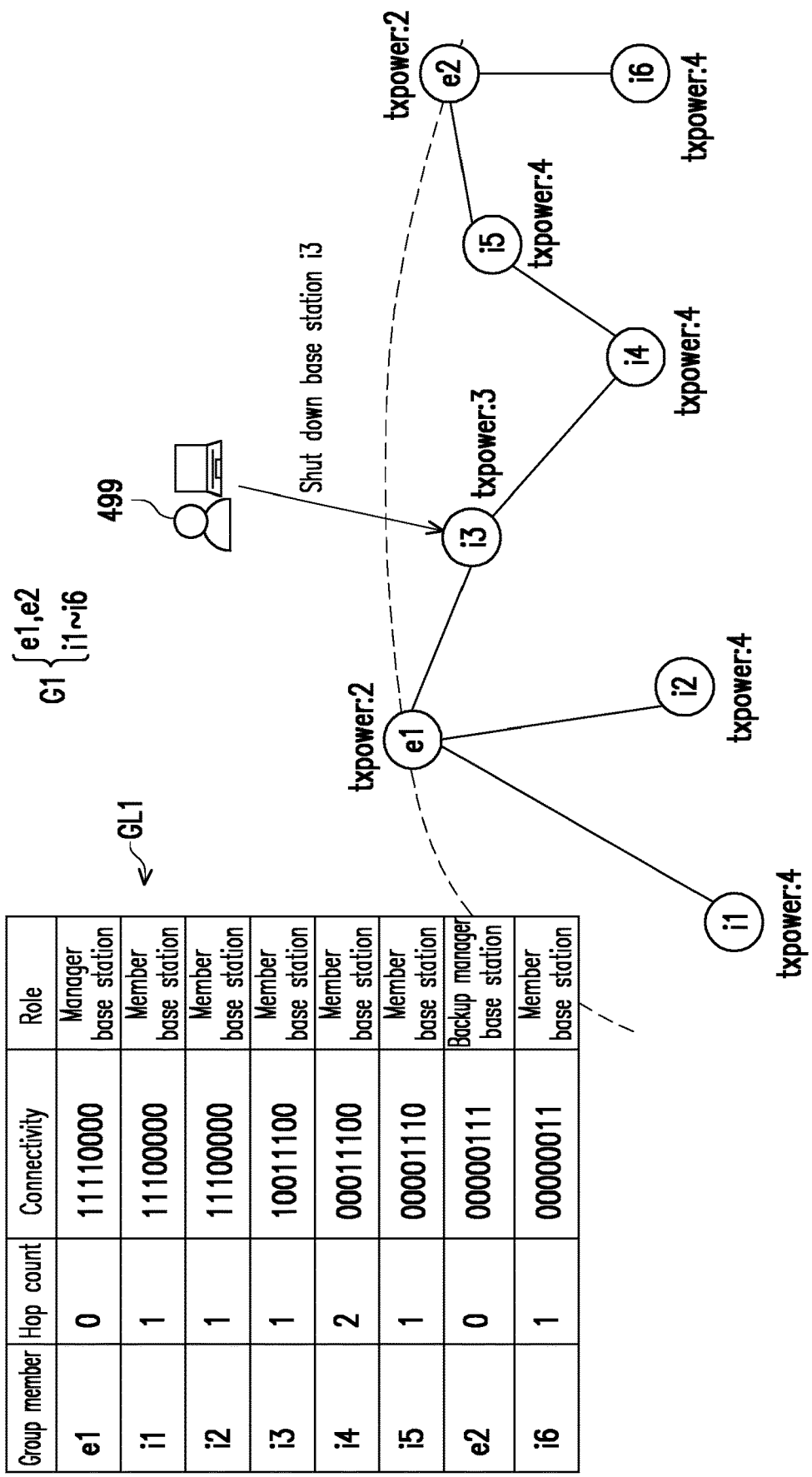
FIG. 4A to FIG. 4F are diagrams showing application scenarios where an inner base station is removed according to the first embodiment of the disclosure.
Figure 4B:
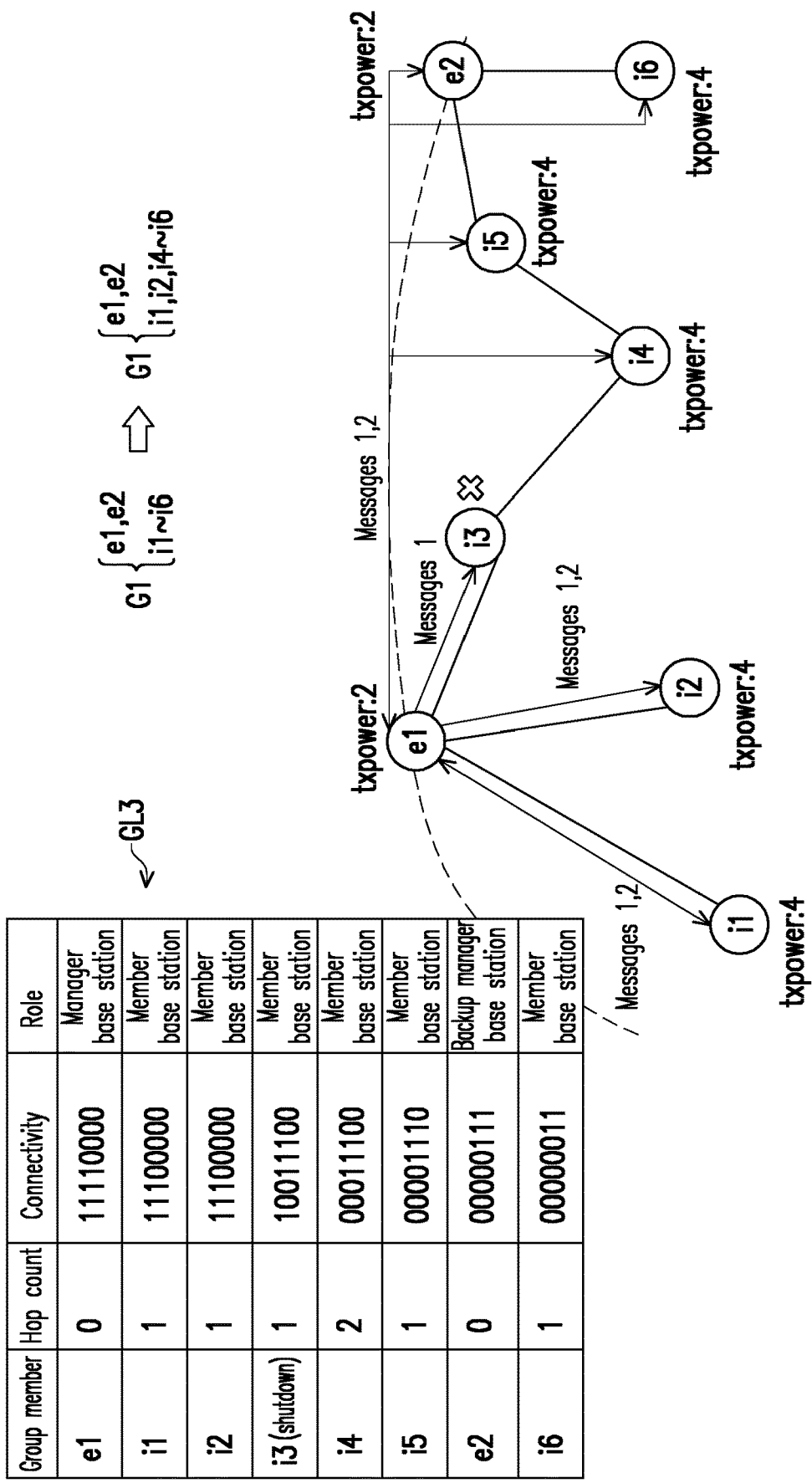

Then, as mentioned previously, the base station e1 sends the member tracking message (that is, message 1) to the base stations e2 and i1 to i6 regularly or irregularly, wherein the base stations e2, i1, i2, and i4 to i6 may correspondingly send the member tracking response (message 2) back to the base station e1, but the base station i3 is shut down and cannot send the member tracking response back to the base station e1, as shown in FIG. 4B.

In the first embodiment, in response to determining that the number of times of not receiving the corresponding member tracking response from the base station i3 reaches a preset number of times (for example, 3 times), the base station e1 may correspondingly remove the base station i3 from the base station group G1. Thereafter, the base station e1 may find the member base stations still connected to the base station e1 among the base stations e2, i1, i2, and i4 to i6 based on the connectivity between the base station e1 and the base stations e2, i1, i2, and i4 to i6.

Figure 4C:
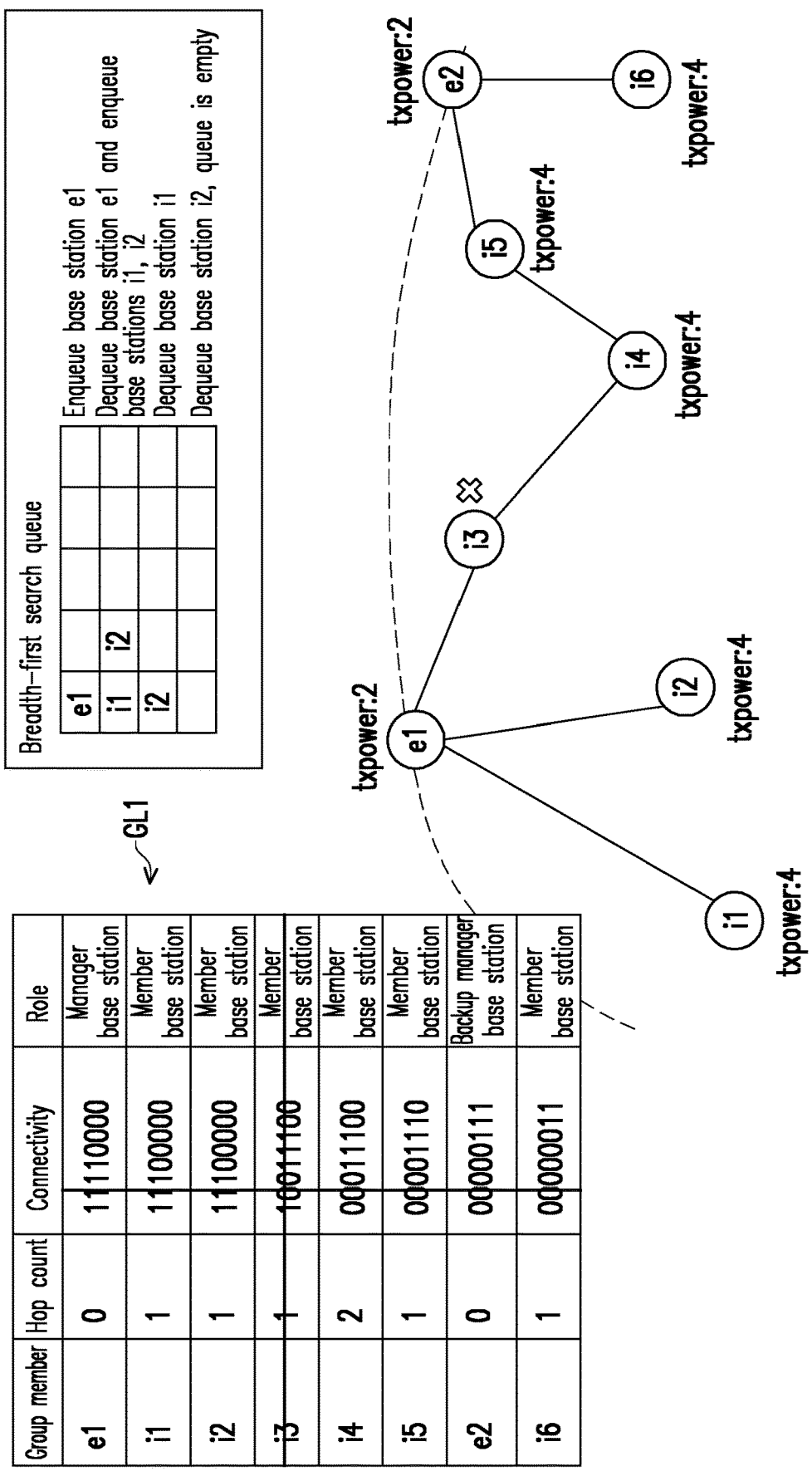
Figure 4D:
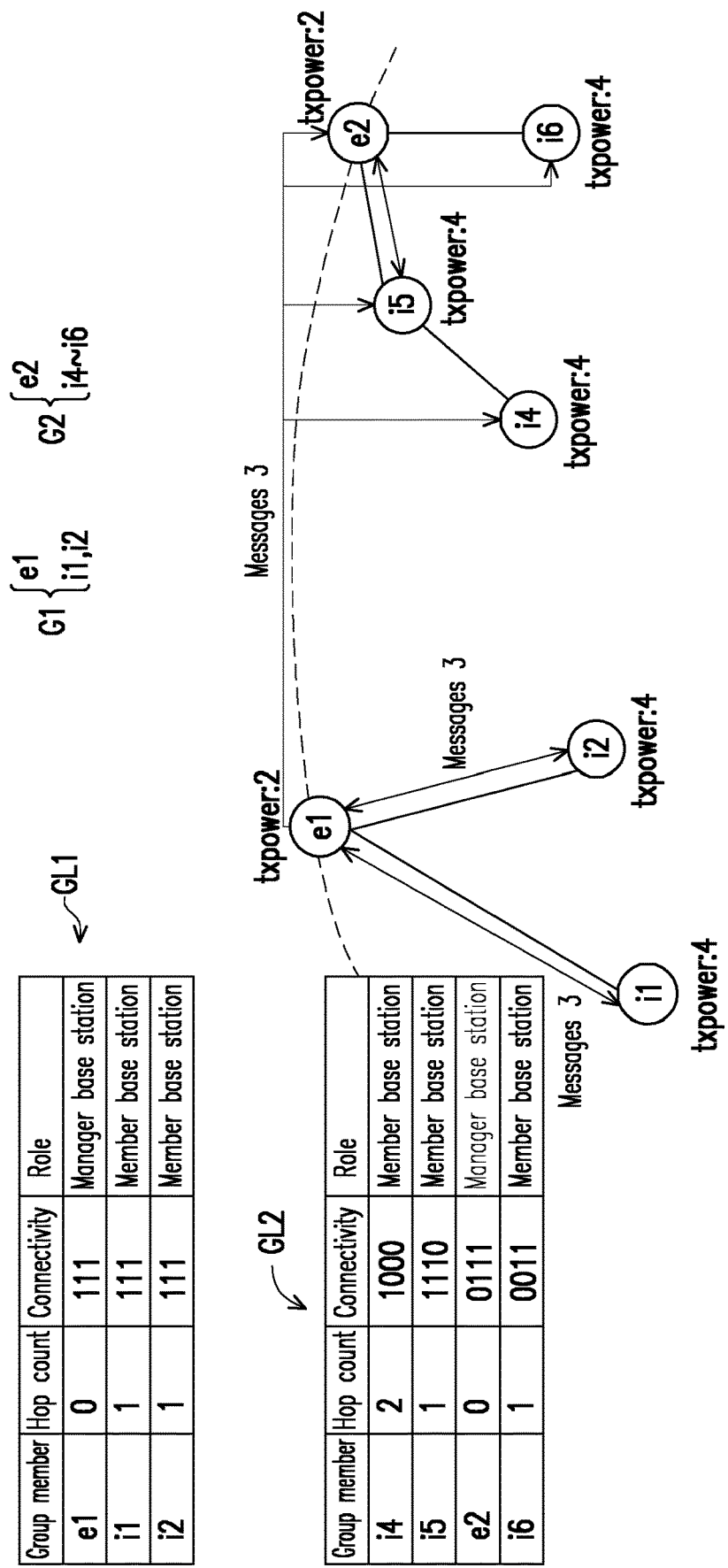

In FIG. 4C, the base station e1 may find the member base stations still connected to the base station e1 based on a breadth-first search algorithm, for example. For example, the base station e1 may perform the following: creating an empty breadth-first search queue, and enqueuing the base station e1; removing the base station e1 from the breadth-first search queue, and adding the base stations i1 and i2 directly connected to the base station e1 into the breadth-first search queue; removing the base station i1 from the breadth-first search queue, and adding the base station (not present) directly connected to the base station i1 into the breadth-first search queue; and removing the base station i2 from the breadth-first search queue, and adding the base station (not present) directly connected to the base station i2 into the breadth-first search queue. After the base station i2 is removed from the breadth-first search queue, the breadth-first search queue becomes empty again. Therefore, the base station e1 may correspondingly determine that the base stations i1 and i2 are still connected to the base station e1, and update the base station group G1 and the corresponding group list GL1 accordingly, as shown in FIG. 4D.

In addition, the base station e1 may execute the breadth-first search algorithm again from the base station i4 to find other base stations (that is, base stations e2, i5, and i6) that are still connected to the base station i4. Thereafter, the base station e1 may establish the base station group G2 including the base stations e2 and i4 to i6, and create the group list GL2 corresponding to the base station group G2, as shown in FIG. 4D. In the group list GL2, the base station e1 may set any one of the edge base stations (for example, base station e2) as the manager base station that manages the base station group G2, but the disclosure is not limited thereto.

Thereafter, the base station e1 may send the group list GL1 with the corresponding update message (that is, message 3) to the base stations i1 and i2 belonging to the base station group G1 for the base stations i1 and i2 to update the group lists thereof correspondingly. In addition, the base station e1 may send the group list GL2 with the corresponding update message (that is, message 3) to the base stations e2 and i4 to i6 belonging to the base station group G2 for the base stations e2 and i4 to i6 to update the group lists thereof correspondingly.

Figure 4E:
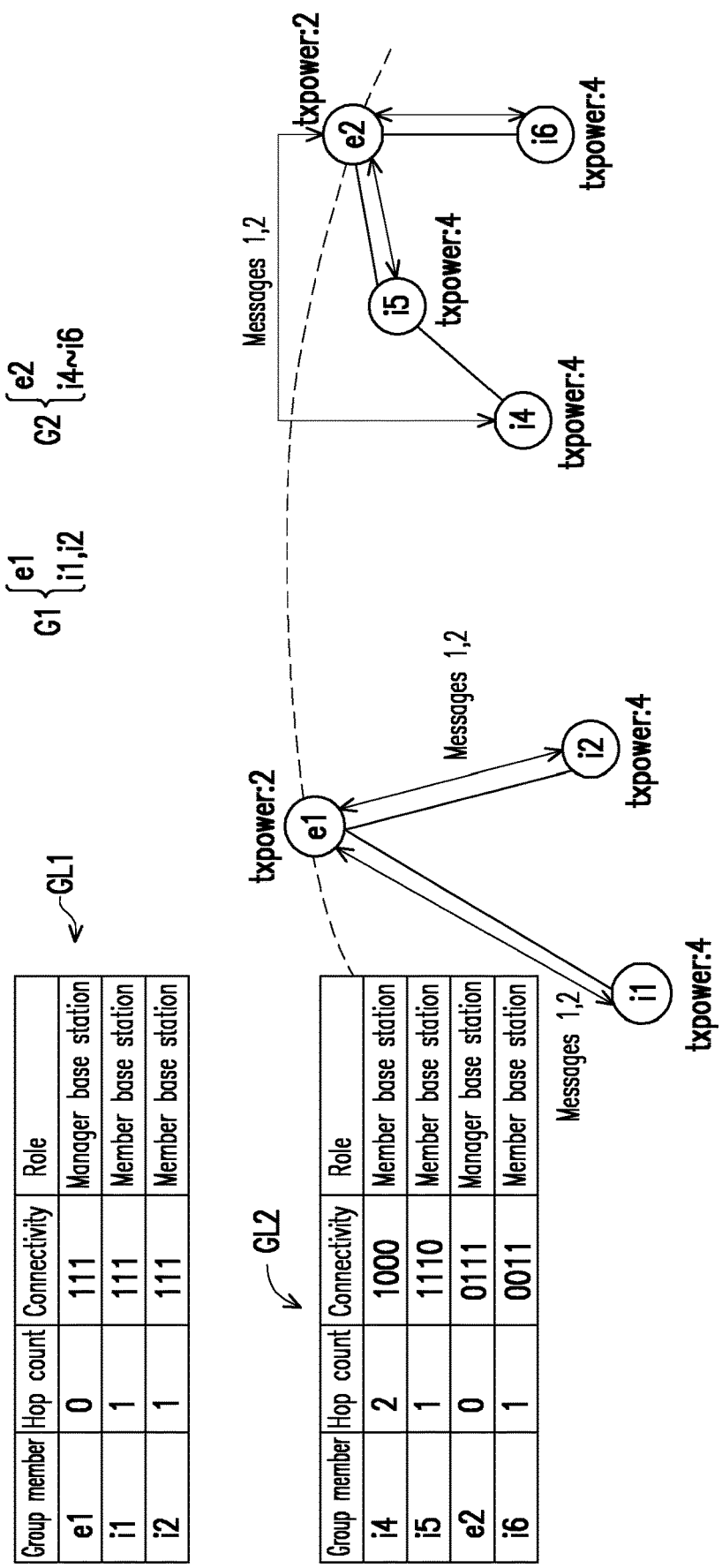

In FIG. 4E, the base station e1 that manages the base station group G1 may send the member tracking message (that is, message 1) to the base stations i1 and i2 belonging to the base station group G1, and the base stations i1 and i2 may correspondingly send the member tracking response (that is, message 2) back to the base station e1. Similarly, the base station e2 that manages the base station group G2 may send the member tracking message to the base stations i4 to i6 belonging to the base station group G2, and the base stations i4 to i6 may correspondingly send the member tracking response (that is, message 2) back to the base station e2.

Figure 4F:
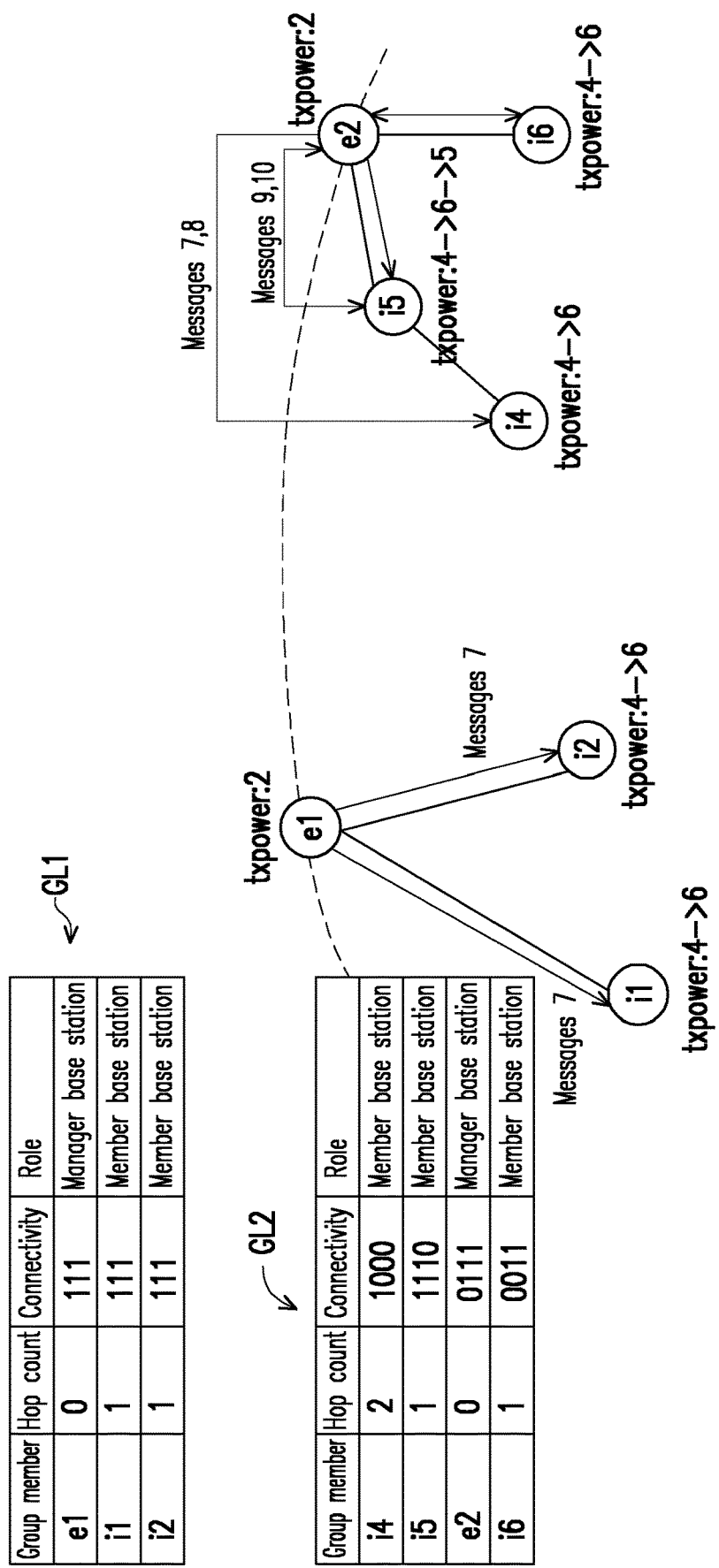

In FIG. 4F, the base stations e1, i1, and i2 in the base station group G1 may continue to operate according to various mechanisms taught previously. For example, the base station e1 may request the base stations i1 and i2 to increase the transmission power through the power control message (that is, message 7) to try to cover more UE. In addition, the base stations e2 and i4 to i6 in the base station group G2 may also continue to operate according to various mechanisms taught previously. For example, the base station e2 may request the base stations i4 to i6 to increase the transmission power through the power control message (that is, message 7) to try to cover more UE. In the scenario of FIG. 4F, it is assumed that interference occurs between the base stations e2 and i5. Then, the base stations e2 and i5 may also reduce the power through the interference control message (that is, message 9) according to the above teaching (for example, the base station i5 may reduce the transmission power from 6 dbm to 5 dbm) to reduce the interference, but the disclosure is not limited thereto.

Referring to FIG. 5A to FIG. 5E, FIG. 5A to FIG. 5E are diagrams showing application scenarios where an inner base station is added according to the second embodiment of the disclosure. In the second embodiment, the scenario in FIG. 5A may be understood as the scenario that appears after FIG. 4F, but the disclosure is not limited thereto.

Figure 5A:
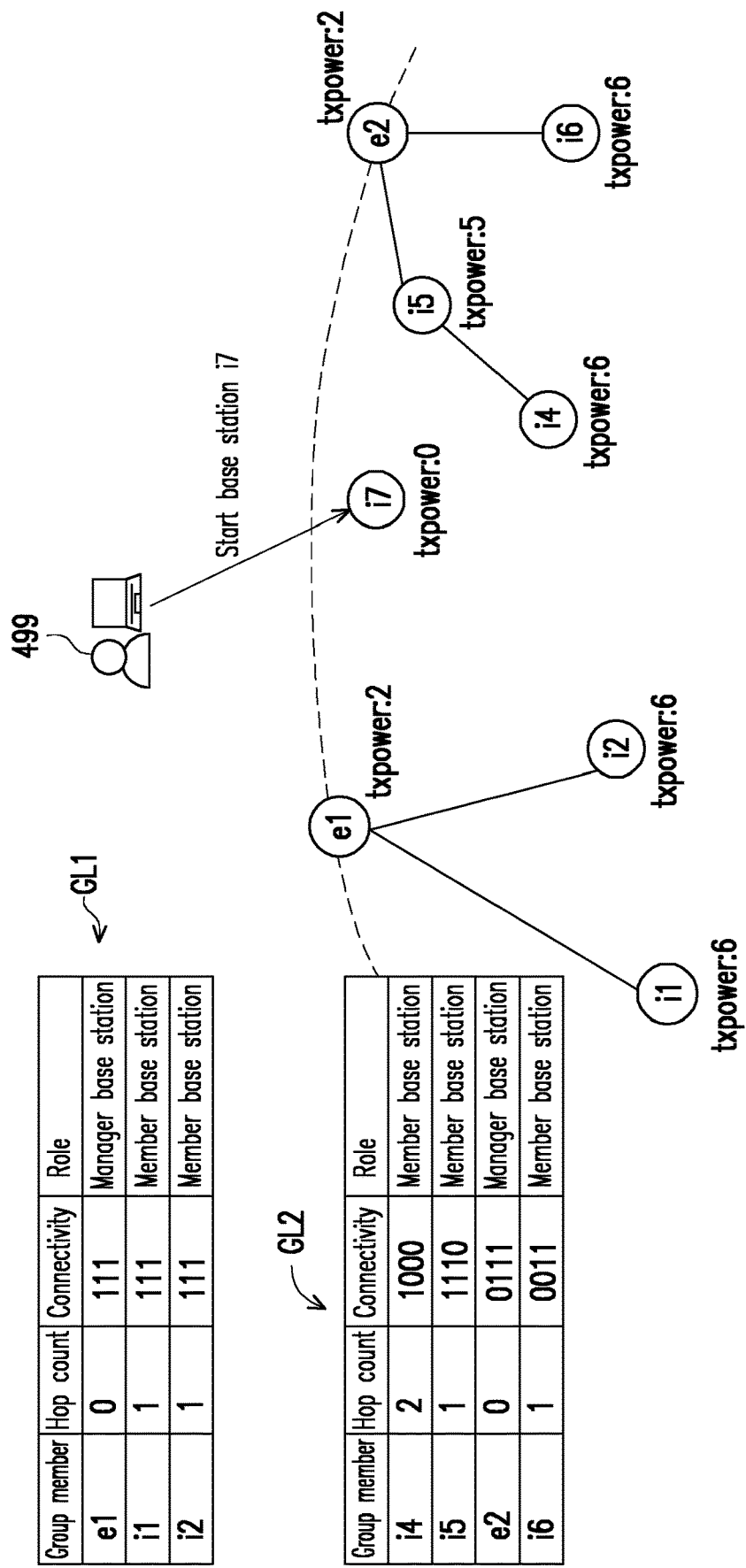
FIG. 5A to FIG. 5E are diagrams showing application scenarios where an inner base station is added according to the second embodiment of the disclosure.
Figure 5B:
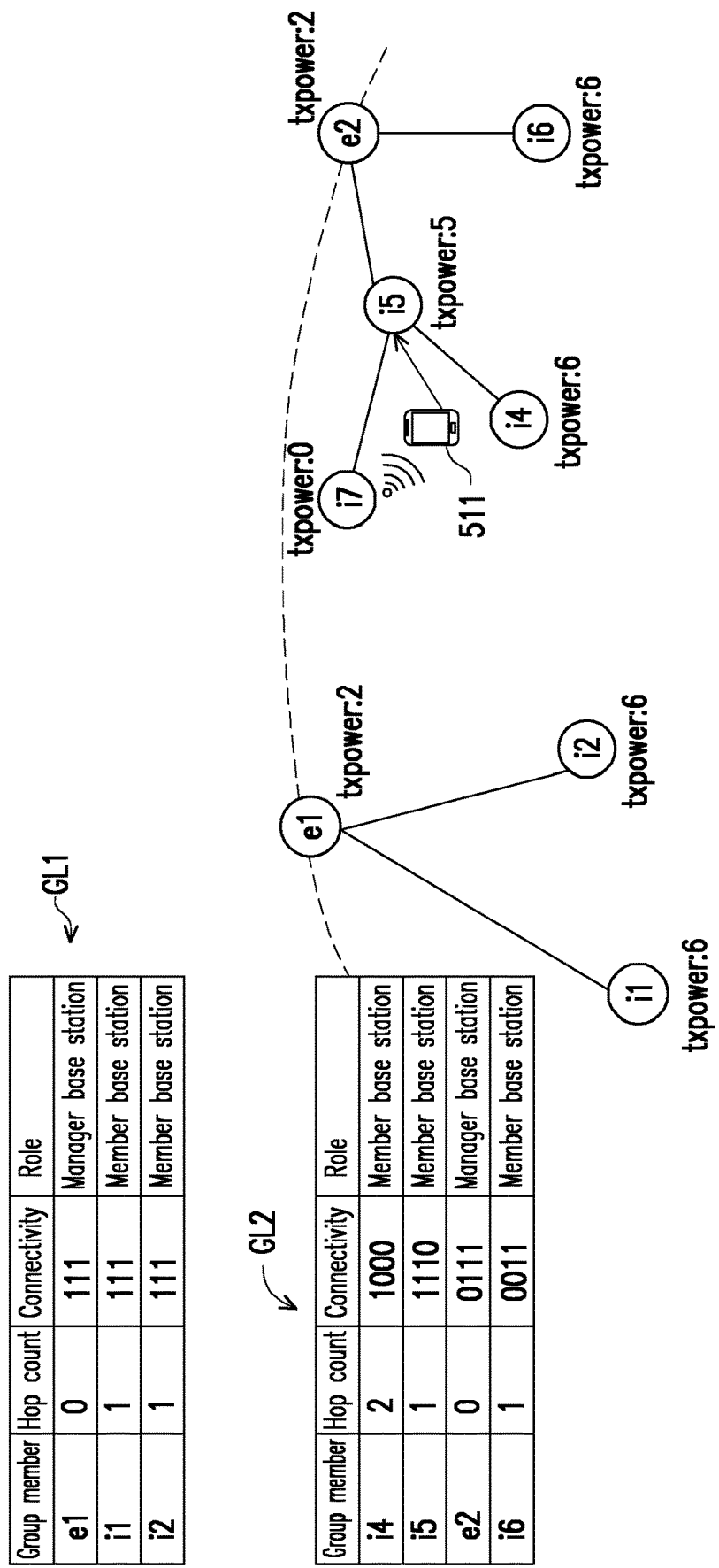

In FIG. 5A, it is assumed that the network administrator 499 sets the base station i7 belonging to the inner base station category in the location as shown and starts the base station i7. Thereafter, as shown in FIG. 5B, it is assumed that the base station i7 is detected by the UE 511 attached to the base station i5, and the base station i5 learns that the base station i7 is present through the measurement report provided by the UE 511 and records the base station i7 in the neighbor list of the base station i5.

Figure 5C:
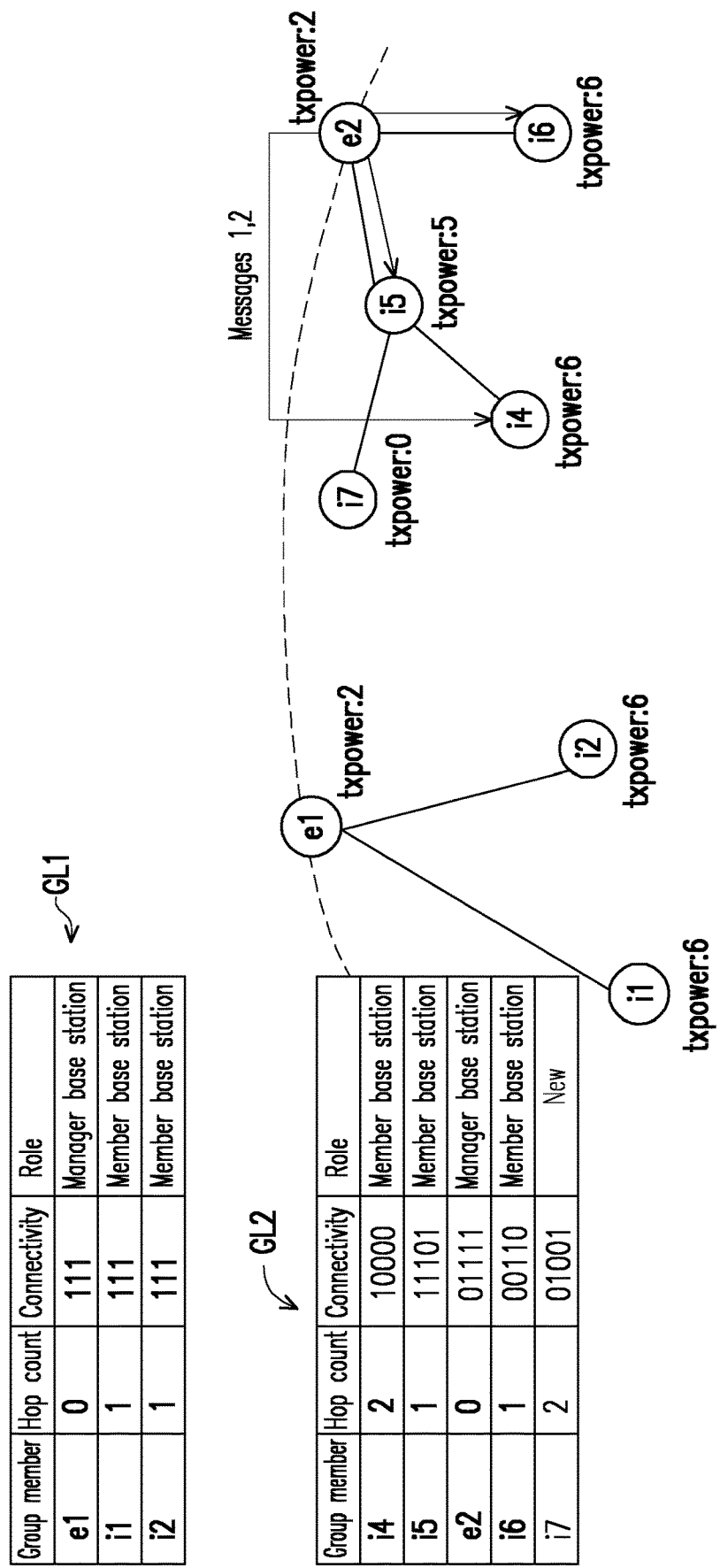

In FIG. 5C, the base station e2 may send the member tracking message (that is, message 1) to the base stations i4 to i6 managed by the base station e2. Thereafter, the base station e2 may learn that the base station i7 is present from the neighbor list in the member tracking response (that is, message 2) sent back by the base station i5.

Figure 5D:
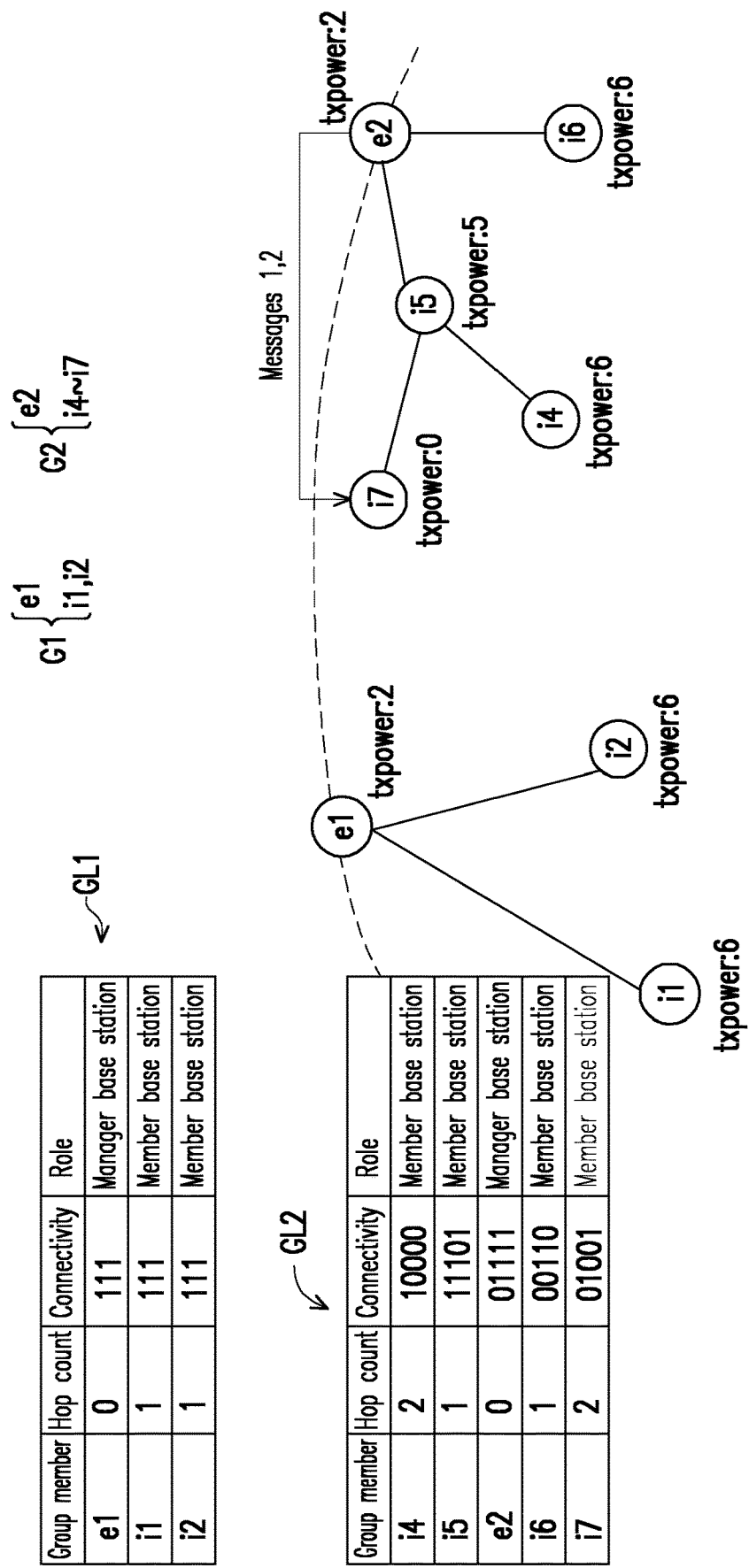

In FIG. 5D, the base station e2 may send the member tracking message (that is, message 1) to the base station i7. Thereafter, the base station e2 may learn that the base station i7 does not belong to any base station group from the empty group list in the member tracking response (that is, message 2) sent back by the base station i7. Therefore, the base station e2 may add the base station i7 to the base station group G2, and update the group list GL2 of the base station group G2 correspondingly.

Figure 5E:
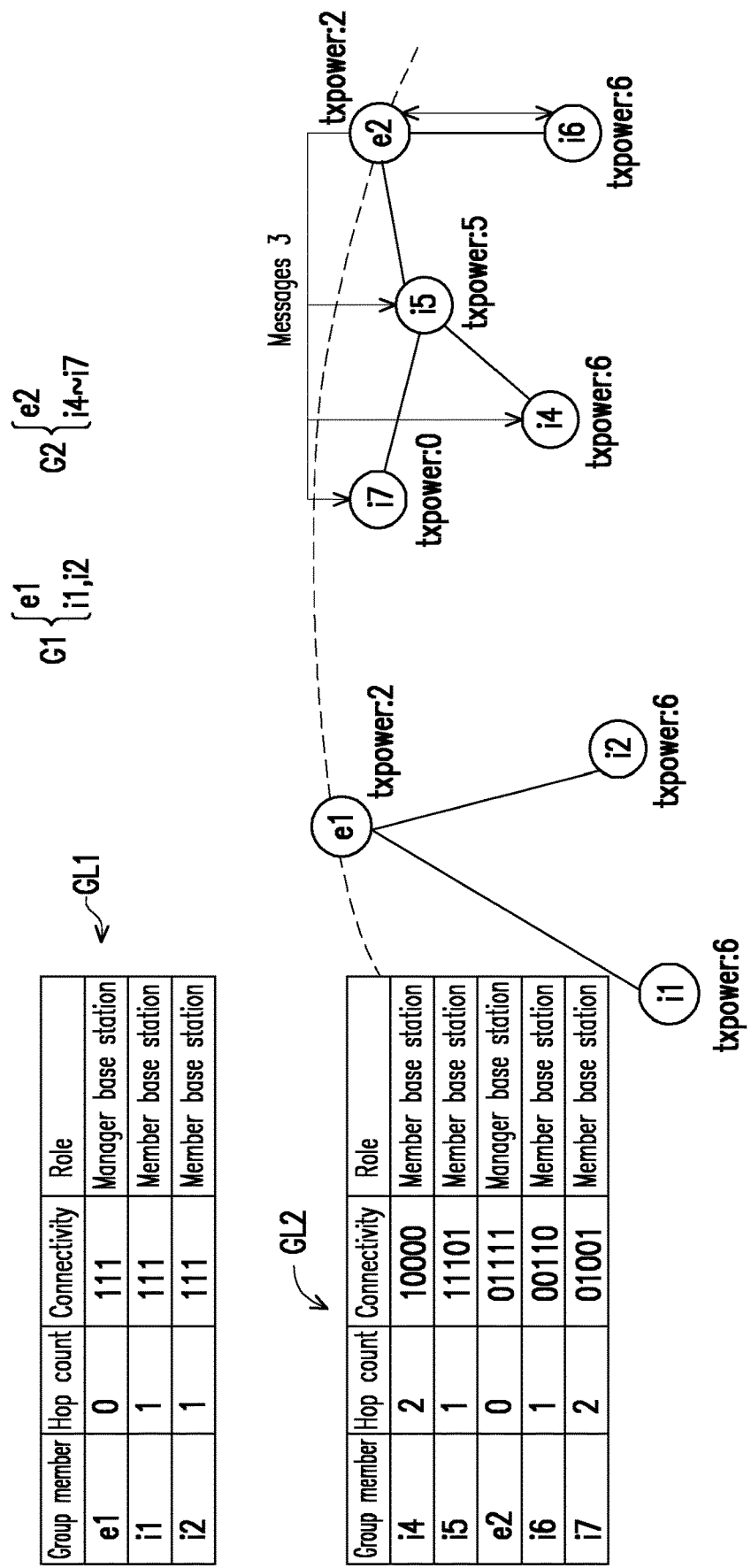

In FIG. 5E, the base station e2 may send the updated group list GL2 to the base stations i4 to i7 through the update message (that is, message 3), and the base stations i4 to i7 may correspondingly update the group lists thereof to the content of the group list GL2.

Referring to FIG. 6A to FIG. 6D, FIG. 6A to FIG. 6D are diagrams showing application scenarios where an inner base station is moved according to the third embodiment of the disclosure. In the third embodiment, the scenario in FIG. 6A may be understood as the scenario that appears after FIG. 5E, but the disclosure is not limited thereto.

Figure 6A:
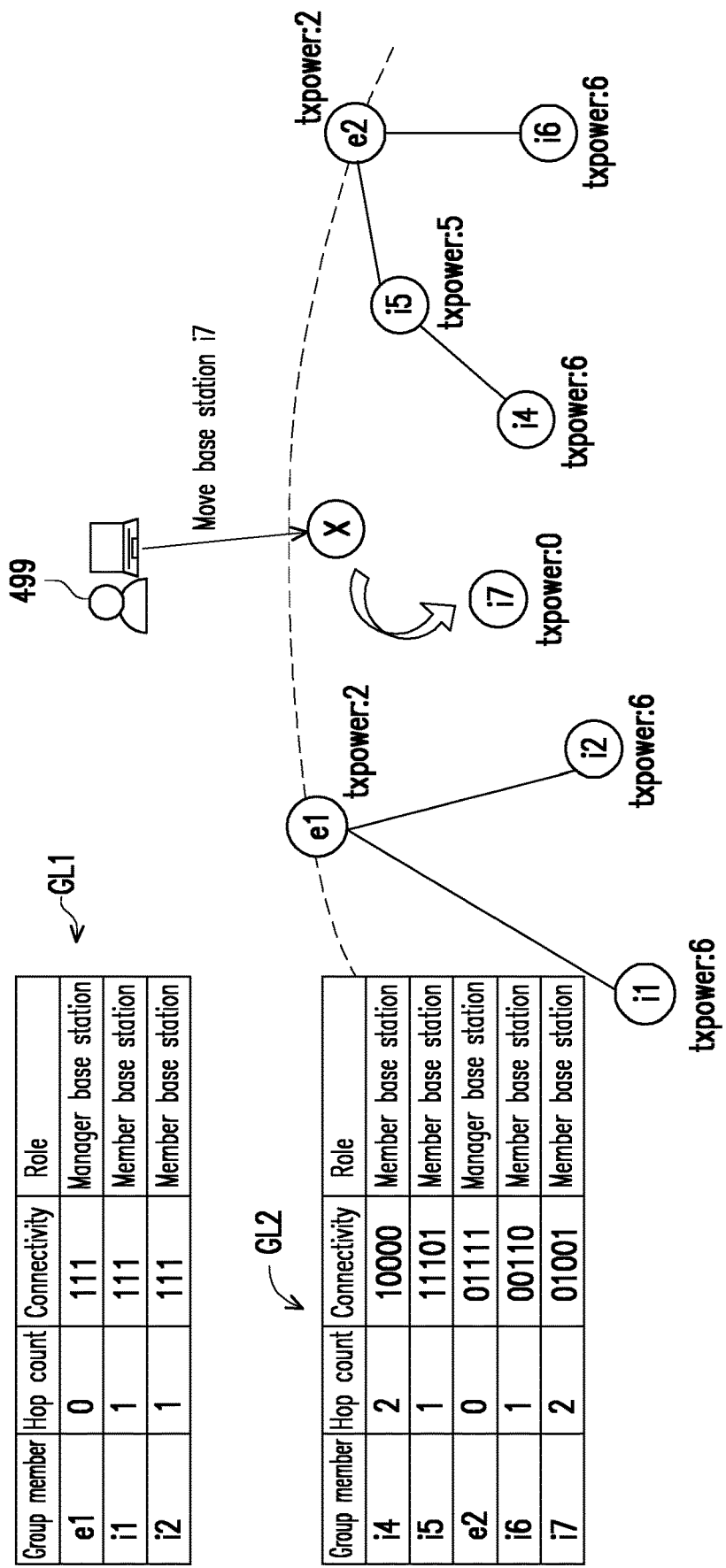
FIG. 6A to FIG. 6D are diagrams showing application scenarios where an inner base station is moved according to the third embodiment of the disclosure.

In FIG. 6A, it is assumed that the network administrator 499 intends to move the base station i7 belonging to the inner base station category to the location as shown. In this case, the network administrator 499 may set the base station i7 to a moved state, and move the base station i7 to the location shown in FIG. 6A and starts the base station i7. After being set to the moved state, the base station i7 may clear the group list, interference list, and neighbor list of the base station i7, and restore the transmission power of the base station i7 to a preset value (for example, 0 dbm).

Figure 6B:
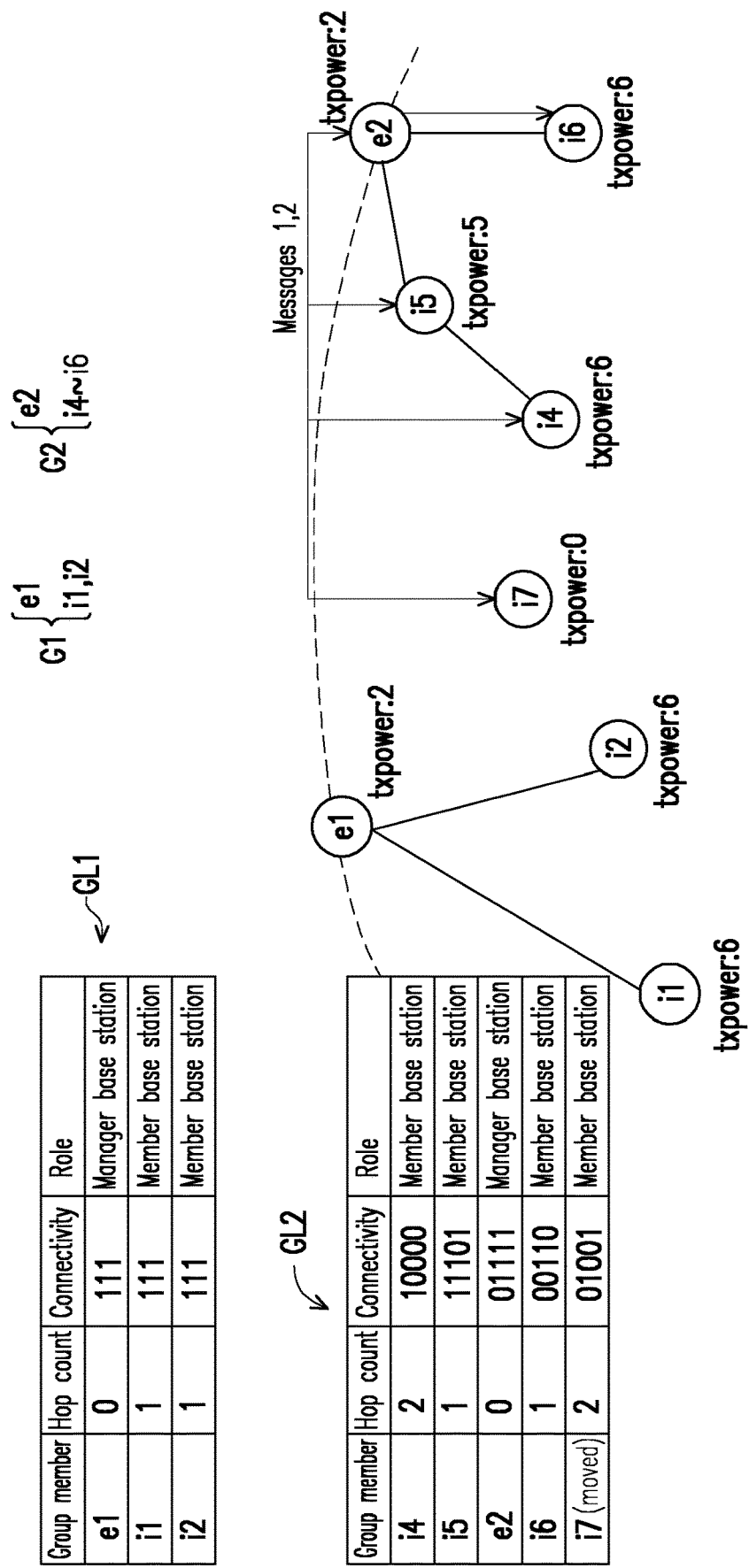

In FIG. 6B, the base station e2 may send the member tracking message (that is, message 1) to the base stations i4 to i7 managed by the base station e2. In the third embodiment, the base station e2 may learn that the base station i7 is in the moved state from the member tracking response (that is, message 2) sent back by the base station i7.

Figure 6C:
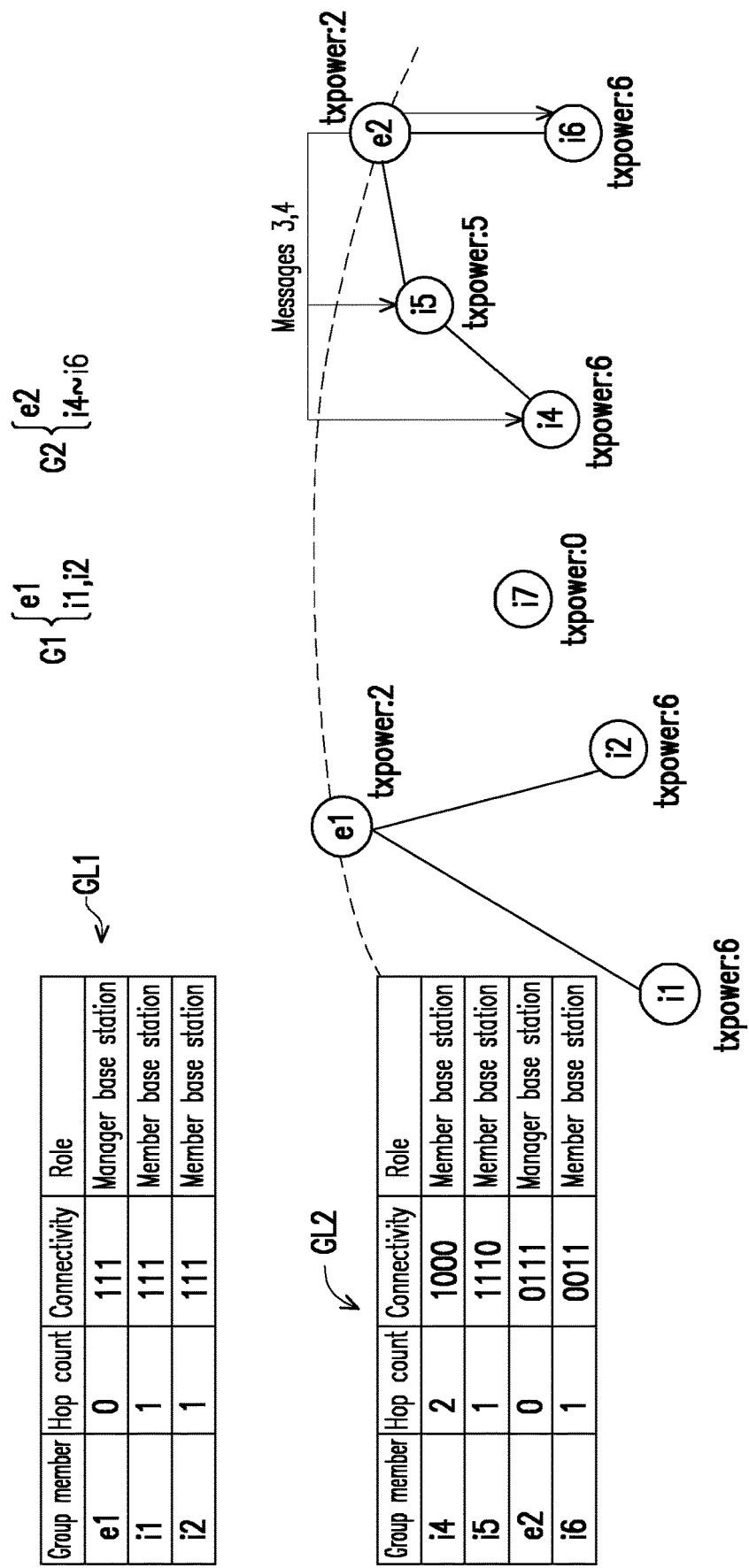

In this case, the base station e2 may move the base station i7 out of the base station group G2, and correspondingly update the group list GL2 to the content as shown in FIG. 6C. Thereafter, the base station e2 may send the updated group list GL2 to the base stations i4 to i6 through the update message (that is, message 3), and the base stations i4 to i6 may correspondingly update the group lists thereof to the content of the group list GL2.

Figure 6D:
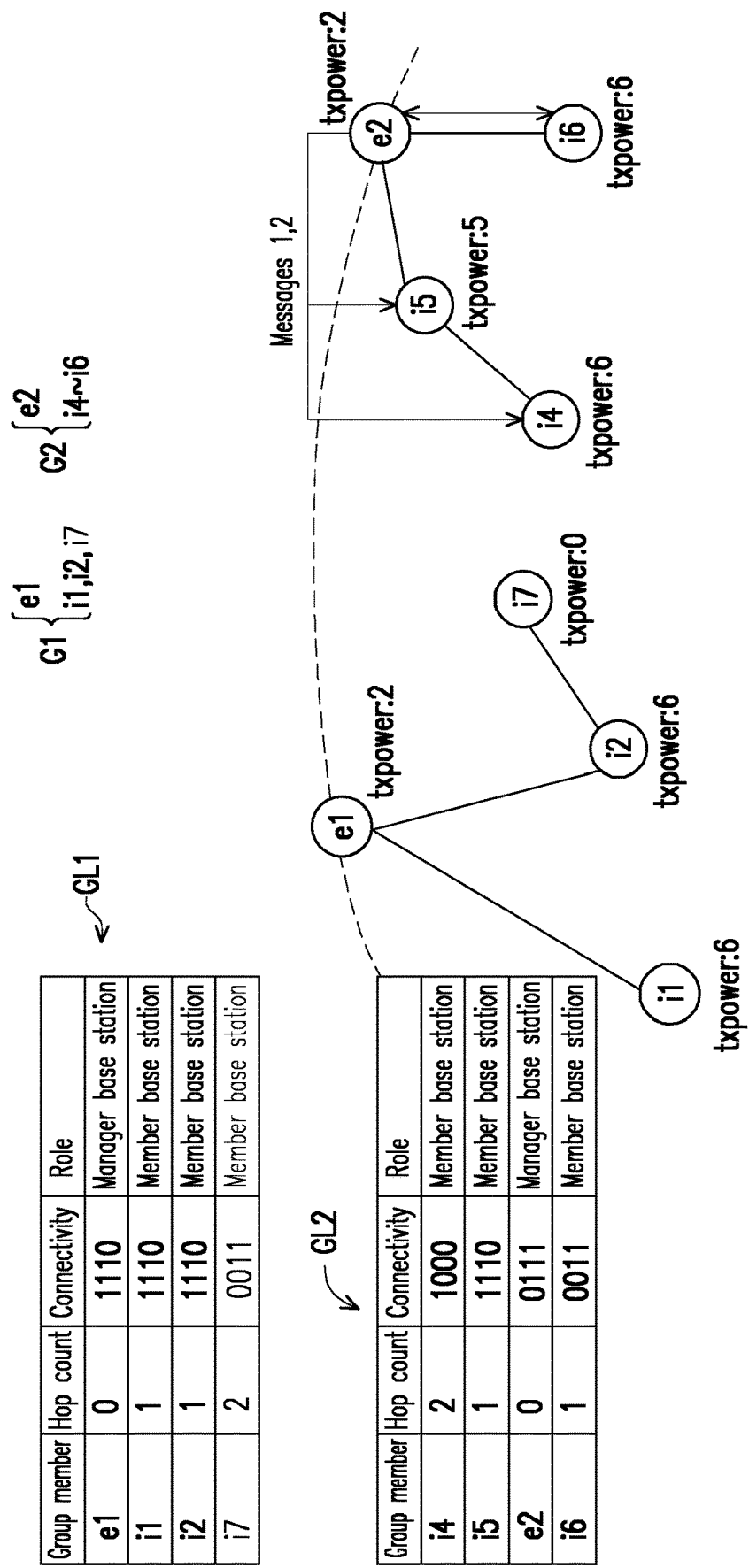

Next, in FIG. 6D, it is assumed that the base station i7 is detected by the UE (not marked) attached to the base station i2. Then, the base station e1 may add the base station i7 to the base station group G1 according to the above teaching. Details thereof will not be repeated here.

Figure 7A:
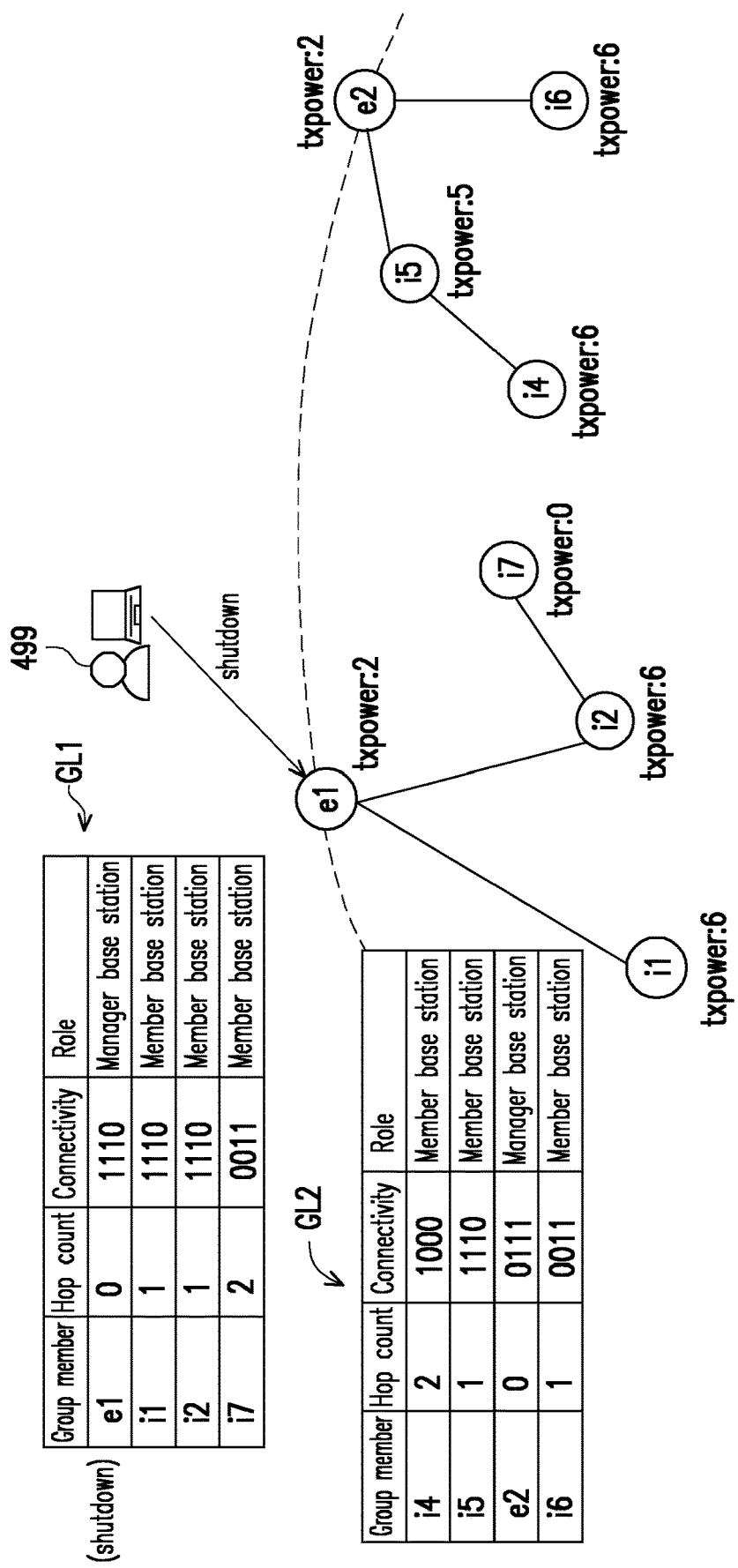
FIG. 7A to FIG. 7C are diagrams showing application scenarios where an edge base station is shut down according to the fourth embodiment of the disclosure.
Figure 7B:
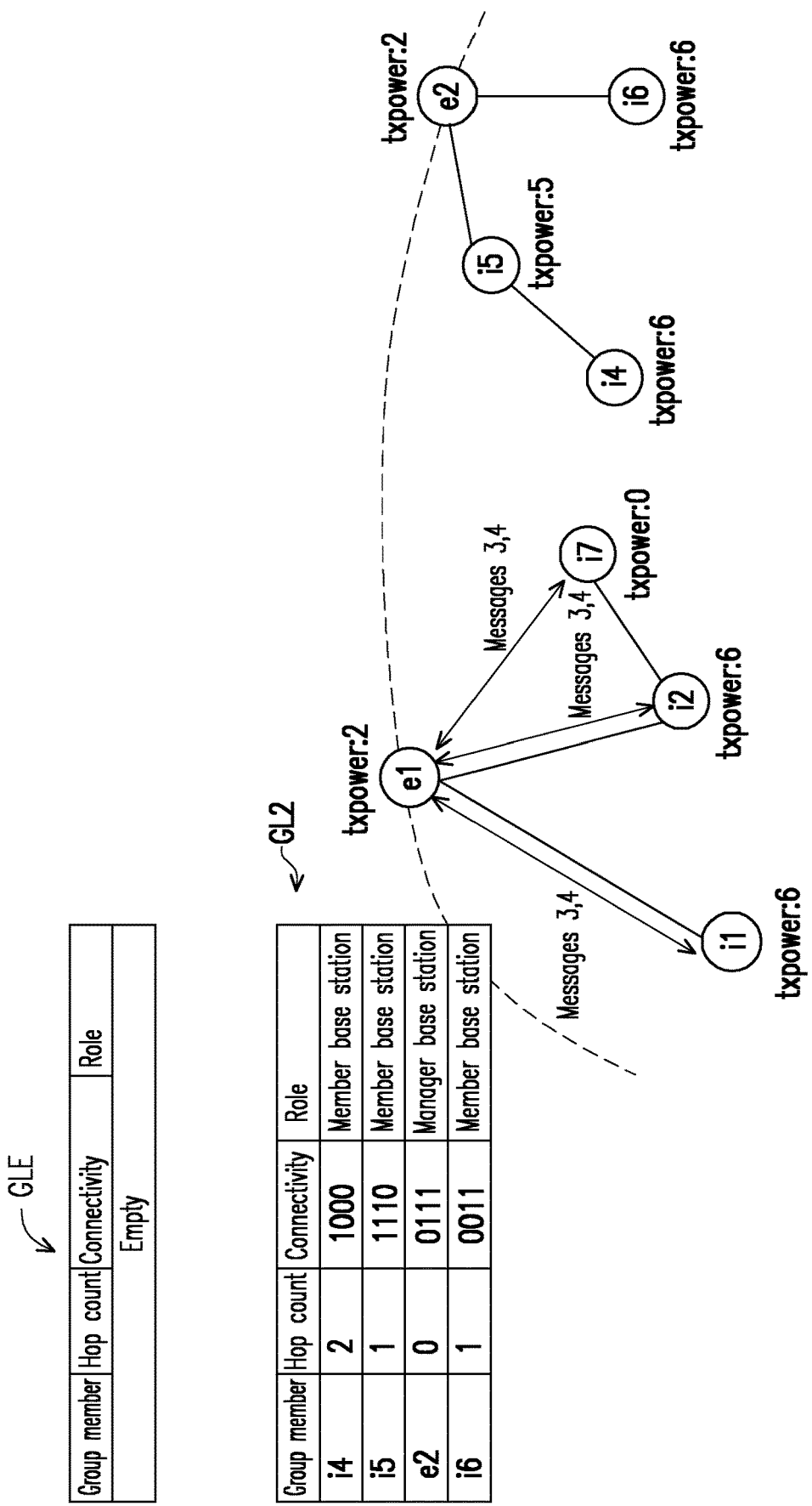
Figure 7C:
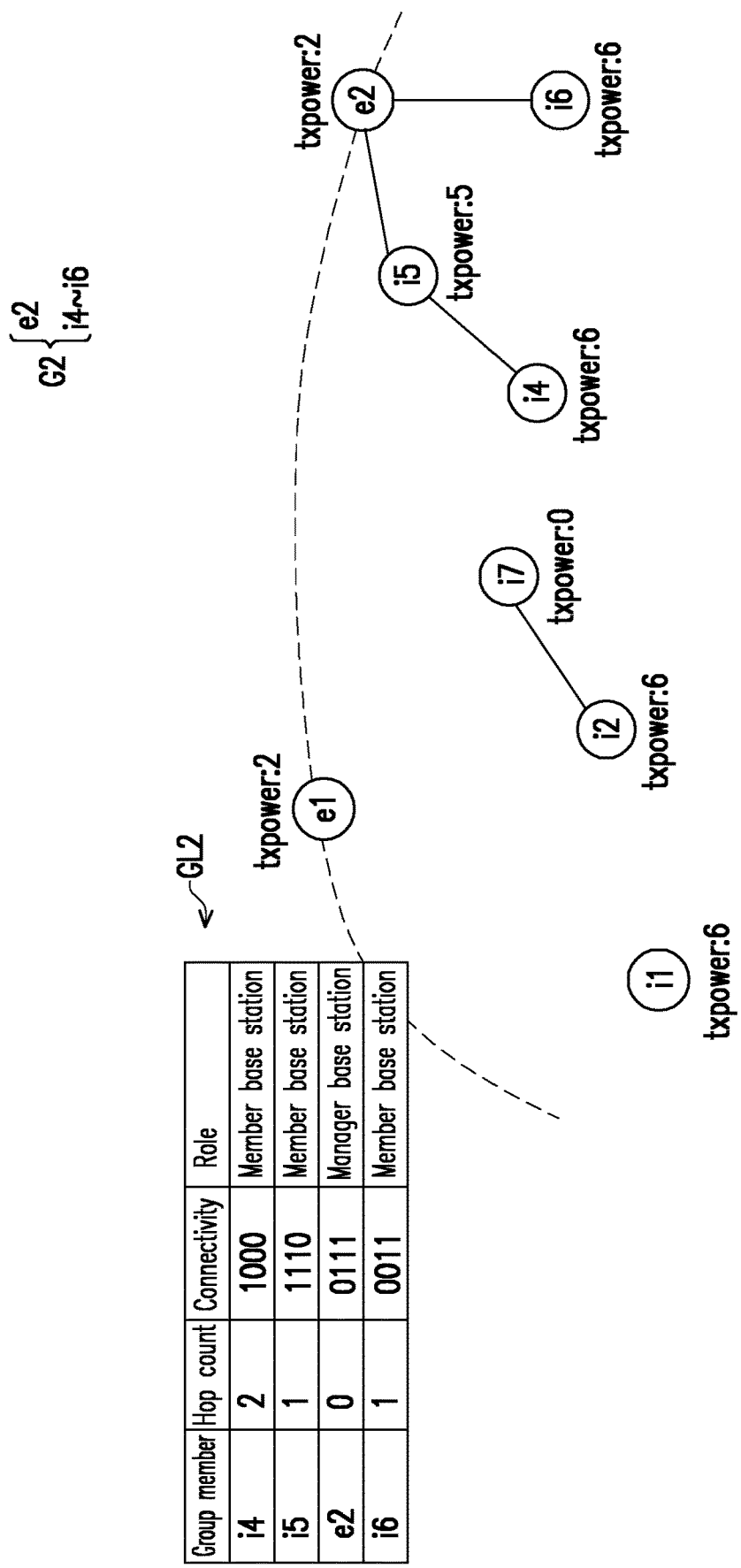

Referring to FIG. 7A to FIG. 7C, FIG. 7A to FIG. 7C are diagrams showing application scenarios where an edge base station is shut down according to the fourth embodiment of the disclosure. In the fourth embodiment, the scenario in FIG. 7A may be understood as the scenario that appears after FIG. 6D, but the disclosure is not limited thereto.

In FIG. 7A, it is assumed that the network administrator 499 gives a shutdown instruction to the base station e1 belonging to the edge base station category. Correspondingly, the base station e1 may check whether the base station group G1 managed by the base station e1 includes any other backup manager base station. If the result is affirmative, the base station e1 may set the backup manager base station as the manager base station.

On the other hand, if the base station group G1 does not include any other backup manager base station (that is, the scenario in FIG. 7A), the base station e1 may send the empty group list GLE to the base stations i1, i2, and i7 managed by the base station e1 through the update message (that is, message 3) as shown in FIG. 7B for the base stations i1, i2, and i7 to clear the group lists thereof correspondingly. Thereafter, in FIG. 7C, the base station e1 may be shut down, and the base station group G1 disappears correspondingly.

Referring to FIG. 8A to FIG. 8H, FIG. 8A to FIG. 8H are diagrams showing application scenarios where an edge base station is added according to the fifth embodiment of the disclosure. In the fifth embodiment, the scenario in FIG. 8A may be understood as the scenario that appears after FIG. 7C, but the disclosure is not limited thereto.

Figure 8A:
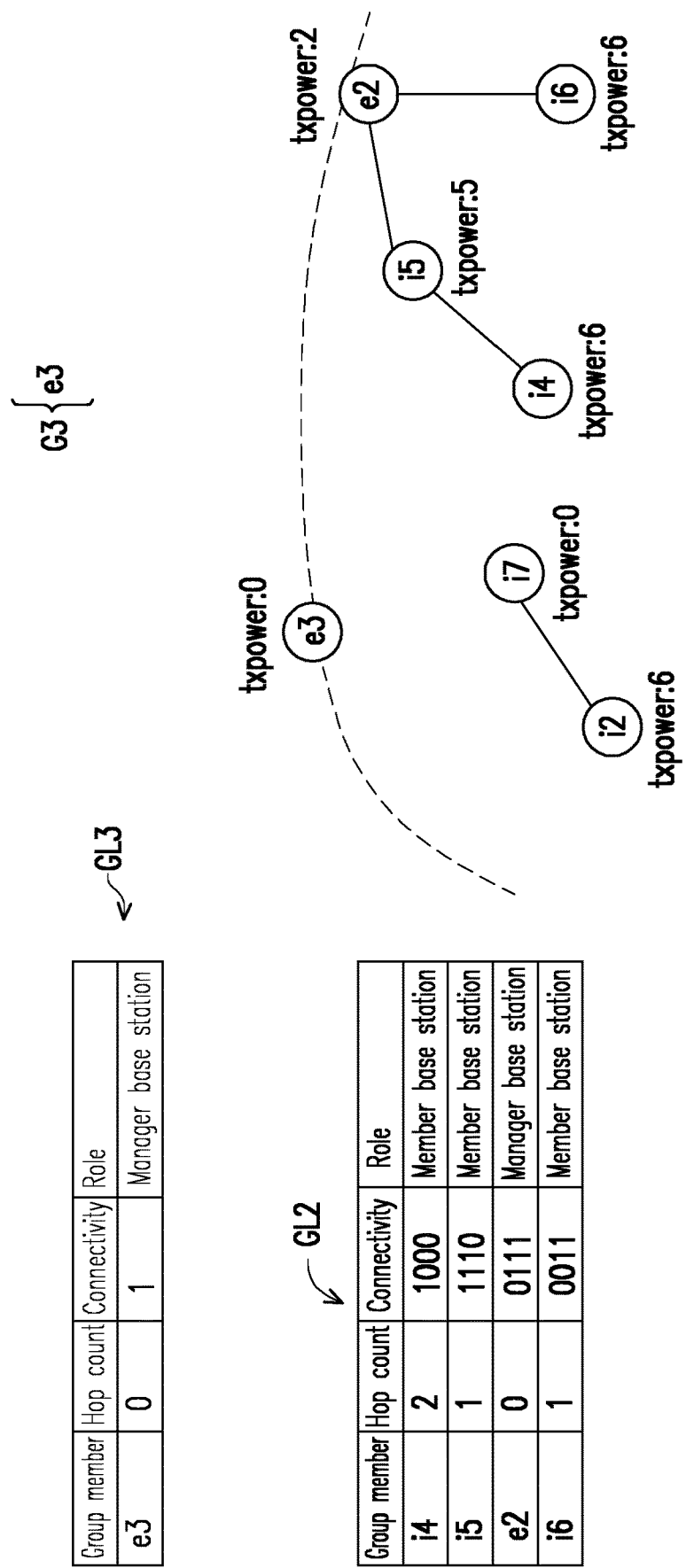
FIG. 8A to FIG. 8H are diagrams showing application scenarios where an edge base station is added according to the fifth embodiment of the disclosure.

In FIG. 8A, it is assumed that the network administrator 499 sets the base station e3 belonging to the edge base station category in the location as shown and starts the base station e3, and the base station e3 may preset itself as the manager base station that manages the base station group G3, and generate the corresponding group list GL3.

Figure 8B:
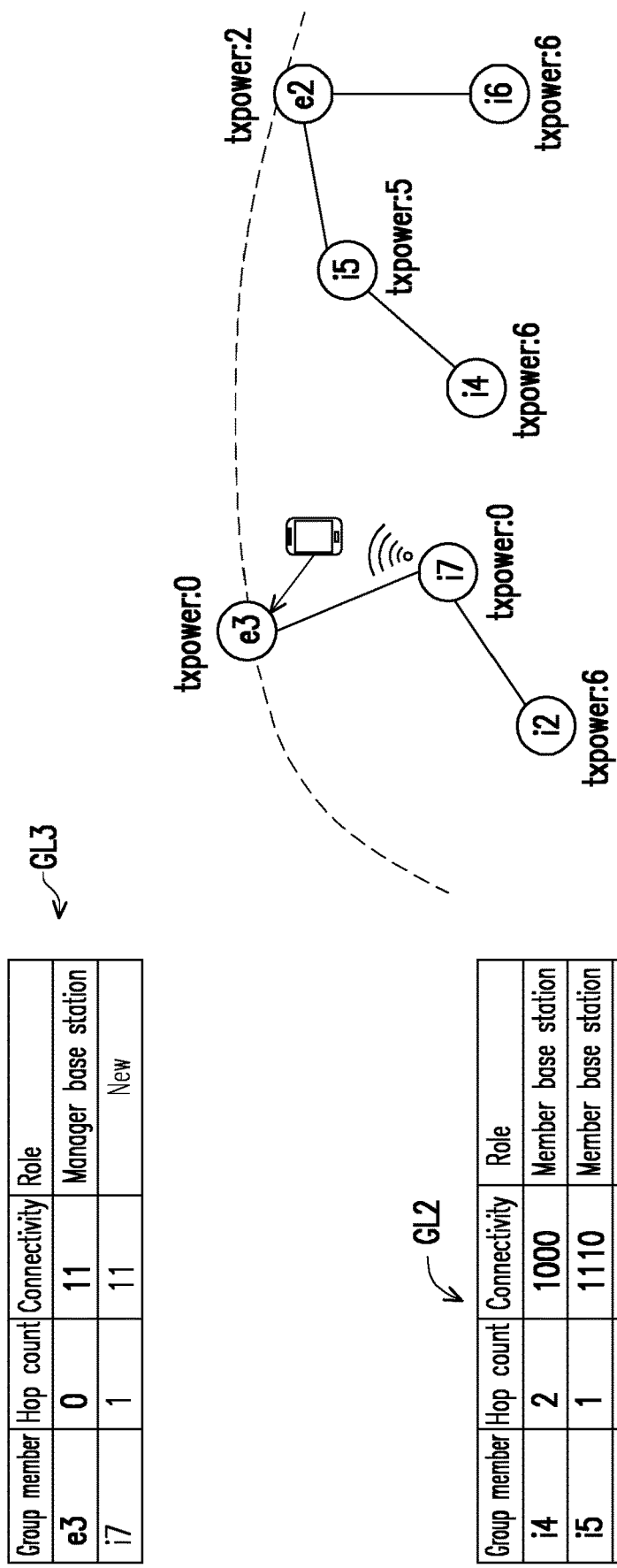

In FIG. 8B, it is assumed that the base station i7 is detected by the UE (not marked) attached to the base station e3, and the base station e3 learns that the base station i7 is present through the measurement report provided by the UE and records the base station i7 in the neighbor list of the base station e3.

Figure 8C:
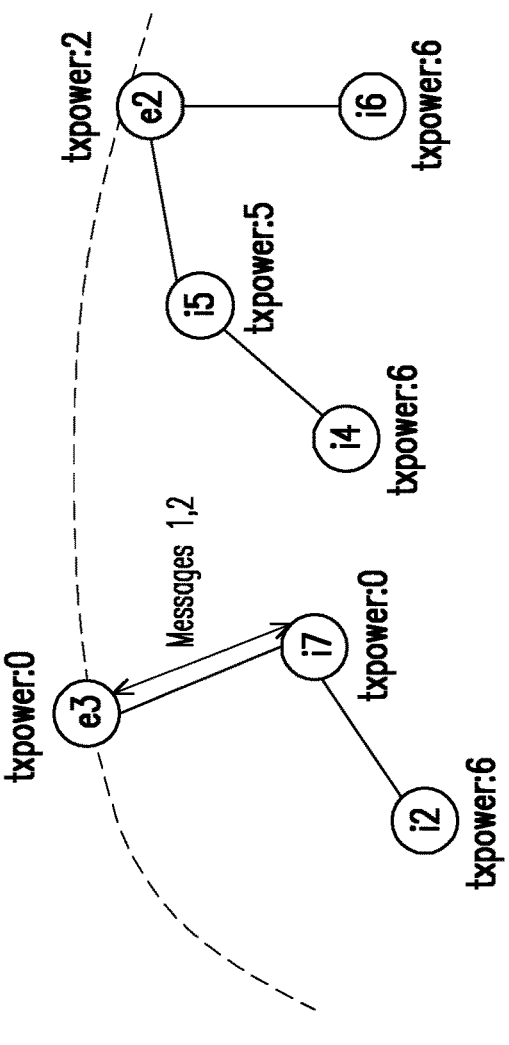

In FIG. 8C, the base station e3 may send the member tracking message (that is, message 1) to the base station i7, and learn that the base station i7 does not belong to any base station group based on the empty group list in the member tracking response (that is, message 2) sent back by the base station i7. Correspondingly, the base station e3 may add the base station i7 to the base station group G3. In addition, the base station e3 may also learn that the base station i2 is present based on the neighbor list in the member tracking response (that is, message 2) sent back by the base station i7, and correspondingly send the member tracking message (that is, message 1) to the base station i2.

Figure 8D:
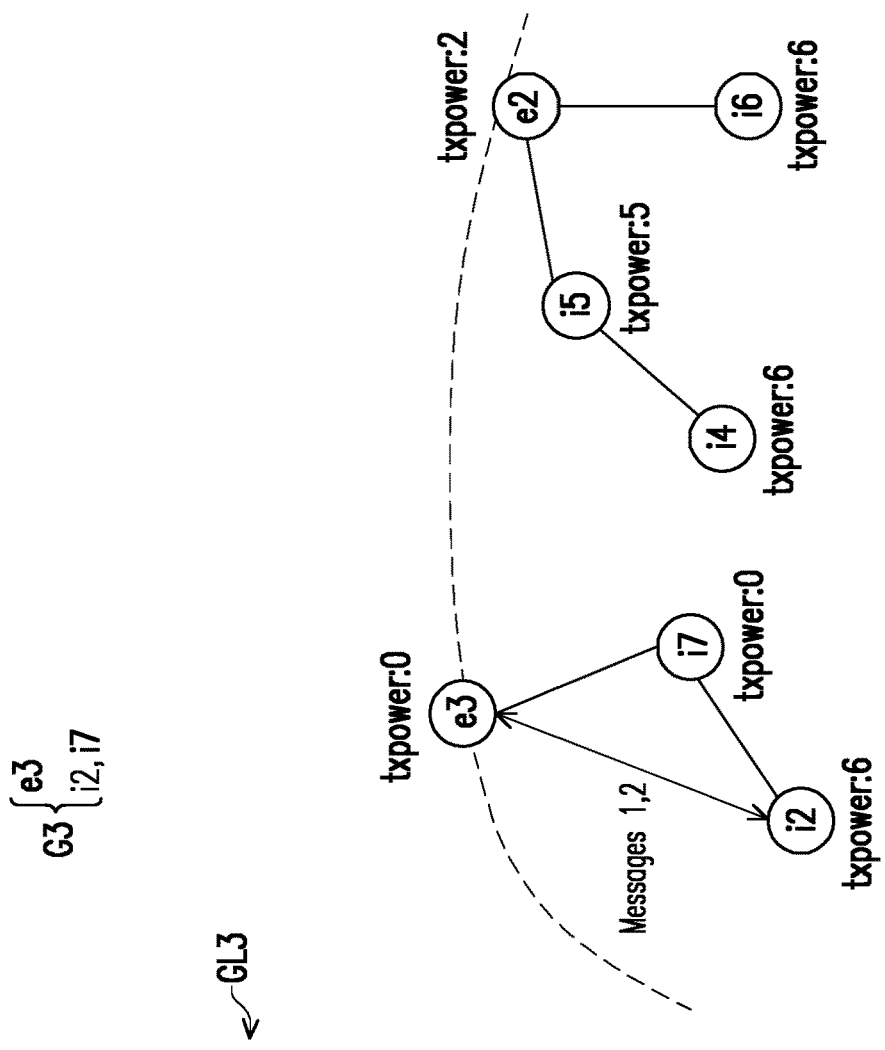

Thereafter, the base station e3 may learn that the base station i2 does not belong to any base station group based on the empty group list in the member tracking response (that is, message 2) sent back by the base station i2. Correspondingly, the base station e3 may add the base station i2 to the base station group G3 and update the group list GL3, as shown in FIG. 8D.

Figure 8E:
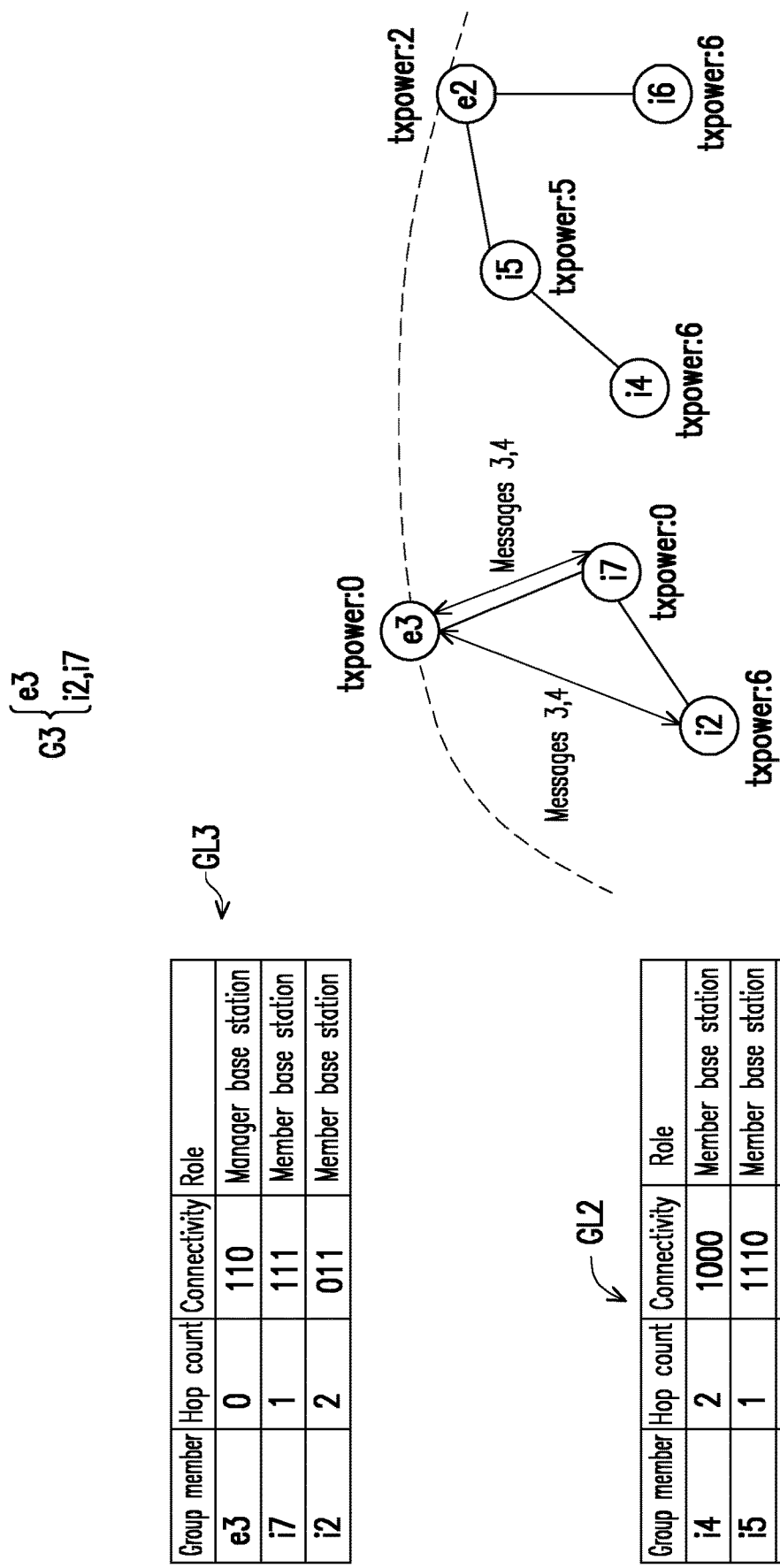

In FIG. 8E, the base station e3 may send the updated group list GL3 to the base stations i2 and i7 through the update message (that is, message 3), and the base stations i2 and i7 may correspondingly update the group lists thereof to the content of the group list GL3.

Figure 8F:
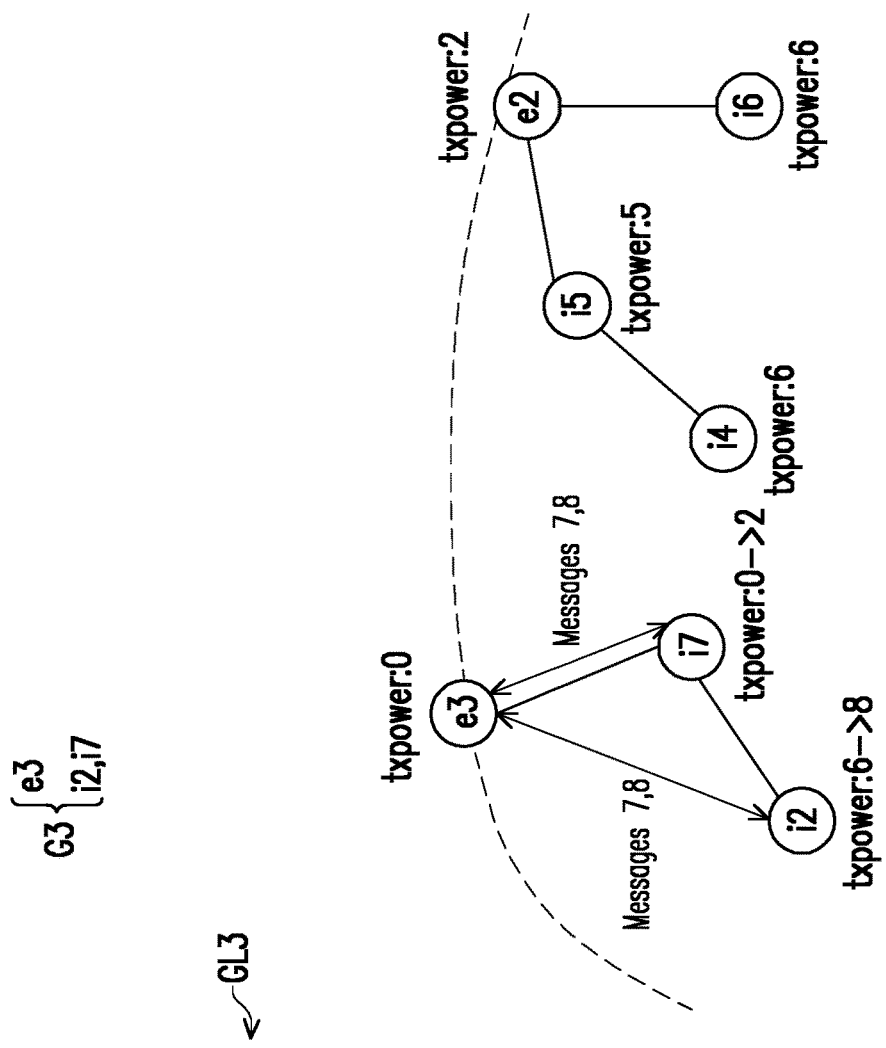

In FIG. 8F, the base station e3 may request the member base stations (that is, base stations i2 and i7) of the base station group G3 to increase the transmission power through the power control message (that is, message 7) to try to include more edge base stations/inner base stations in the base station group G3.

Figure 8G:
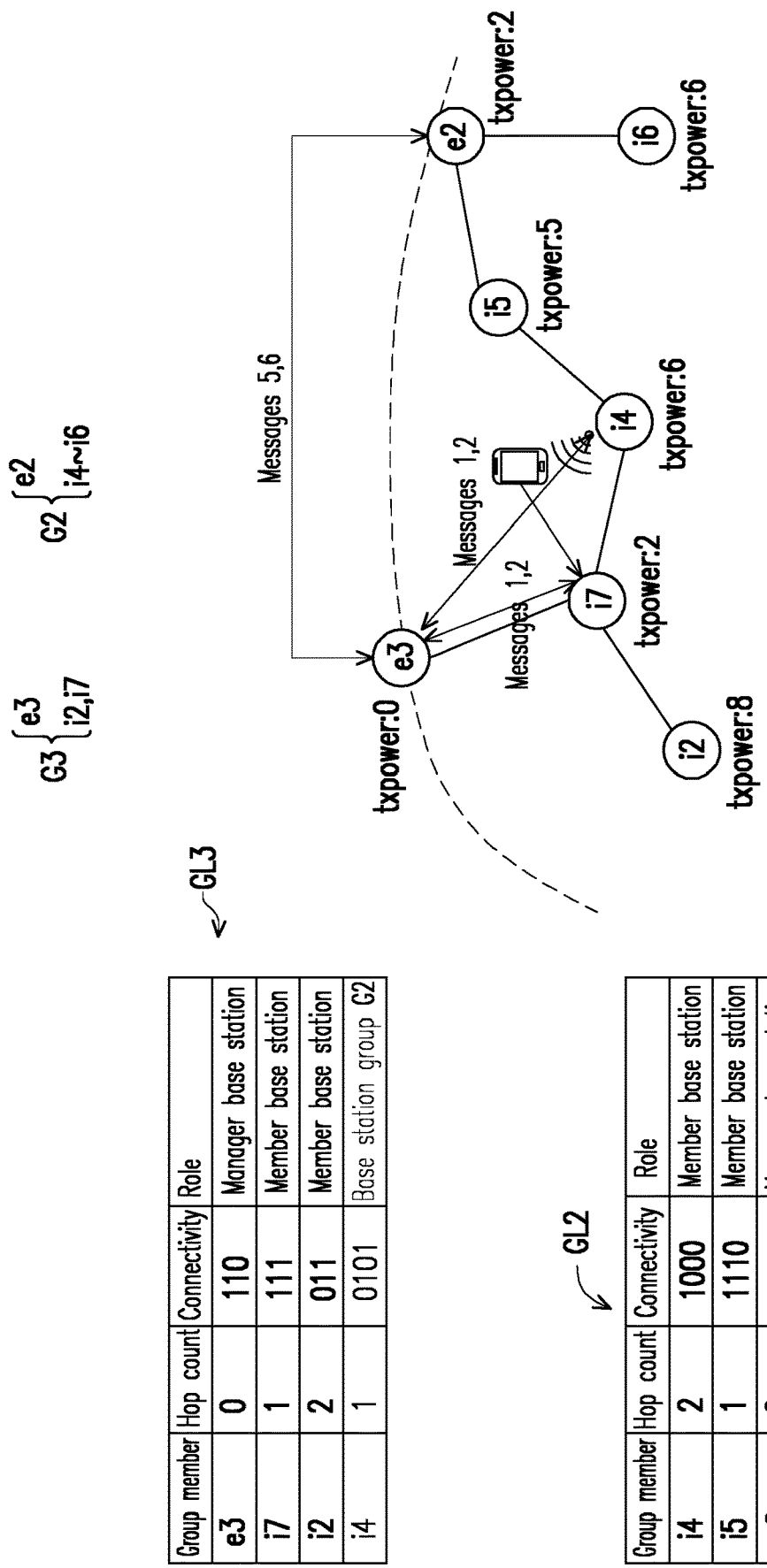

In FIG. 8G, it is assumed that the base station i4 is detected by the UE (not marked) attached to the base station i7, and the base station i7 learns that the base station i4 is present through the measurement report provided by the UE and records the base station i4 in the neighbor list of the base station i7.

Thereafter, the base station e3 may send the member tracking message (that is, message 1) to the base station i7, and may learn that the base station i4 is present based on the neighbor list in the member tracking response (that is, message 2) sent back by the base station i7.

Next, the base station e3 may correspondingly send the member tracking message (that is, message 1) to the base station i4, and the base station e3 may learn that the base station i4 belongs to the base station group G2 managed by the base station e2 based on the group list GL2 in the member tracking response (that is, message 2) sent back by the base station i4. Correspondingly, the base station e3 may send the group merger request (that is, message 5) to the base station e2 to try to merge the base station groups G2 and G3 into the base station group G4.

Figure 8H:
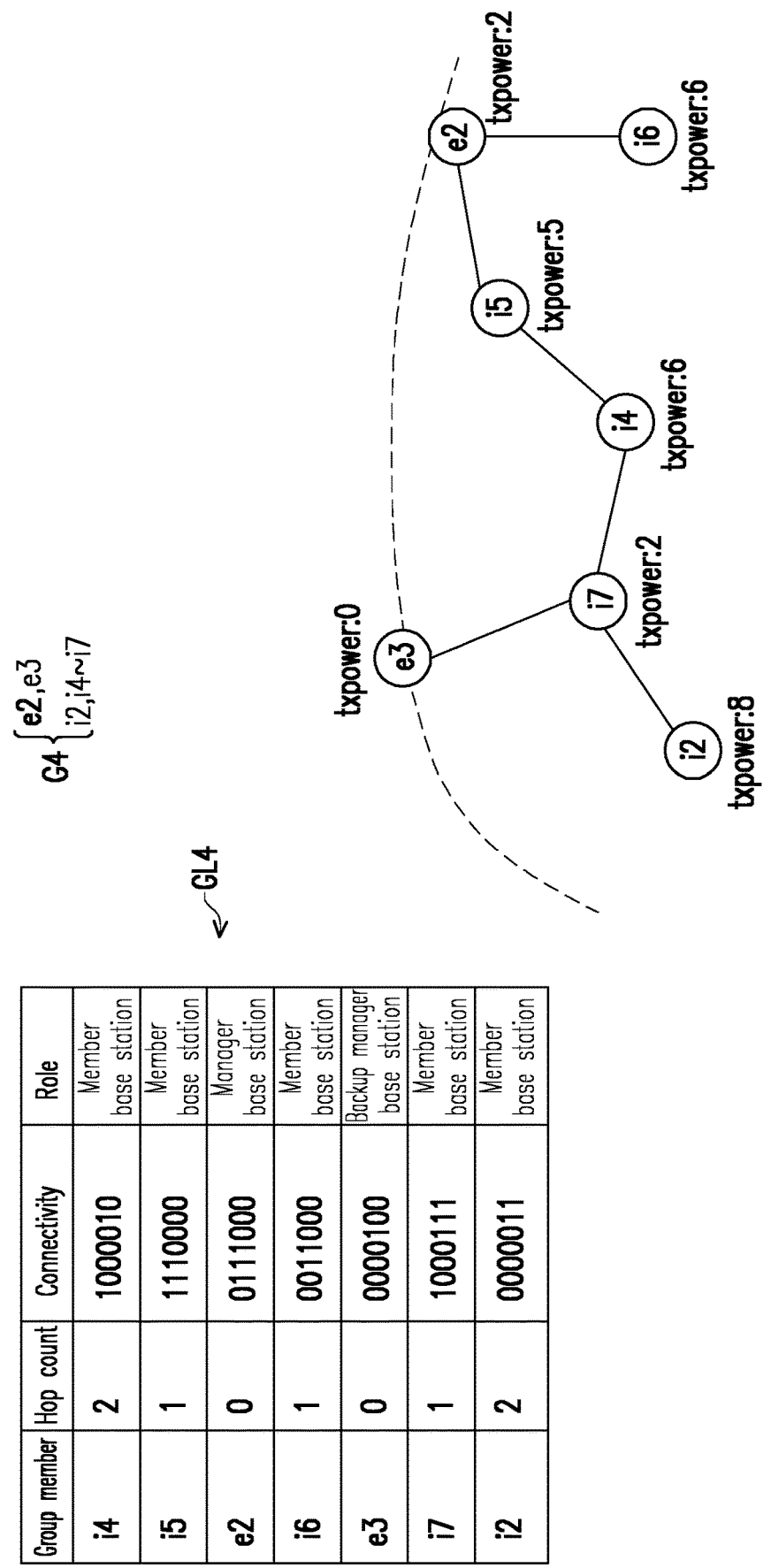

In the scenario of FIG. 8G, since the number of base stations in the base station group G2 (that is, 4) is greater than the number of base stations in the base station group G3 (that is, 3), the manager base station of the base station group G4 may be the base station e2 that originally manages the base station group G2, and the base station e3 that originally manages the base station group G3 may be the backup manager base station of the base station group G4, as shown in FIG. 8H, but the disclosure is not limited thereto.

Thereafter, the base station e2 may generate the group list GL4 corresponding to the base station group G4, and send the updated group list GL4 to the base stations e3, i2, and i4 to i7 managed by the base station e2 through the update message (that is, message 3), and the base stations e3, i2, and i4 to i7 may correspondingly update the group lists thereof to the content of the group list GL4.

Referring to FIG. 9A to FIG. 9H, FIG. 9A to FIG. 9H are diagrams showing application scenarios where an edge base station is moved according to the sixth embodiment of the disclosure. In the sixth embodiment, the scenario in FIG. 9A may be understood as the scenario that appears after FIG. 8H, but the disclosure is not limited thereto.

Figure 9A:
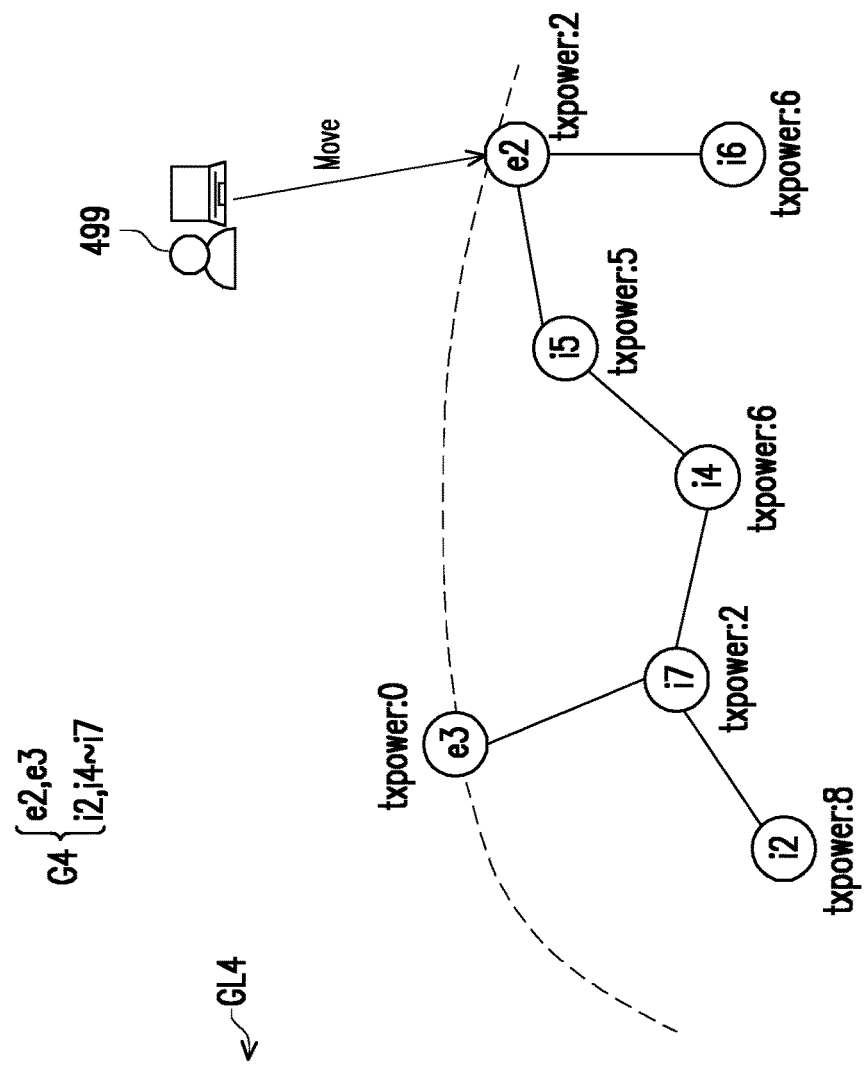
FIG. 9A to FIG. 9H are diagrams showing application scenarios where an edge base station is moved according to the sixth embodiment of the disclosure.

In FIG. 9A, it is assumed that the network administrator 499 intends to move the base station e2 to another location, and the network administrator 499 may modify the base station e2 to the moved state correspondingly. Thereafter, the base station e2 may find other base stations that are still connected to the base station e3 (that is, the backup manager base station) according to the breadth-first search algorithm taught previously.

Figure 9B:
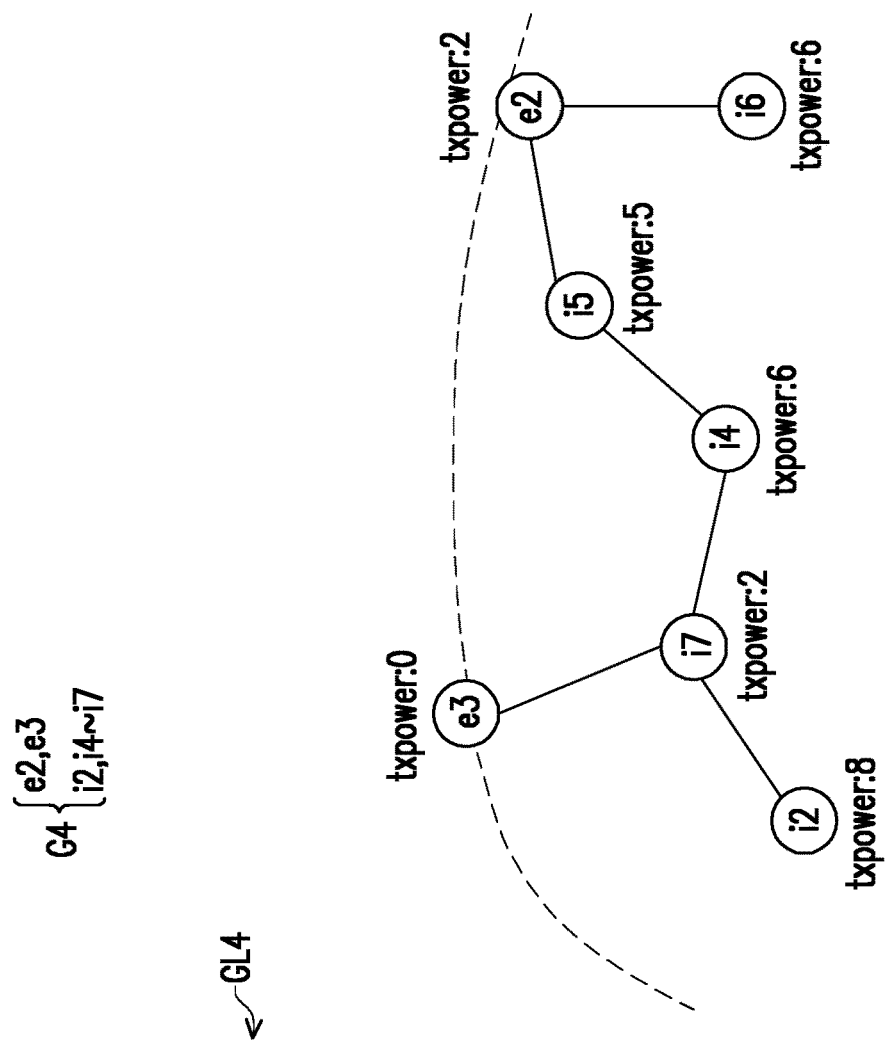
Figure 9C:
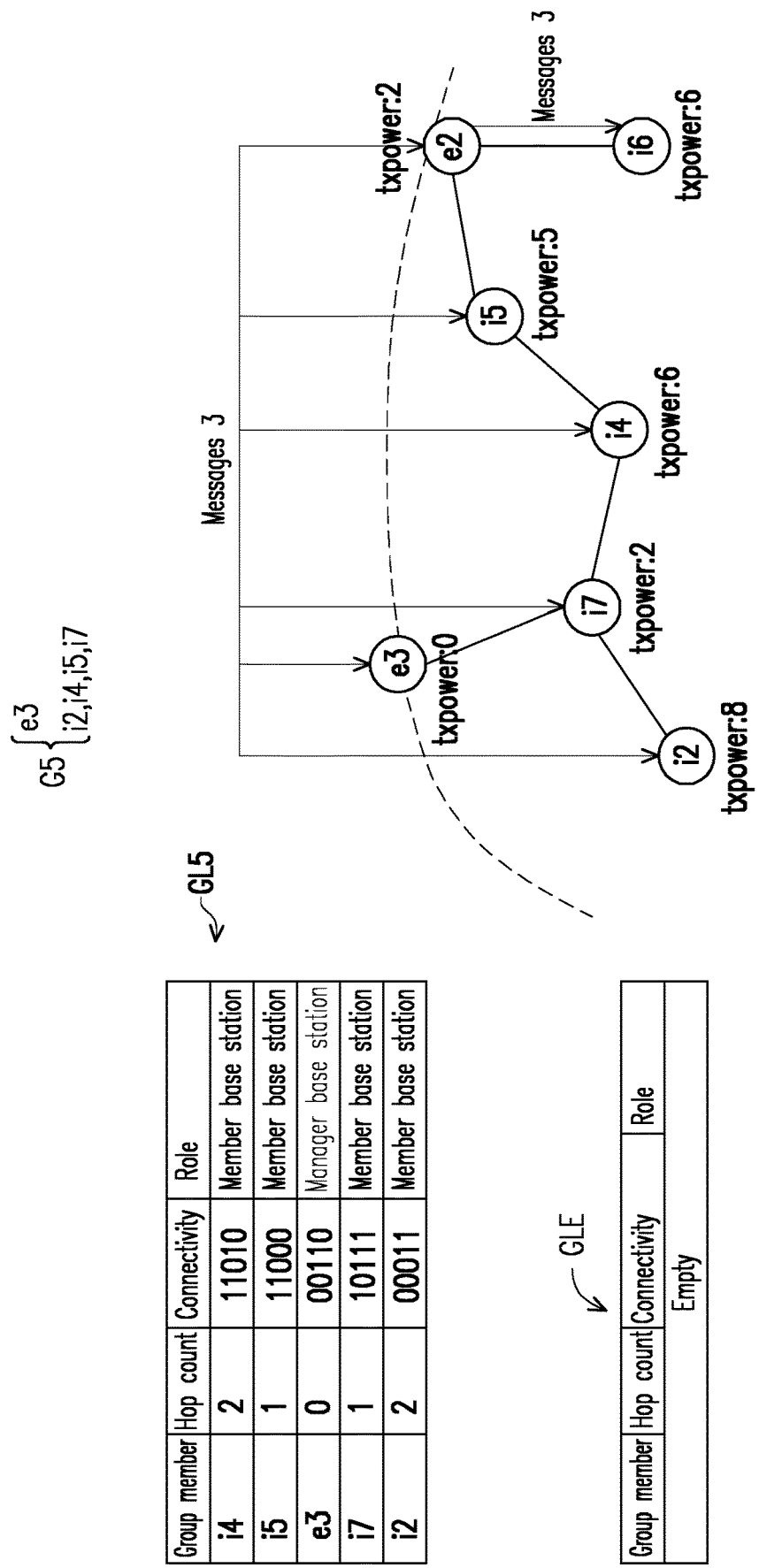

In FIG. 9B, the base station e2 may determine that, except for the base station i6, the other base stations i2, i4, i5, and i7 are still connected to the base station e3. In this case, the base station e2 may establish the base station group G5 including the base stations e3, i2, i4, i5, and i7, and specify the base station e3 that is originally the backup manager base station as the manager base station of the base station group G5. In addition, the base station e2 may generate the corresponding group list GL5 based on the base station group G5.

Thereafter, the base station e2 may send the group list GL5 to the base stations e3, i2, i4, i5, and i7 belonging to the base station group G5 through the update message (that is, message 3), and the base stations e3, i2, i4, i5, and i7 may update the group lists thereof to the content of the group list GL5 correspondingly.

On the other hand, for the base station i6 that is not connected to any edge base station, the base station e2 may send the empty group list GLE to the base station i6 through the update message (that is, message 3), and the base station i6 may correspondingly clear the group list thereof. Thereafter, the base station e2 may clear the group list, interference list, and neighbor list thereof and shut down.

Figure 9D:
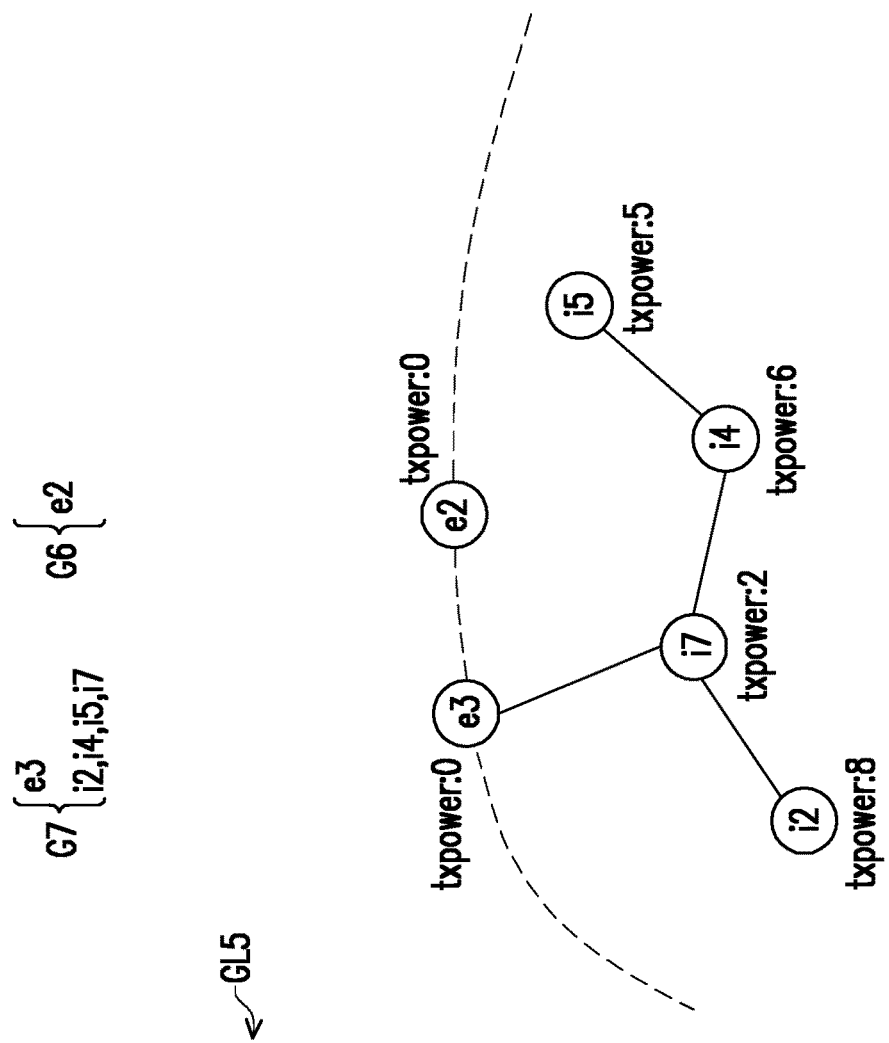

In FIG. 9D, it is assumed that the base station e2 is moved to the location as shown and started, and the base station e2 may preset itself as the manager base station that manages the base station group G6 and generate the corresponding group list GL6.

Figure 9E:
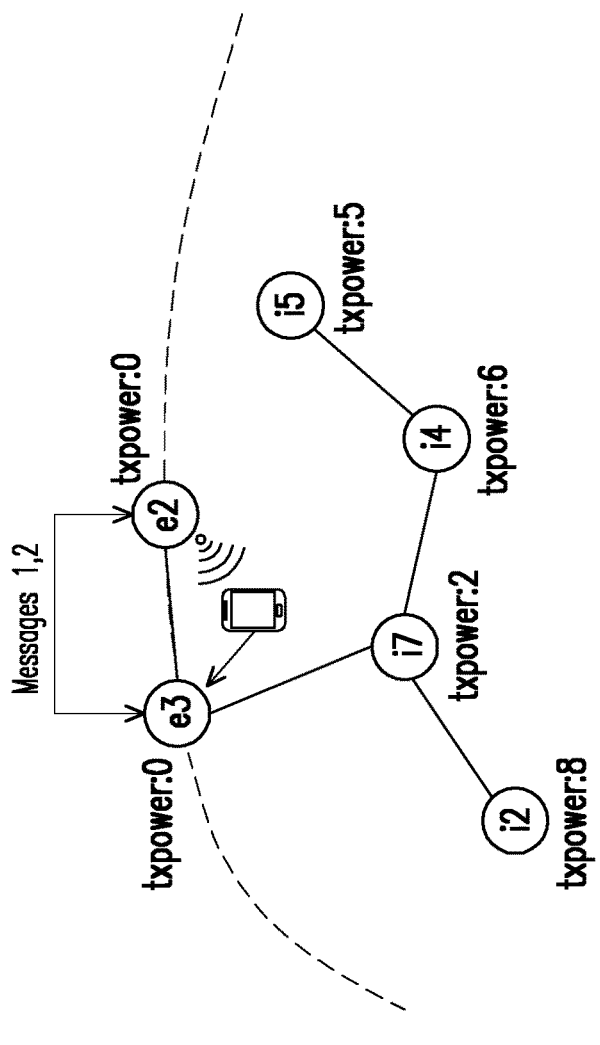

In FIG. 9E, it is assumed that the base station e2 is detected by the UE (not marked) attached to the base station e3, and the base station e3 learns that the base station e2 is present through the measurement report provided by the UE and records the base station e2 in the neighbor list of the base station e3. Thereafter, the base station e3 may send the member tracking message (that is, message 1) to the base station e2, and learn that the base station e2 belongs to the base station group G6 based on the group list GL6 in the member tracking response (that is, message 2) sent back by the base station e2.

Figure 9F:
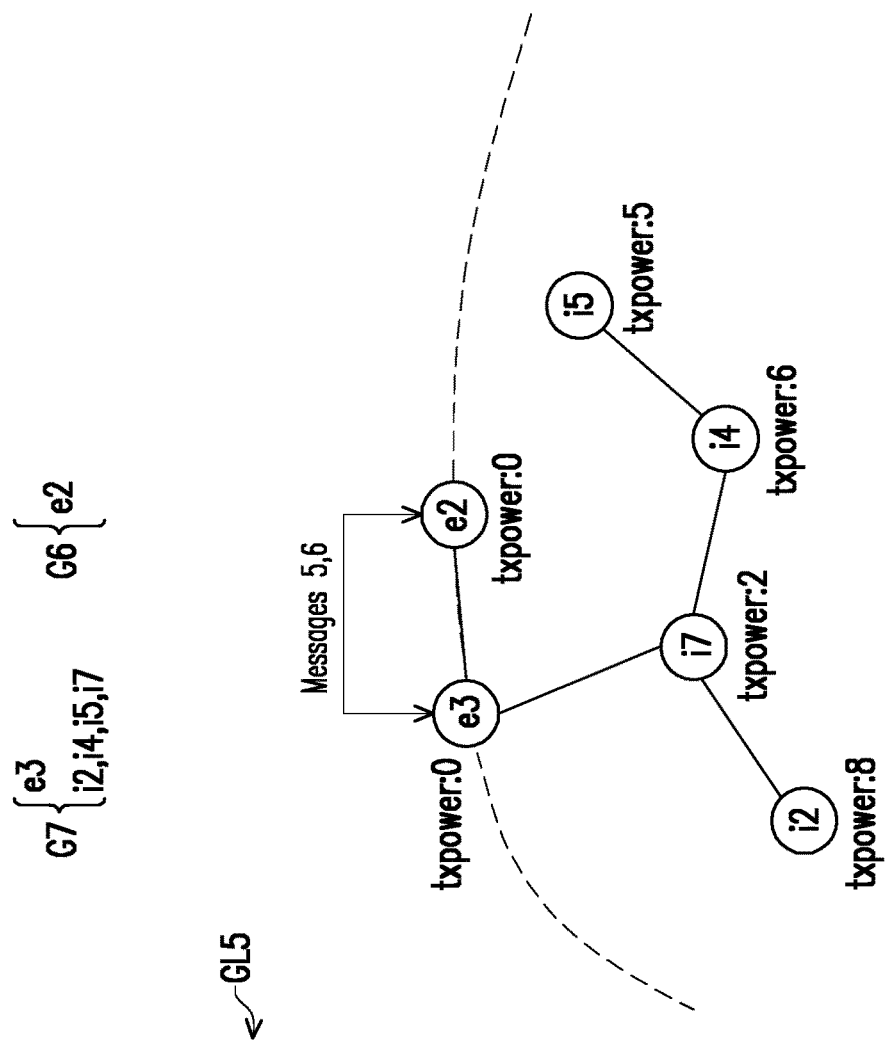
Figure 9G:
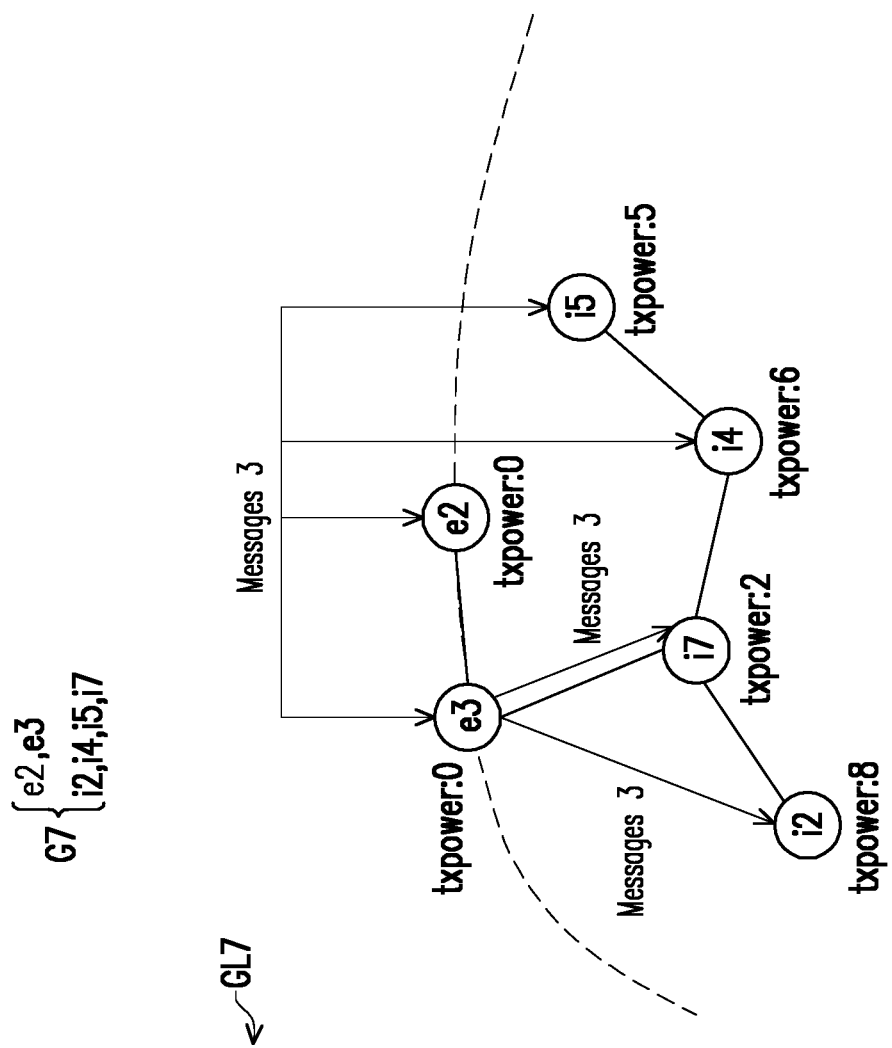

Correspondingly, the base station e3 may send the group merger request (that is, message 5) to the base station e2 to try to merge the base station groups G5 and G6 into the base station group G7 shown in FIG. 9G.

In the scenario of FIG. 9F, since the number of base stations in the base station group G5 (that is, 5) is greater than the number of base stations in the base station group G6 (that is, 1), the manager base station of the base station group G7 may be the base station e3 that originally manages the base station group G5, and the base station e2 that originally manages the base station group G6 may be the backup manager base station of the base station group G7, as shown in FIG. 9G, but the disclosure is not limited thereto.

Thereafter, the base station e3 may generate the group list GL7 corresponding to the base station group G7, and send the group list GL7 to the base stations e2, i2, i4, i5, and i7 managed by the base station e3 through the update message (that is, message 3), and the base stations e2, i2, i4, i5, and i7 may correspondingly update the group lists thereof to the content of the group list GL7.

Figure 9H:
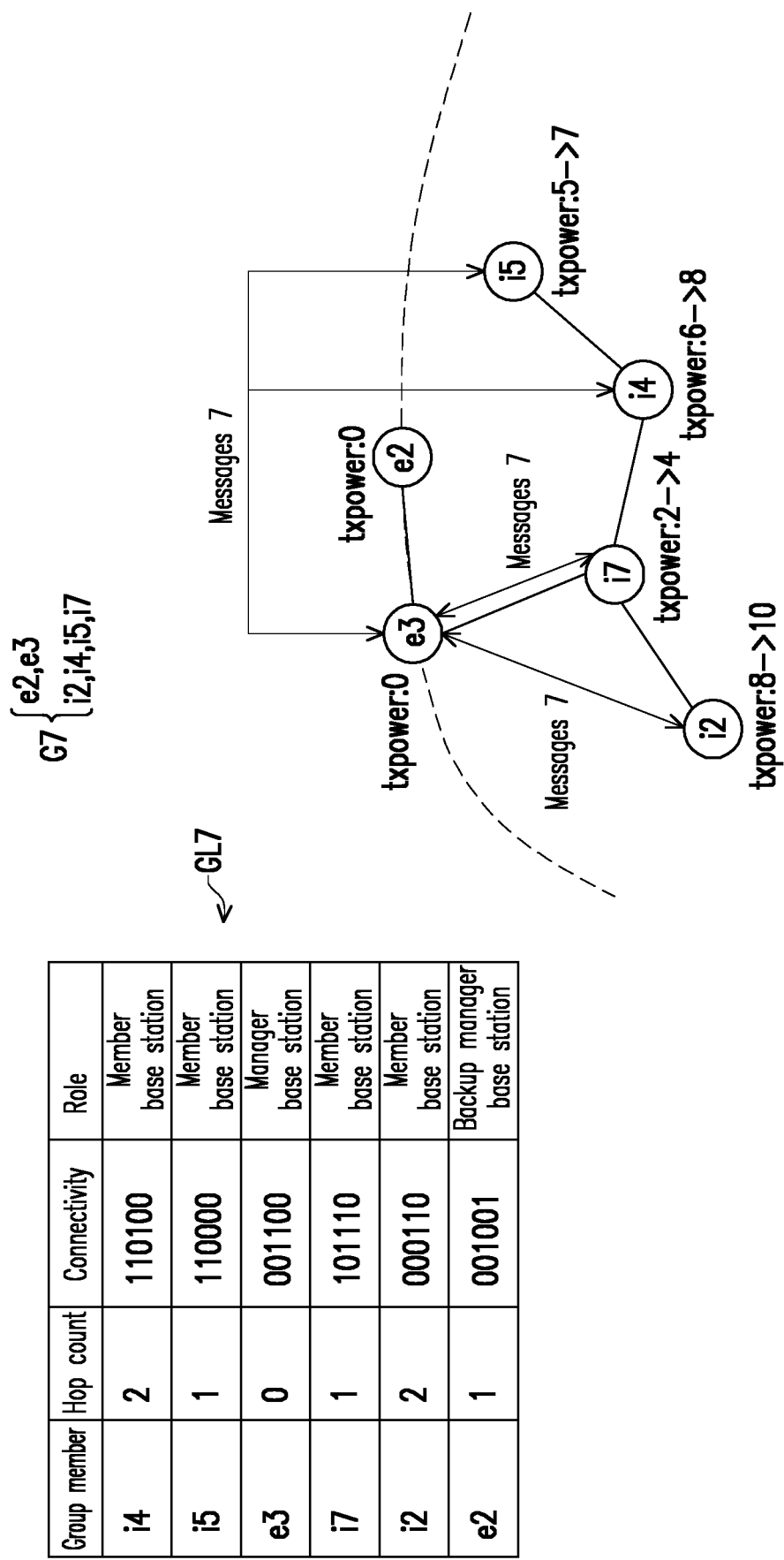

In FIG. 9H, the base station e3 may request the member base stations (that is, base stations i2, i4, i5, and i7) of the base station group G7 to increase the transmission power through the power control message (that is, message 7) to try to include more edge base stations/inner base stations in the base station group G7.

It should be understood that the base station i5 is originally restricted in transmission power due to interference to the base station e2. However, after the base station e2 is moved, the base station i5 and the base station e2 are no longer in a neighbor relation. Therefore, the base station i5 may correspondingly remove the base station e2 from the interference list, and may be controlled by the base station e3 to increase the transmission power.

In some embodiments, in response to the base station e2 (that is, the backup manager base station of the base station group G7) determining that the base station e2 has not received any member tracking message from the base station e3 for a preset time length, it means that the base station e3 may no longer be able to manage the base station group G7 for some reason. In this case, the base station e3 may set itself as the manager base station of the base station group G7, and start to manage the base station group G7.

In some embodiments, it is assumed that a certain base station group includes multiple edge base stations, and the manager base station that manages the base station group divides the base station group into multiple sub base station groups for some reason. In this case, each edge base station may find the specific sub base station group to which it belongs among the sub base station groups, and determine whether it satisfies a specific condition. In different embodiments, the aforementioned specific condition may be determined according to the requirements of the designer. For example, the edge base station may determine whether the CGI thereof is the smallest among the edge base stations in the same specific sub base station group. If the result is affirmative, the edge base station may determine that it satisfies the aforementioned specific condition, but the disclosure is not limited thereto.

In an embodiment, after the edge base station determines that it satisfies the aforementioned specific condition, the edge base station may start to manage the specific sub base station group to which it belongs. Otherwise, the edge base station may not manage the specific sub base station group, but the disclosure is not limited thereto.

Furthermore, in order to facilitate the implementation of the various technical means of the disclosure, each base station may maintain various parameters as shown in Table 13 below.

TABLE 13

| Parameter number | Parameter name | Parameter category | Parameter range | Use |
| --- | --- | --- | --- | --- |
| 1 | BS_Type | Boolean | T, F_ | T represents edge base station, and F represents inner base station |
| 2 | Power_control_step | INT | 0 to 10 | Range of increasing the transmission power (unit: dbm) when serving as the manager base station to send the power control message to the member base stations |
| 3 | Interference_control_step | INT | 0 to 10 | Range of reducing the transmission power (unit: dbm) when requested by the received interference control message to reduce the transmission power |
| 4 | Strong_interference | INT | 0 to 20 | Second interference threshold |
| 5 | Potential_interference | INT | 0 to 20 | First interference threshold |
| 6 | Power_upper_bound | INT | −60 to 50 | Upper limit of the transmission power of each base station |
| 7 | Power_lower_bound | INT | −60 to 50 | Lower limit of the transmission power of each base station |
| 8 | Max_interference_control_count | INT | 0 to 10 | Limit to the number of times of reducing the transmission power in response to the received interference control message |
| 9 | Is_moved | Boolean | T, F | T represents that the base station is to be moved to another location and restarted (the group list, interference list, and neighbor list are cleared), reset to F after restart |
| 10 | Target_coverage | INT | >2 | Number threshold |
| 11 | Tracking_interval | INT | >0 | Time interval for sending the member tracking message |
| 12 | Alive_checking | INT | >0 | Preset number of times |
| 13 | Power_control_interval | INT | >0 | Time interval for sending the power control message |
| 14 | Interference_control_interval | INT | >0 | Time interval for checking the interference state |
| 15 | timeout | INT | >0 | Regarded as no response if no response is received within this time interval |
| 16 | Run_distributed_cco | boolean | T, F | T represents that the edge base station performs the method of the disclosure, and F represents stopping performing the method of the disclosure |

Figure 10:
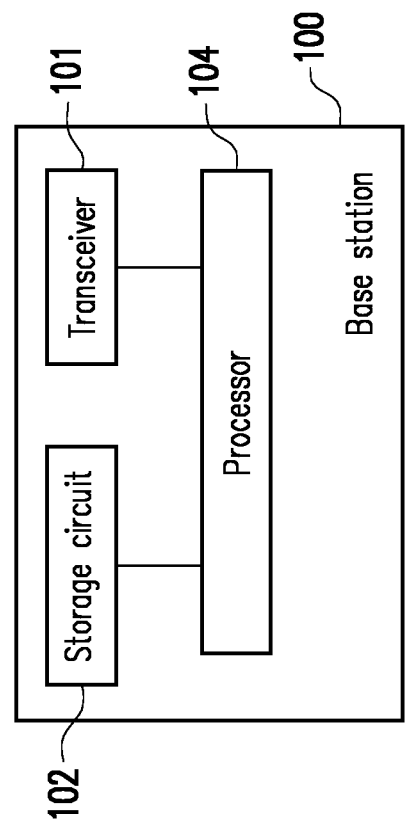
FIG. 10 is a functional block diagram of a base station according to an embodiment of the disclosure.

Referring to FIG. 10, FIG. 10 is a functional block diagram of a base station according to an embodiment of the disclosure. In different embodiments, the base station 100 in FIG. 10 is applicable to implementing the various base stations mentioned above, such as the edge base station or the inner base station, but the disclosure is not limited thereto.

As shown in FIG. 10, the base station 100 includes a transceiver 101, a storage circuit 102, and a processor 104. The transceiver 101 may be a component such as a protocol unit, which supports signal transmission of global system for mobile communication (GSM), personal handy-phone system (PHS), code division multiple access (CDMA) system, wireless fidelity (Wi-Fi) system or worldwide interoperability for microwave access (WiMAX).

The transceiver 101 may be a component at least including a transmitter circuit, a receiver circuit, an analog-to-digital (A/D) converter, a digital-to-analog (D/A) converter, a low noise amplifier (LNA), a mixer, a filter, a matching circuit, a transmission line, a power amplifier (PA), one or more antenna units, and local storage media, but not limited thereto, so as to provide wireless access for the base station 100 in FIG. 10. In addition, the transceiver 101 may also exchange data with other base stations via the aforementioned network protocol management connection, but the disclosure is not limited thereto.

The storage circuit 102 is, for example, any type of fixed or movable random access memory (RAM), read-only memory (ROM), flash memory, hard disk or other similar devices, or a combination of these devices, so as to record multiple program codes or modules.

The processor 104 is coupled to the transceiver 101 and the storage circuit 102, and may be a general purpose processor, a special purpose processor, a traditional processor, a digital signal processor, multiple microprocessors, one or more microprocessors combined with a digital signal processor core, a controller, a microcontroller, an application specific integrated circuit (ASIC), a field programmable gate array (FPGA), any other type of integrated circuit, a state machine, a processor based on Advanced RISC Machine (ARM), or the like.

In the embodiment of the disclosure, the processor 104 may access the modules and program codes recorded in the storage circuit 102 to implement the self-defined network coverage optimizing method of the disclosure.

In an embodiment, when the base station 100 is configured to implement the manager base station that manages the base station group, the corresponding operation may be found in the description of the previous embodiment and therefore will not be repeated here.

Figure 11:
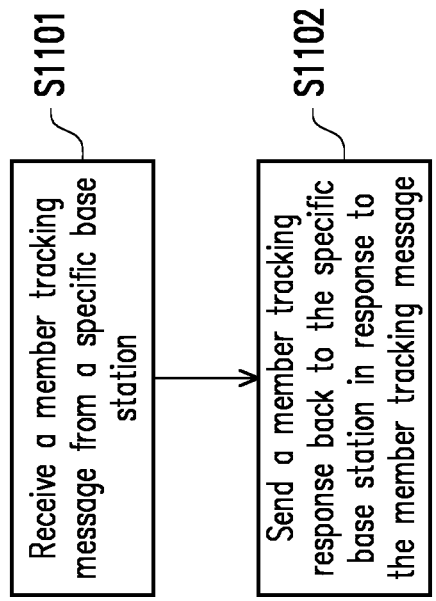
FIG. 11 is a flowchart showing a method for optimizing the coverage of a self-defined network according to an embodiment of the disclosure.

In addition, when the base station 100 is configured to implement the member base station (which may be an edge base station or an inner base station) belonging to a certain base station group, the base station 100 may perform the self-defined network coverage optimizing method shown in FIG. 11.

Referring to FIG. 11, FIG. 11 is a flowchart showing a method for optimizing the coverage of a self-defined network according to an embodiment of the disclosure. The method of this embodiment may be performed by the base station 100 implemented as the member base station. The steps in FIG. 11 will be described below with reference to the components shown in FIG. 10.

In step S1101, the processor 104 may control the transceiver 101 to receive a member tracking message from a specific base station. In different embodiments, the base station 100 may or may not belong to a base station group managed by the specific base station.

Then, in step S1102, the processor 104 may control the transceiver 101 to send back a member tracking response to the specific base station in response to the member tracking message.

Details of each step above may be found in the description of the previous embodiment and therefore will not be repeated here.

In summary, the method of the disclosure allows each manager base station to gradually adjust the transmission power of each member base station based on the measurement report provided by the UE in a distributed manner without the location of the base station and the location of the UE, so that the formed overall coverage better covers the service range with fewer coverage holes and interference. In this way, the user equipment is provided with a better transmission experience at lower costs.

It will be apparent to those skilled in the art that various modifications and variations can be made to the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A self-defined network coverage optimizing method, adapted for a first specific base station that serves first user equipment, wherein the first specific base station manages a first base station group, the self-defined network coverage optimizing method comprising:
   receiving a first measurement report from the first user equipment;
   in response to determining that the first measurement report indicates that a neighboring first base station is present, sending a first member tracking message to the first base station, wherein the first base station sends a first member tracking response back to the first specific base station in response to the first member tracking message;
   determining whether the first base station belongs to any other base station group based on the first member tracking response;
   in response to determining that the first base station does not belong to any other base station group, adding the first base station to the first base station group; and
   in response to determining that the first member tracking response indicates that the first base station belongs to a second base station group, merging the first base station group and the second base station group.

2. The self-defined network coverage optimizing method according to claim 1, wherein before sending the first member tracking message to the first base station, the self-defined network coverage optimizing method further comprises:
   requesting the first user equipment to report a first identifier of the first base station;
   requesting an IP address of the first base station from a core network based on the first identifier; and
   establishing a neighbor relation member tracking response with the first base station based on the IP address of the first base station.

3. The self-defined network coverage optimizing method according to claim 1, further comprising: in response to determining that the first measurement report indicates that no neighboring base station is present, increasing transmission power of the first specific base station.

4. The self-defined network coverage optimizing method according to claim 1, wherein the first member tracking response comprises a base station category to which the first base station belongs, a neighbor list of the first base station, and a first group list of the first base station, wherein the base station category comprises an edge base station category or an inner base station category.

5. The self-defined network coverage optimizing method according to claim 4, further comprising: in response to determining that the first group list of the first base station is empty, determining that the first base station does not belong to any other base station group.

6. The self-defined network coverage optimizing method according to claim 1, wherein the first specific base station comprises a first specific group list, the first specific group list comprises at least one first member base station of the first base station group and the first specific base station that manages the first base station group, and merging the first base station group and the second base station group comprises:

in response to determining that the group list of the first base station is not empty, obtaining at least one second member base station of the second base station group and a second specific base station that manages the second base station group based on the first member tracking response;

in response to determining that a first base station number in the first specific group list is greater than a second base station number in the second specific group list, sending a first group merger request to the second specific base station, and the second specific base station sending a first group merger response back in response to the first group merger request; and receiving the first group merger response, and merging the first base station group and the second base station group into a third base station group managed by the first specific base station based on the group list of the first base station and the first specific group list, wherein the third base station group comprises the at least one first member base station, the at least one second member base station, the first specific base station, and the second specific base station.

7. The self-defined network coverage optimizing method according to claim 6, further comprising: in response to determining that the first base station number in the first specific group list is not greater than the second base station number in the second specific group list, merging the first base station group and the second base station group into the third base station group managed by the second specific base station.

8. The self-defined network coverage optimizing method according to claim 1, wherein the first base station comprises a first group list, the first specific base station comprises a first specific group list, the first specific group list comprises at least one first member base station of the first base station group and the first specific base station that manages the first base station group, and adding the first base station to the first base station group comprises:

adding the first base station to the first specific group list to update the first specific group list; and regarding the first base station as one of the at least one first member base station, and sending a first update message to each of the at least one first member base station, wherein the first update message comprises the updated first specific group list, and the first update message is configured to request each of the at least one first member base station to update the group list of each of the at least one first member base station according to the updated first specific group list.

9. The self-defined network coverage optimizing method according to claim 1, wherein the first base station group comprises a second base station, and the self-defined network coverage optimizing method further comprises:

in response to determining that the first measurement report indicates that first transmission power of the second base station satisfies an interference condition, sending a first interference control message to the second base station, wherein the first interference control message indicates an interference level of the second base station with respect to the first specific base station, and the second base station maintains or reduces the transmission power of the second base station in response to the interference level indicated by the first interference control message.

10. The self-defined network coverage optimizing method according to claim 1, wherein the first specific base station comprises a first specific group list, the first specific group list comprises at least one first member base station of the first base station group and the first specific base station that manages the first base station group, and the self-defined network coverage optimizing method further comprises:

in response to determining that an edge base station number in the first specific group list is smaller than a number threshold, or not each of the at least one first member base station refuses to adjust the transmission power, requesting each of the at least one first member base station to increase the transmission power through a power control message.

11. The self-defined network coverage optimizing method according to claim 1, wherein the first specific base station comprises a first specific group list, the first specific group list comprises at least one first member base station of the first base station group and the first specific base station that manages the first base station group, and the self-defined network coverage optimizing method further comprises:

sending a second member tracking message to each of the at least one first member base station, wherein each of the at least one first member base station sends a corresponding second member tracking response back to the first specific base station in response to the second member tracking message; and in response to determining that a number of times of not receiving the corresponding second member tracking response from a first specific member base station of the at least one first member base station reaches a preset number of times, removing the first specific member base station from the first base station group.

12. The self-defined network coverage optimizing method according to claim 11, wherein the first specific group list comprises at least one first member base station of the first base station group and the first specific base station that manages the first base station group, the first specific group list further comprises connectivity between the at least one first member base station and the first specific base station, and after removing the first specific member base station from the first base station group, the self-defined network coverage optimizing method further comprises:

finding at least one second specific member base station still connected to the first specific base station among the at least one first member base station based on the connectivity between the at least one first member base station and the first specific base station;

updating the first specific group list corresponding to the first base station group based on the at least one second specific member base station; and sending a second update message to each of the at least one second member base station, wherein the second update message comprises the updated first specific group list, and the second update message is configured to request each of the at least one second member base station to update a group list of each of the at least one second member base station according to the updated first specific group list.

13. The self-defined network coverage optimizing method according to claim 1, wherein the first specific base station comprises a first specific group list and a first neighbor list, and the self-defined network coverage optimizing method further comprises:

in response to determining that the first specific base station is set to a moved state, clearing the first specific group list and the first neighbor list, and restoring the transmission power of the first specific base station to a preset value.

14. The self-defined network coverage optimizing method according to claim 1, wherein a location of the first base station is unknown to the first specific base station.

15. The self-defined network coverage optimizing method according to claim 1, further comprising:
in response to receiving a second group merger request from a third specific base station that manages a third base station group, merging the first base station group and the third base station group.

16. A self-defined network coverage optimizing method, adapted for a first base station, the self-defined network coverage optimizing method comprising:
receiving a first member tracking message from a first specific base station, wherein the first specific base station manages a first base station group; and
sending a first member tracking response back to the first specific base station in response to the first member tracking message, wherein the first member tracking response comprises a base station category to which the first base station belongs, a neighbor list of the first base station, and a first group list of the first base station, wherein the base station category comprises an edge base station category or an inner base station category, and a location of the first base station is unknown to the first specific base station.

17. The self-defined network coverage optimizing method according to claim 16, wherein in response to the first group list being empty, the self-defined network coverage optimizing method further comprises:
receiving a first update message from the first specific base station, wherein the first update message comprises a first specific group list corresponding to the first base station group, and the first update message is configured to request the first base station to update the first group list according to the first specific group list.

18. The self-defined network coverage optimizing method according to claim 16, wherein the first base station belongs to the first base station group and serves specific user equipment, the first base station group further comprises a first member base station, the first group list further records a first edge base station hop count of the first base station, the group list of the first member base station records a second edge base station hop count of the first member base station, and the self-defined network coverage optimizing method further comprises:
receiving a specific measurement report from the specific user equipment;
in response to determining that the specific measurement report indicates that first received power of the specific user equipment with respect to the first member base station satisfies an interference condition, determining whether the first edge base station hop count is greater than the second edge base station hop count;
in response to determining that the first edge base station hop count is greater than the second edge base station hop count, sending an interference control message to the second base station, wherein the interference control message indicates an interference level of the first member base station with respect to the first base station; and
in response to determining that the first edge base station hop count is not greater than the second edge base station hop count, reducing or maintaining transmission power of the first base station.

19. The self-defined network coverage optimizing method according to claim 16, wherein the first base station belongs to the first base station group, the first base station group further comprises a first member base station, and the self-defined network coverage optimizing method further comprises:
in response to the first member base station receiving an interference control message, determining whether a time between the interference control message and a previous interference control message exceeds a first preset time length, wherein the interference control message indicates an interference level of the first base station with respect to the first member base station;
recording the first member base station and the interference level indicated by the interference control message in an interference list of the first base station; and
in response to determining that the time between the interference control message and the previous interference control message exceeds the first preset time length, maintaining or reducing the transmission power of the first base station according to the interference level indicated by the interference control message; otherwise, ignoring the interference control message.

20. The self-defined network coverage optimizing method according to claim 19, further comprising:
in response to receiving a power control message from the first specific base station, determining whether the interference list of the first base station is empty; and
in response to determining that the interference list of the first base station is empty, increasing the transmission power of the first base station; otherwise, not adjusting the transmission power of the first base station.

21. The self-defined network coverage optimizing method according to claim 19, further comprising:
in response to determining that the first member base station has failed, removing the first member base station from the interference list of the first base station.

22. The self-defined network coverage optimizing method according to claim 19, wherein the first base station belongs to the first base station group and is a backup manager base station of the first base station group, and the self-defined network coverage optimizing method further comprises:
in response to determining that a time of not receiving any member tracking message from the first specific base station reaches a second preset time length, starting management of the first base station group.

23. The self-defined network coverage optimizing method according to claim 19, wherein the first base station belongs to the first base station group and belongs to the edge base station category, and the self-defined network coverage optimizing method further comprises:
in response to determining that an update message from the first specific base station indicates that the first base station group has been divided into a plurality of sub base station groups, finding a specific sub base station group to which the first base station belongs among the sub base station groups;
determining whether the first base station satisfies a specific condition; and
in response to determining that the first base station satisfies the specific condition, starting management of the specific sub base station group; otherwise, not managing the specific sub base station group.

24. The self-defined network coverage optimizing method according to claim 16, wherein in response to the first group list being not empty, the first group list of the first base station indicates at least one second member base station of a second base station group to which the first base station belongs and manages a second specific base station of the second base station group.

25. The self-defined network coverage optimizing method according to claim 16, further comprising:
in response to determining that the first base station is set to a moved state, clearing the first group list and the neighbor list of the first base station, and restoring the transmission power of the first base station to a preset value.

26. The self-defined network coverage optimizing method according to claim 16, wherein the first specific base station that manages the first base station group belongs to an edge base station category, and the first base station belongs to the edge base station category or an inner base station category.

27. A base station, which serves first user equipment and manages a first base station group, the base station comprising:
a storage circuit storing a program code;
a transceiver; and
a processor coupled to the storage circuit and the transceiver, and loading the program code to execute:
receiving a first measurement report from the first user equipment;
in response to determining that the first measurement report indicates that a neighboring first base station is present, sending a first member tracking message to the first base station, wherein the first base station sends a first member tracking response back to the first specific base station in response to the first member tracking message;
determining whether the first base station belongs to any other base station group based on the first member tracking response;
in response to determining that the first base station does not belong to any other base station group, adding the first base station to the first base station group; and
in response to determining that the first member tracking response indicates that the first base station belongs to a second base station group, merging the first base station group and the second base station group.

28. A base station, comprising:
a storage circuit storing a program code;
a transceiver; and
a processor coupled to the storage circuit and the transceiver, and loading the program code to execute:
controlling the transceiver to receive a first member tracking message from a first specific base station, wherein the first specific base station manages a first base station group; and
controlling the transceiver to send a first member tracking response back to the first specific base station in response to the first member tracking message, wherein the first member tracking response comprises a base station category to which the first base station belongs, a neighbor list of the first base station, and a first group list of the first base station, wherein the base station category comprises an edge base station category or an inner base station category, and a location of the first base station is unknown to the first specific base station.

* * * * *